(12) United States Patent
Banning et al.

(10) Patent No.: US 7,301,025 B2
(45) Date of Patent: *Nov. 27, 2007

(54) COLORANT COMPOUNDS

(75) Inventors: Jeffery H. Banning, Hillsboro, OR (US); Bo Wu, Wilsonville, OR (US); James M. Duff, Mississauga (CA); Wolfgang G. Wedler, Tualatin, OR (US); Jule W. Thomas, Jr., West Linn, OR (US); Randall R. Bridgeman, Hubbard, OR (US)

(73) Assignee: Xerox Corporation, Stamford, CT (US)

( * ) Notice: Subject to any disclaimer, the term of this patent is extended or adjusted under 35 U.S.C. 154(b) by 60 days.

This patent is subject to a terminal disclaimer.

(21) Appl. No.: 11/141,898

(22) Filed: Jun. 1, 2005

(65) Prior Publication Data

US 2005/0228183 A1    Oct. 13, 2005

Related U.S. Application Data

(62) Division of application No. 10/607,373, filed on Jun. 26, 2003, now Pat. No. 6,998,493.

(51) Int. Cl.
*C07D 405/14* (2006.01)
*C07D 311/80* (2006.01)

(52) U.S. Cl. .......................... 546/2; 549/212; 549/211; 549/3; 546/5; 546/10; 546/11; 502/150; 502/171

(58) Field of Classification Search .................. 546/11, 546/10, 5, 2; 549/3, 211, 212; 502/150, 502/171
See application file for complete search history.

(56) References Cited

U.S. PATENT DOCUMENTS

| | | | |
|---|---|---|---|
| 1,981,515 A | 11/1934 | Kyrides | 260/128 |
| 1,981,516 A | 11/1934 | Kyrides | 260/128 |
| 1,991,482 A | 2/1935 | Allemann | 260/63 |
| 3,653,932 A | 4/1972 | Berry et al. | 106/22 |
| 3,751,279 A | 8/1973 | Papenfuss et al. | 106/288 |
| 4,050,945 A | 9/1977 | Suzuki | 106/21 |
| 4,264,507 A | 4/1981 | Borror et al. | 260/336 |
| 4,361,842 A | 11/1982 | Haruta et al. | 346/1.1 |
| 4,390,369 A | 6/1983 | Merritt et al. | 106/31 |
| 4,484,948 A | 11/1984 | Merritt et al. | 106/31 |
| 4,619,784 A | 10/1986 | Locatell, Jr. et al. | 540/593 |
| 4,647,675 A | 3/1987 | Mayer et al. | 549/394 |
| 4,684,956 A | 8/1987 | Ball | 346/1.1 |
| 4,851,045 A | 7/1989 | Taniguchi | 106/31 |
| 4,889,560 A | 12/1989 | Jaeger et al. | 106/27 |
| 4,889,761 A | 12/1989 | Titterington et al. | 428/195 |
| 4,935,059 A | 6/1990 | Mayer et al. | 106/22 |
| 5,006,170 A | 4/1991 | Schwarz et al. | 106/20 |
| 5,084,099 A | 1/1992 | Jaeger et al. | 106/22 |
| 5,151,120 A | 9/1992 | You et al. | 106/27 |
| 5,221,335 A | 6/1993 | Williams et al. | 106/23 |
| 5,250,708 A | 10/1993 | Barry, Jr. | 549/226 |
| 5,372,852 A | 12/1994 | Titterington et al. | 427/288 |
| 5,410,053 A | 4/1995 | Hahn et al. | 546/48 |
| 5,496,879 A | 3/1996 | Griebel et al. | 524/320 |
| 5,507,864 A | 4/1996 | Jaeger et al. | 106/22 |
| 5,514,208 A * | 5/1996 | Nagai et al. | 106/31.43 |
| 5,620,820 A | 4/1997 | Bertrand et al. | 430/42 |
| 5,621,022 A | 4/1997 | Jaeger et al. | 523/161 |
| 5,747,554 A | 5/1998 | Sacripante et al. | 523/161 |

(Continued)

FOREIGN PATENT DOCUMENTS

DE    42 15 394 A 1    11/1993

(Continued)

OTHER PUBLICATIONS

Copending U.S. Appl. No. 10/260,146, filed Sep. 27, 2002 entitled "Colorant Compounds," by Jeffery H. Banning et al.

(Continued)

*Primary Examiner*—Charanjit S. Aulakh
(74) *Attorney, Agent, or Firm*—Judith L. Byoric

(57) ABSTRACT

Compounds of the formula

[structure: a xanthene/acridine-type chromogen with substituents $R_2$ and $R_1$–N on one ring, $R_3$ and $R_4$–N$^\oplus$ on another ring, bridging atom Y, $(R_5)_a$ and $(R_6)_b$ ring substituents, a pendant phenyl group bearing $(R_7)_c$ and $(Q)_d$ with $CA_{d-1}^{\oplus}$, shown with counterion $M\ z\ A^\ominus$, bracketed subscript $z$]

wherein M is either (1) a metal ion having a positive charge of +p wherein p is an integer which is at least 2, said metal ion being capable of forming a compound with at least two chromogen moieties, or (2) a metal-containing moiety capable of forming a compound with at least two chromogen moieties, z is an integer representing the number of chromogen moieties associated with the metal and is at least 2, and $R_1$, $R_2$, $R_3$, $R_4$, $R_5$, $R_6$, $R_7$, a, b, c, d, Y, $Q^-$, A, and CA are as defined herein.

27 Claims, No Drawings

U.S. PATENT DOCUMENTS

| | | | |
|---|---|---|---|
| 5,847,162 A | 12/1998 | Lee et al. | 549/227 |
| 5,902,841 A | 5/1999 | Jaeger et al. | 523/161 |
| 6,835,238 B1* | 12/2004 | Wu et al. | 106/31.29 |
| 6,998,493 B2* | 2/2006 | Banning et al. | 549/212 |
| 2001/0008109 A1 | 7/2001 | Banning et al. | 106/31.75 |

FOREIGN PATENT DOCUMENTS

| | | |
|---|---|---|
| EP | 0187352 | 7/1986 |
| EP | 0206286 | 12/1986 |
| EP | 0 519 138 A2 | 12/1992 |
| EP | 0 565 798 | 10/1993 |
| EP | 0 573 762 A2 | 12/1993 |
| EP | 0 936 258 A1 | 8/1999 |
| GB | 421 737 | 12/1934 |
| GB | 1 232 098 | 5/1971 |
| GB | 2 311 075 | 9/1997 |
| WO | WO 94/04619 | 3/1994 |
| WO | WO 02/096900 A1 | 12/2002 |

OTHER PUBLICATIONS

Copending U.S. Appl. No. 10/260,376, filed Sep. 27, 2002 entitled "Phase Change Inks," by C. Wayne Jaeger et al.

Copending U.S. Appl. No. 10/260,379, filed Sep. 27, 2002 entitled "Method for Making Colorant Compounds," by C. Wayne Jaeger et al.

Copending U.S. Appl. No. 10/606,631, filed concurrently herewith, entitled "Phase Change Inks Containing Colorant Compounds," by Bo Wu et al.

Copending U.S. Appl. No. 10/607,382, filed concurrently herewith, entitled "Colorant Compounds," by Jeffery H. Banning et al.

Copending U.S. Appl. No. 10/606,705, filed concurrently herewith, entitled "Phase Change Inks Containing Colorant Compounds," by Bo Wu et al.

English Abstract for German Patent Publication DE 4205636AL.

English Abstract for German Patent Publication DE 4205713AL.

"Rhodamine Dyes and Related Compounds. XV. Rhodamine Dyes with Hydroaromatic and Polymethylene Radicals," I. S. Ioffe et al., *Zh. Organ. Khim.* (1965), 1(3), 584-6.

"Rhodamine Dyes and Related Compounds. XI. Aryl- and Alkylrhodamines Containing Carboxyl Groups," I. S. Ioffe et al., *Zh. Obsch. Khim.* (1964), 64(6), 2041-4.

"Rhodamine Dyes and Related Compounds. X. Fluoroescence of Solutions of Alkyl- and Arylalkylrhodamines," I. S. Ioffe et al., *Zh. Obsch. Khim.* (1964), 34(6), 2039-41 ABSTRACT only.

"Rhodamine Dyes and Related Compounds. IX. Rhodamine B Sulfonic Acids and their Derivatives," I. S. Ioffe et al., *Zh. Obsch. Khim.* (1964), 34(2), 640-44.

"Rhodamine Dyes and Related Compounds. VIII. Amides of Sulforhodamine B Containing β-Hydroxyethyl and β-Chloroethyl Groups," I. S. Ioffe et al., *Zh. Obsch. Khim.* (1963), 33(12), 3943-6.

"Rhodamine Dyes and Related Compounds. VII. (β-Phenylethyl)rhodamines," I. S. Ioffe et al., *Zh. Obsch. Khim.* (1963), 33(4), 1089-92.

"Rhodamine Dyes and Related Compounds. VI. Chloride and Amides of Sulforhodamine B," I. S. Ioffe et al., *Zh. Obsch. Khim.* (1962), 32, 1489-92 ABSTRACT only.

"Rhodamine Dyes and Related Compounds. V. α-Pyridylrhodamine," I. S. Ioffe et al., *Zh. Obsch. Khim.* (1962), 32, 1485-9.

"Rhodamine Dyes and Related Compounds. IV. Aryl- and Benzylrhodamines," I. S. Ioffe et al., *Zh. Obsch. Khim.* (1962), 32, 1480-5.

"Rhodamine Dyes and Related Compounds. III. Reaction of m-aminophenol With Phthalic Anhydride in Hot Sulfuric Acid," I. S. Ioffe et al., *Zh. Obsch. Khim.* (1962), 32, 1477-80. ABSTRACT only.

"Rhodamine Dyes and Related Compounds. XVIII. N,N'-Dialkylrhodamines with Long Chain Hydrocarbon Radicals," I. S. Ioffe et al., *Zh. Organ. Khim.* (1970), 6(2), 369-71.

"Rhodamine Dyes and Related Compounds. XIX. Mutal Transformations of Colorless and Colored Forms of N,N'-Substituted Rhodamine," I. S. Ioffe et al., *Zh. Organ. Khim.* (1972), 8(8), 1726-9.

"Synthesis of N-Substituted Flaveosines, Acridine Analogs of Rhodamine Dyes," I. S. Ioffe et al., *Zh. Org. Khim.* (1966), 2(9), 1721.

"Rhodamine Dyes and Related Compounds. XVII. Acridine Analogs of Rhodamine and Fluorescein," I. S. Ioffe et al., *Zh. Organ. Khim.* (1966), 2(5), 927-31.

"New Lipophilic Rhodamines and Their Application to Optical Potasium Sensing," T. Werner et al., *Journal of Fluorescence*, vol. 2, No. 3, pp. 93-98 (1992).

English abstract for Japanese Patent Publication JP 61221265.

English abstract for Japanese Publication No. 11279426.

English abstract for Japanese Publication No. 2001164245.

English abstract for Japanese Publication No. 2000103975.

English abstract for Japanese Publication No. 63061056.

Derwent Publications Ltd., London, GB; AN 1997-255745, XP002299791, JP 09 087534 A, Konica Corporation.

* cited by examiner

COLORANT COMPOUNDS

This application is a divisional of U.S. application Ser. No. 10/607,373, filed Jun. 26, 2003 now U.S. Pat. No. 6,998,493, the disclosure of which is totally incorporated herein by reference.

Cross-reference is made to the following copending applications:

U.S. Ser. No. 10/260,146, filed Sep. 27, 2002, U.S. 20040077887; U.S. Ser. No. 10/260,376, filed Sep. 27, 2002, now U.S. Pat. No. 6,821,327; U.S. Ser. No. 10/260,379, filed Sep. 27, 2002, U.S. 20040082801; U.S. Ser. No. 10/606,631, filed Jun. 26, 2003, now U.S. Pat. No. 6,835,238; U.S. Ser. No. 10/607,382, filed Jun. 26, 2003, U.S. 20050011411; U.S. Ser. No. 10/606,705, filed Jun. 26, 2003, now U.S. Pat. No. 6,860,931; the disclosures of each of which are totally incorporated herein by reference.

BACKGROUND

The present invention is directed to colorant compounds. More specifically, the present invention is directed to colorant compounds particularly suitable for use in hot melt or phase change inks.

Of background interest to the present invention are the following documents, the disclosures of each of which are totally incorporated herein by reference: GB 2 311 075; Zh. Organ. Khim. (1965), 1(3), 584-6; Zh. Obsch. Khim. (1964), 34(6), 2041-4; Zh. Obsch. Khim. (1964), 34(6), 2039-41; Zh. Obsch. Khim. (1964), 34(2), 640-44; Zh. Obsch. Khim. (1963), 33(12), 3943-6; Zh. Obsch. Khim. (1963), 33(4), 1089-92; Zh. Obsch. Khim. (1962), 32, 1489-92; Zh. Obsch. Khim. (1962), 32, 1485-9; Zh. Obsch. Khim. (1962), 32, 1480-5; Zh. Obsch. Khim. (1962), 32, 1477-80; Zh. Organ. Khim. (1970), 6 (2), 369-71; Zh. Organ. Khim. (1972), 8(8), 1726-9; Zh. Org. Khim. (1966), 2(9), 1721; Zh. Organ. Khim. (1966), 2(5), 927-31; Journal of Fluorescence, Vol. 2, No. 3, pp. 93-98 (1992); U.S. Pat. No. 1,991,482; U.S. Pat. No. 5,847,162; U.S. Pat. No. 4,935,059; U.S. Pat. No. 4,647,675; U.S. Pat. No. 1,981,515; U.S. Pat. No. 1,981,516; GB 421 737; JP61221265; U.S. Pat. No. 5,084,099; U.S. Pat. No. 5,507,864; U.S. Pat. No. 5,621,022; U.S. Pat. No. 5,747,554; U.S. Pat. No. 5,902,841; EP-0 565 798; U.S. Pat. No. 5,496,879; DE 4205636AL; DE 4205713AL; U.S. Pat. No. 4,889,560; U.S. Pat. No. 4,889,761; U.S. Pat. No. 5,372,852; U.S. Pat. No. 5,221,335; U.S. Pat. No. 5,621,022; U.S. Pat. No. 3,653,932; U.S. Pat. No. 4,390,369; U.S. Pat. No. 4,484,948; U.S. Pat. No. 4,684,956; U.S. Pat. No. 4,851,045; U.S. Pat. No. 4,889,560; U.S. Pat. No. 5,006,170; U.S. Pat. No. 5,151,120; U.S. Pat. No. 5,372,852; U.S. Pat. No. 5,496,879; EP-0187352; EP-0206286; DE 4205636AL; DE 4205713AL; WO 94/04619.

While known compositions and processes are suitable for their intended purposes, a need remains for new magenta colorant compositions. In addition, a need remains for magenta colorant compositions particularly suitable for use in phase change inks. Further, a need remains for magenta colorants with desirable thermal stability. Additionally, a need remains for magenta colorants that exhibit minimal undesirable discoloration when exposed to elevated temperatures. There is also a need for magenta colorants that exhibit a desirable brilliance. In addition, there is a need for magenta colorants that exhibit a desirable hue. Further, there is a need for magenta colorants that are of desirable chroma. Additionally, there is a need for magenta colorants that have desirably high lightfastness characteristics. A need also remains for magenta colorants that have a desirably pleasing color. In addition, a need remains for magenta colorants that exhibit desirable solubility characteristics in phase change ink carrier compositions. Further, a need remains for magenta colorants that enable phase change inks to be jetted at temperatures of over 135° C. while maintaining thermal stability. Additionally, a need remains for magenta colorants that enable phase change inks that generate images with low pile height. There is also a need for magenta colorants that enable phase change inks that generate images that approach lithographic thin image quality. In addition, there is a need for magenta colorants that exhibit oxidative stability. Further, there is a need for magenta colorants that do not precipitate from phase change ink carriers. Additionally, there is a need for magenta colorants that do not, when included in phase change inks, diffuse into adjacently printed inks of different colors. A need also remains for magenta colorants that do not leach from media such as phase change ink carriers into tape adhesives, paper, or the like. In addition, a need remains for magenta colorants that, when incorporated into phase change inks, do not lead to clogging of a phase change ink jet printhead. Further, there is a need for magenta colorants that enable phase change inks that generate images with sharp edges that remain sharp over time. Additionally, there is a need for magenta colorants that enable phase change inks that generate images which retain their high image quality in warm climates. Further, there is a need for magenta colorants that enable phase change inks that generate images of desirably high optical density. Additionally, there is a need for magenta colorants that, because of their good solubility in phase change ink carriers, enable the generation of images of low pile height without the loss of desirably high optical density. A need also remains for magenta colorants that enable cost-effective inks. In addition, a need remains for magenta colorants that are compounds having metal compounds associated with chromogens, wherein the thermal stability of the metal compound colorants exceeds that of the chromogens unassociated with a metal.

SUMMARY AND BRIEF DESCRIPTION

The present invention is directed to compounds of the formula

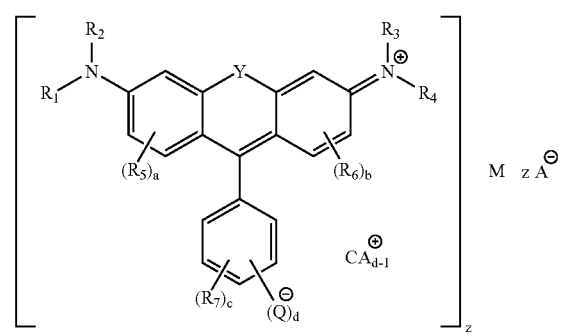

wherein M is either (1) a metal ion having a positive charge of +p wherein p is an integer which is at least 2, said metal ion being capable of forming a compound with at least two

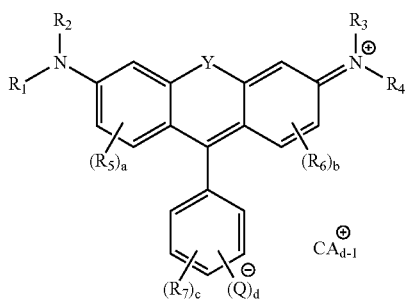

chromogen moieties, or (2) a metal-containing moiety capable of forming a compound with at least two

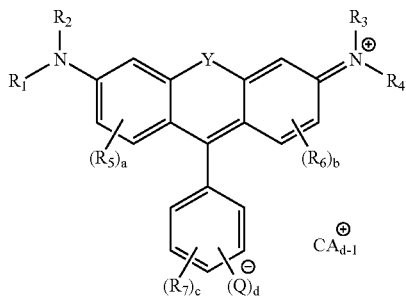

chromogen moieties, and z is an integer representing the number of

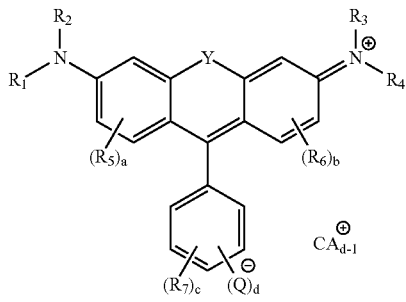

chromogen moieties associated with the metal and is at least 2. There is no necessary upper limit on the value of z.

Examples of metal cations having a positive charge of +p wherein p is an integer which is at least 2 include +2, +3, +4, and higher cations of magnesium, calcium, strontium, barium, radium, aluminum, gallium, germanium, indium, tin, antimony, tellurium, thallium, lead, bismuth, polonium, scandium, titanium, vanadium, chromium, manganese, iron, cobalt, nickel, copper, zinc, zirconium, niobium molybdenum, technetium, ruthenium, rhodium, palladium, silver, cadmium, hafnium, tantalum, tungsten, rhenium, osmium, iridium, platinum, gold, mercury, metals of the lanthanide series, such as europium and the like, metals of the actinide series, and the like.

Examples of metal-containing moieties include:

metal ionic moieties, such as $Me^{3+}X^-$ wherein Me represents a trivalent metal atom and X represents a monovalent anion, such as $Cl^-$, $Br^-$, $I^-$, $HSO_4^-$, $HSO_3^-$, $CH_3SO_3^-$, $CH_3C_6H_4SO_3^-$, $NO_3^-$, $HCOO^-$, $CH_3COO^-$, $H_2PO_4^-$, $SCN^-$, $BF_4^-$, $ClO_4^-$, $SSO_3^-$, $PF_6^-$, $SbCl_6^-$, or the like, or $Me^{4+}X^-$ or $Me^{4+}X^-$ or $Me^{4+}X_2^-$ wherein Me represents a tetravalent metal atom, X represents a monovalent anion, and $X_2$ represents 2 monovalent anions, $Me^{4+}X^{2-}$ wherein Me represents a tetravalent metal atom and $X^{2-}$ represents a divalent anion, and the like;

metal coordination compounds, wherein metals such as magnesium, calcium, strontium, barium, radium, aluminum, gallium, germanium, indium, tin, antimony, tellurium, thallium, lead, bismuth, polonium, scandium, titanium, vanadium, chromium, manganese, iron, cobalt, nickel, copper, zinc, zirconium, niobium molybdenum, technetium, ruthenium, rhodium, palladium, silver, cadmium, hafnium, tantalum, tungsten, rhenium, osmium, iridium, platinum, gold, mercury, metals of the lanthanide series, such as europium and the like, metals of the actinide series, and the like are associated with one or more ligands, such as carbonyl (carbon monoxide) ligands, ferrocene ligands, halide ligands, such as fluoride, chloride, bromide, iodide, or the like, amine ligands of the formula

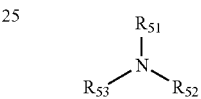

wherein $R_{51}$, $R_{52}$, and $R_{53}$ each, independently of the others, is (i) a hydrogen atom, (ii) a halogen atom, such as fluorine, chlorine, bromine, iodine, or the like, (iii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iv) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (v) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (vi) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein one or more of $R_{51}$, $R_{52}$, and $R_{53}$ can be joined together to form a ring, and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, with specific examples of suitable amine ligands including ammonia, trimethylamine, ethylenediamine, bipyridine, and the like, phosphine ligands of the formula

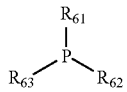

wherein $R_{61}$, $R_{62}$, and $R_{63}$ each, independently of the others, is (i) a hydrogen atom, (ii) a halogen atom, such as fluorine, chlorine, bromine, iodine, or the like, (iii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iv) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (v) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, (vi) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, (vii) an alkoxy group (including linear, branched, saturated, unsaturated, cyclic, substituted, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, and in one embodiment with no more than about 55 carbon atoms, in another embodiment with no more than about 30 carbon atoms, and in yet another embodiment with no more than about 20 carbon atoms, although the number of carbon atoms can be outside of these ranges, (viii) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least about 6 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (ix) an arylalkyloxy group (including unsubstituted and substituted arylalkyloxy groups, wherein the alkyl portion of the arylalkyloxy group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyloxy or the like, or (x) an alkylaryloxy group (including unsubstituted and substituted alkylaryloxy groups, wherein the alkyl portion of the alkylaryloxy group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyloxy or the like, wherein one or more of $R_{61}$, $R_{62}$, and $R_{63}$ can be joined together to form a ring, and wherein the substituents on the substituted alkyl, alkoxy, aryl, aryloxy, arylalkyl, arylalkyloxy, alkylaryl, and alkylaryloxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, with specific examples of suitable phosphine ligands including phosphine, trifluorophosphine, trichlorophosphine, trimethylphosphine, triphenylphosphine, trethoxyphosphine, and the like, water ligands, cyano ligands, isocyano ligands, hydroxide anions, nitro ligands, nitrito ligands, thiocyanato ligands, nitric oxide ligands, and the like, including monodentate ligands, bidentate ligands, tridentate ligands, tetradentate ligands, pentadentate ligands, hexadentate ligands (such as ethylene diamine tetraacetic acid), bridging ligands joining two or more metal atoms in a complex, crown ether ligands, and the like; a wide variety of ligands and metal complexes are disclosed in, for example, *Advanced Inorganic Chemistry*, Fourth Edition, F. A. Cotton and G. Wilkinson, John Wiley & Sons (1980), the disclosure of which is totally incorporated herein by reference;

heteropolyacids, also known as polyoxometalates, which are acids comprising inorganic metal-oxygen clusters; these materials are discussed in, for example, "Polyoxometalate Chemistry: An Old Field with New Dimensions in Several Disciplines," M. T. Pope et al., *Angew. Chem. Int. Ed. Engl.*, Vol. 30, p. 34 (1991), the disclosure of which is totally incorporated herein by reference; examples of heteropolyacids include phosphotungstic acids, including (but not limited to) those of the general formula $H_3PO_4 \cdot 12WO_3 \cdot XH_2O$ (wherein X is variable, with common values including (but not being limited to) 12, 24, or the like), silicotungstic acids, including (but not limited to) those of the general formula $H_4SiO_2 \cdot 12WO_3 \cdot XH_2O$ (wherein X is variable, with common values including (but not being limited to) 12, 24, 26, or the like), phosphomolybdic acids, including (but not limited to) those of the general formula $12MoO_3 \cdot H_3PO_4 \cdot XH_2O$ (wherein X is variable, with common values including (but not being limited to) 12, 24, 26, or the like) and the like, all commercially available from, for example, Aldrich Chemical Co., Milwaukee, Wis., as well as mixtures thereof;

and any other metal-containing moiety capable of forming a compound with at least two

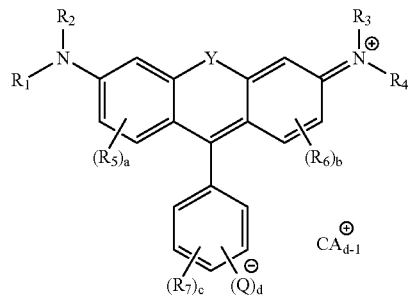

moieties.

By "capable of forming a compound with at least two

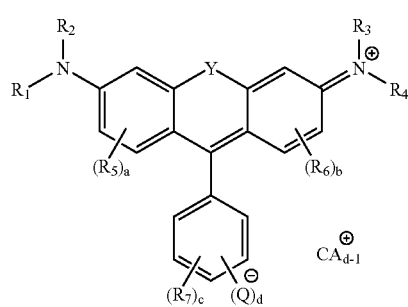

chromogen moieties" is meant that the metal cation or metal-containing moiety can react with two or more

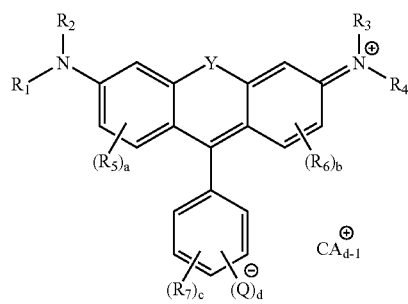

chromogen moieties to form a compound. Any kind of association between the

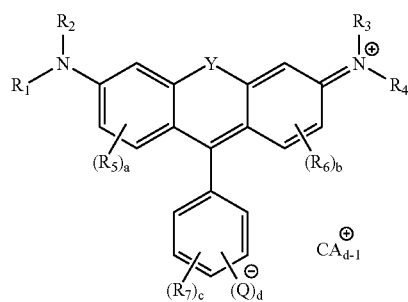

chromogen moiety and the metal cation or metal-containing moiety to form a compound is suitable, including ionic compounds, covalent compounds, coordination compounds, and the like.

$R_1$, $R_2$, $R_3$, and $R_4$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 18 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as benzyl or the like, (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as tolyl or the like, (v) a halogen atom, such as fluorine, chlorine, bromine, iodine, or the like, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

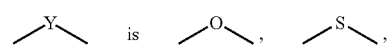

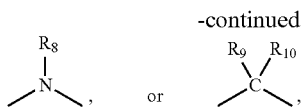

$R_8$, $R_9$, and $R_{10}$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, provided that the number of carbon atoms in $R_1+R_2+R_3+R_4+R_5+R_6+R_7+R_8+R_9+R_{10}$ is in one embodiment at least about 16, in another embodiment at least about 18, in yet another embodiment at least about 20, in still another embodiment at least about 22, in another embodiment at least about 24, in yet another embodiment at least about 26, in still another embodiment at least about 28, in another embodiment at least about 30, in yet another embodiment at least about 32, in still another embodiment at least about 34, in another embodiment at least about 36, in yet another embodiment at least about 38, in still another embodiment at least about 40, in another embodiment at least about 42, in yet another embodiment at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72, each $Q^-$, independently of the others, is a $COO^-$ group or a $SO_3^-$ group, d is an integer which is 1, 2, 3, 4, or 5, A is an anion, with examples of suitable anions including (but not being limited to) $Cl^-$, $Br^-$, $I^-$, $HSO_4^-$, $HSO_3^-$, $½SO_4^{2-}$, $½SO_3^{2-}$, $CH_3SO_3^-$, $CH_3C_6H_4SO_3^-$, $NO_3^-$, $HCOO^-$, $CH_3COO^-$, $H_2PO_4^-$, $½HPO_4^{2-}$, $SCN^-$, $BF_4^-$, $ClO_4^-$, $SSO_3^-$, $PF_6^-$, $SbCl_6^-$, or the like, as well as mixtures thereof, and CA is either a hydrogen atom or a cation associated with all but one of the $Q^-$ groups, with examples of suitable cations including (but not being limited to) alkali metal cations, such as $Li^+$, $Na^+$, $K^+$, $Rb^+$, and $Cs^+$, nonpolymeric or monomeric ammonium and quaternary amine cations, including those of the general formula

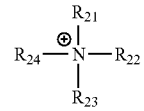

wherein each of $R_{21}$, $R_{22}$, $R_{23}$, and $R_{24}$, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein one or more of $R_{21}$, $R_{22}$, $R_{23}$, and $R_{24}$ can be joined together to form a ring, and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, oligomeric and polymeric cations, such as cationic polymers or oligomers, and the like, as well as mixtures thereof.

In situations wherein

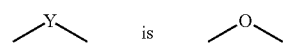

and either (i) one of the $R_7$ groups is in the ortho position and is either an ester based on a carboxylic acid, an ester based on a sulfonic acid, an amide based on a carboxylic acid, or an amide based on a sulfonic acid, or (ii) one of the Q⁻ groups is a sulfonate salt, i.e., when the chromogen is of the formula

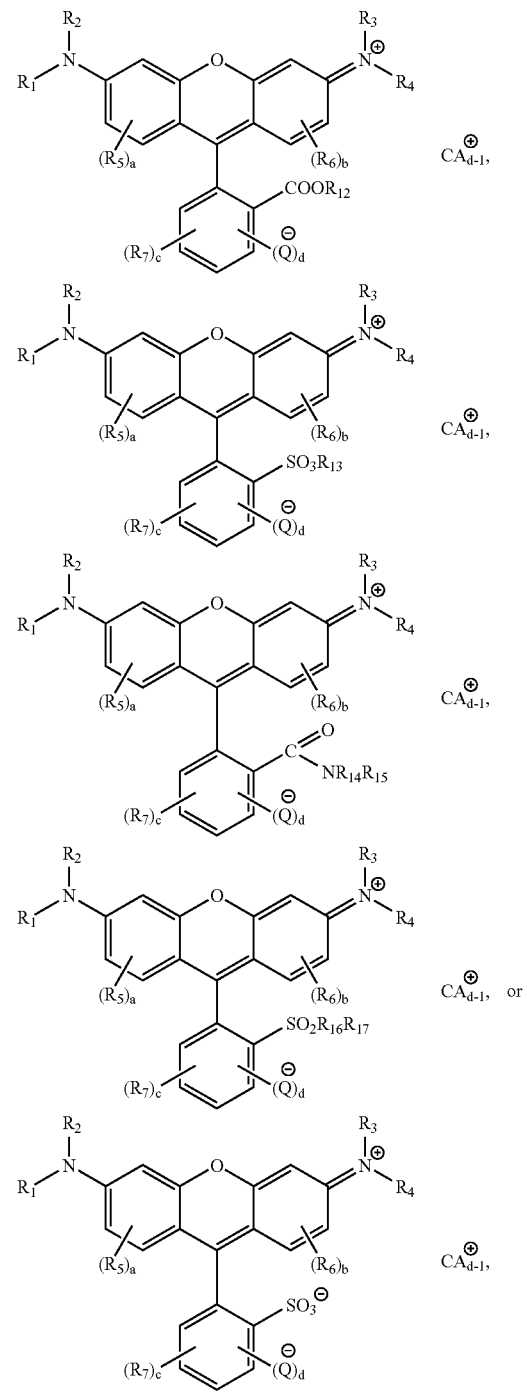

wherein $R_{12}$ $R_{13}$, $R_{14}$, $R_{15}$, $R_{16}$, and $R_{17}$ each, independently of the other, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 18 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as tolyl or the like, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, in one specific embodiment, (I) either (a) c is an integer which is 0, 1, 2, or 3, or (b) d is an integer which is 1, 2, 3, or 4, and (II) either (a) three of $R_1$, $R_2$, $R_3$, and $R_4$ are hydrogen atoms; (b) only one of $R_1$, $R_2$, $R_3$, and $R_4$ is a hydrogen atom; (c) $R_1$ and $R_2$ are both hydrogen atoms; (d) $R_3$ and $R_4$ are both hydrogen atoms; or (e) $R_1$ and $R_3$ are both hydrogen atoms and $R_2$ and $R_4$ are each, independently of the other, either alkyl groups or arylalkyl groups.

In one embodiment, the number of carbon atoms in $R_1+R_2+R_3+R_4$ is at least about 16, in another embodiment at least about 18, in yet another embodiment at least about 20, in still another embodiment at least about 22, in another embodiment at least about 24, in yet another embodiment at least about 26, in still another embodiment at least about 28, in another embodiment at least about 30, in yet another embodiment at least about 32, in still another embodiment at least about 34, in another embodiment at least about 36, in yet another embodiment at least about 38, in still another embodiment at least about 40, in another embodiment at least about 42, in yet another embodiment at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72.

Since hetero atoms can be included in the alkyl, aryl, arylalkyl, and alkylaryl groups, and since the groups can be substituted, it is to be understood that $R_1$, $R_2$, $R_3$, $R_4$, $R_5$, $R_6$, $R_7$, $R_8$, $R_9$, and $R_{10}$ can also be groups such as alkoxy, polyalkyleneoxy, aryloxy, polyaryleneoxy, arylalkyloxy, polyarylalkyleneoxy, alkylaryloxy, or polyalkylaryleneoxy groups, provided that the oxygen atom in such a group is not directly bonded to a nitrogen, oxygen, or sulfur atom in the

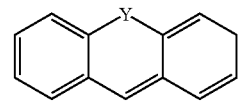

central structure.

Examples of situations wherein one of the $R_{1-4}$ groups is a cycloalkyl is when

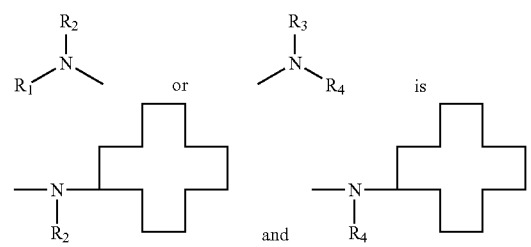

Examples of situations wherein the $R_{1-4}$ groups are joined together to form a ring are when

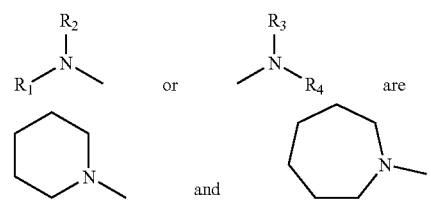

Examples of situations wherein one of the $R_{1-4}$ groups is joined to a phenyl ring in the central structure is when

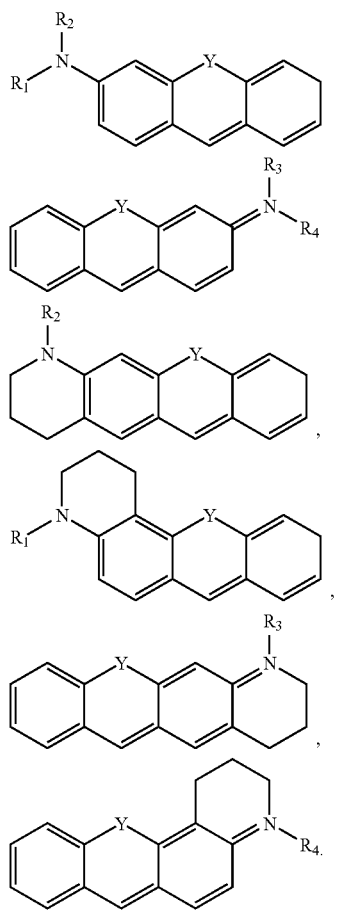

Compounds of the present invention include those wherein the chromogen is a monocarboxylic acid or a monocarboxylate, wherein

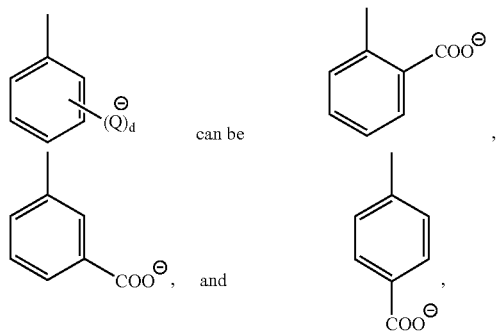

a dicarboxylic acid or a dicarboxylate, wherein

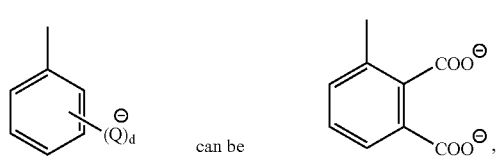

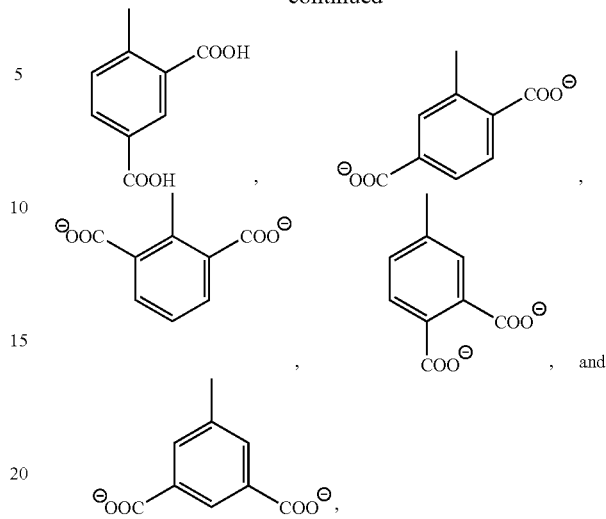

tricarboxylic acids and tricarboxylates, tetracarboxylic acids and tetracarboxylates, pentacarboxylic acids and pentacarboxylates, monosulfonic acids and monosulfonates, wherein

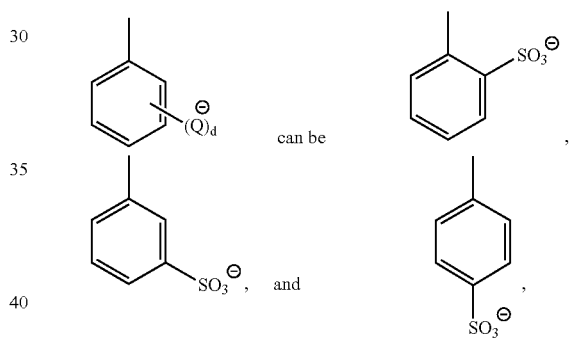

disulfonic acids and disulfonates, wherein

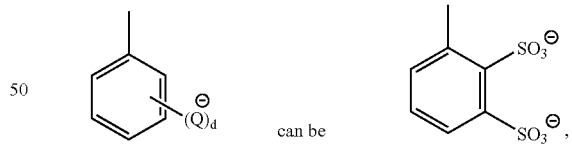

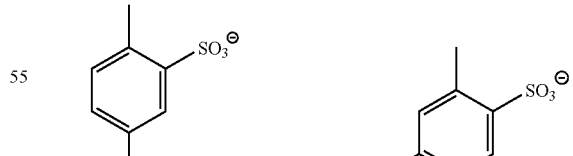

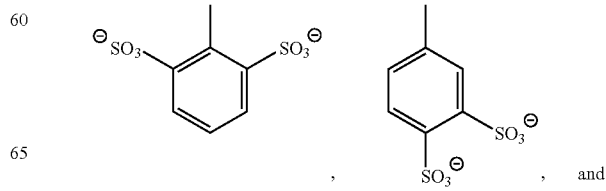

-continued

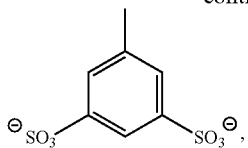

trisulfonic acids and trisulfonates, tetrasulfonic acids and tetrasulfonates, pentasulfonic acids and pentasulfonates, monocarboxylic acid monosulfonic acids and monocarboxylate monosulfonates, wherein

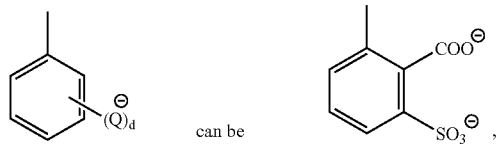

can be

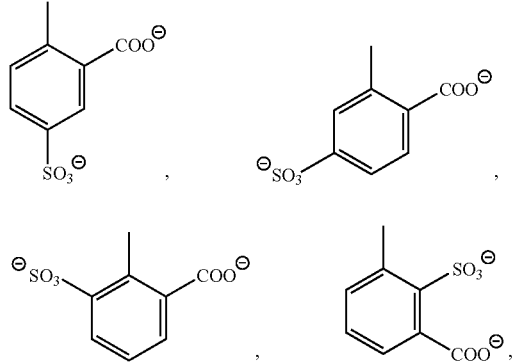

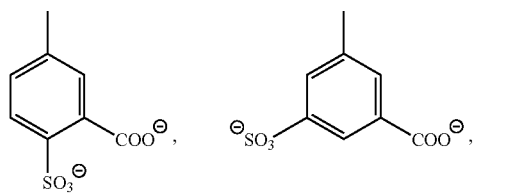

, and

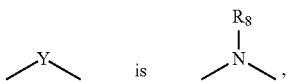

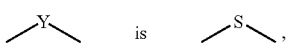

monocarboxylic acid disulfonic acids and monocarboxylate disulfonates, monocarboxylic acid trisulfonic acids and monocarboxylate trisulfonates, monocarboxylic acid tetrasulfonic acids and monocarboxylate tetrasulfonates, dicarboxylic acid monosulfonic acids and dicarboxylate monosulfonates, dicarboxylic acid disulfonic acids and dicarboxylate disulfonates, dicarboxylic acid trisulfonic acids and dicarboxylate trisulfonates, tricarboxylic acid monosulfonic acids and tricarboxylate monosulfonates, tricarboxylic acid disulfonic acids and tricarboxylate disulfonates, tetracarboxylic acid monosulfonic acids and tetracarboxylate monosulfonates, and the like. In addition, it is possible for a compound according to the present invention to have both one or more acid groups (i.e., COOH or $SO_3H$) and one or more anionic salt groups (i.e., $COO^-$ or $SO_3^-$) present in the molecule.

Colorant compounds according to the present invention include rhodamines, wherein

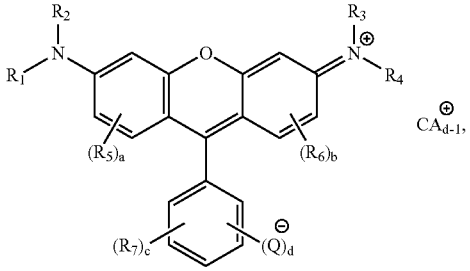

wherein the chromogen is of the general formula

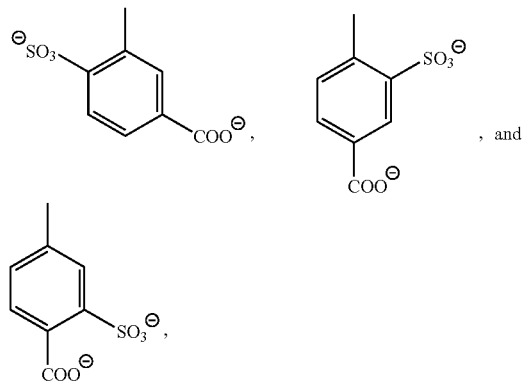

acridines, wherein

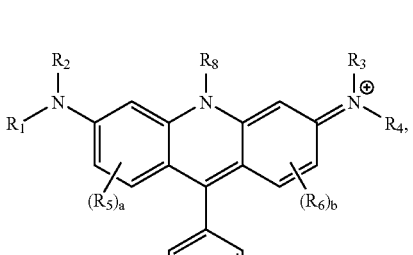

wherein the chromogen is of the general formula sulforhodamines, wherein wherein the chromogen is of the general formula

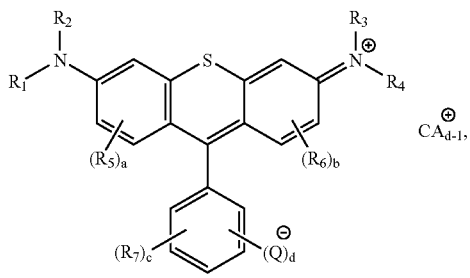

anthracenes, wherein

 is wherein the chromogen is of the general formula

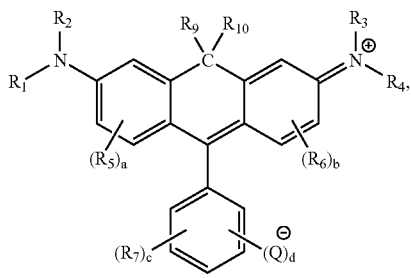

and the like.

In a specific embodiment, the anion A can be an organic dianion of the formula $A_1$-$R_{11}$-$A_2$ wherein $A_1$ and $A_2$ each, independently of the other, are anionic groups, such as carboxylate, sulfonate, or the like, and wherein $R_{11}$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, and wherein the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Examples of suitable organic dianions include unsubstituted and substituted naphthalene disulfonates, unsubstituted and substituted benzene disulfonates, and the like, as well as mixtures thereof.

In another specific embodiment, the anion A can be an organic trianion, tetraanion, and higher, an oligomeric and polymeric anion, such as a polysulfonate or polycarboxylate, or the like.

In one specific embodiment, the chromogen for the compounds according to the present invention is of the formula

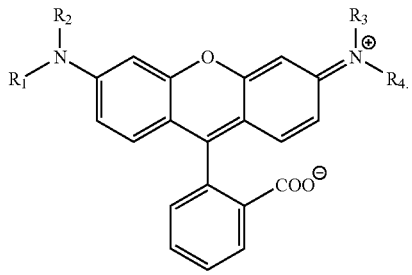

It is to be understood that in chromogens of the formula

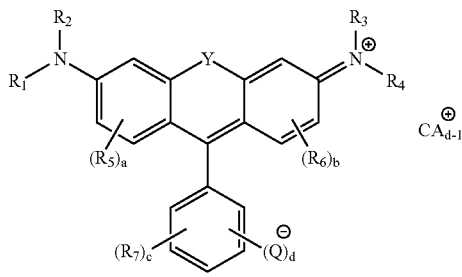

the positive charge is delocalized, and that other tautomeric structures can be drawn, including (but not limited to)

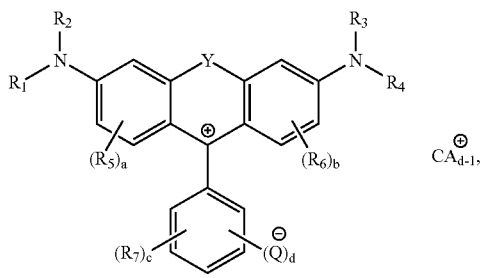

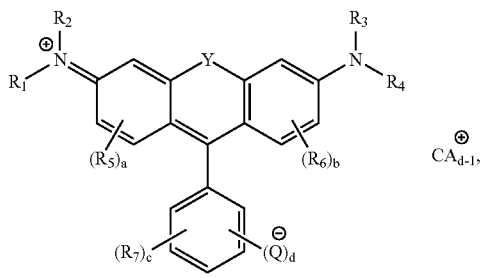

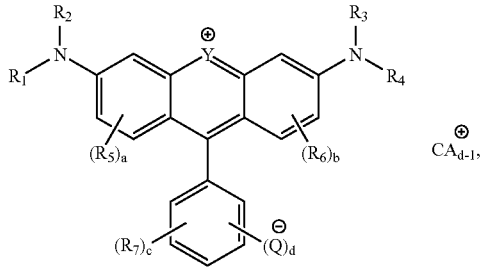

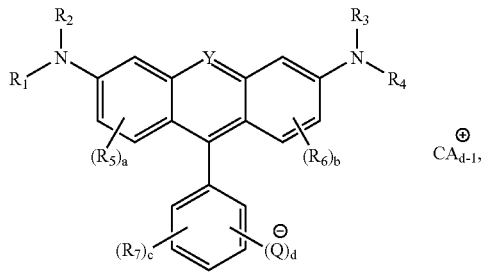

and the like. It is to be understood that all possible tautomeric forms of these colorants are included within the above formulae.

In one specific embodiment, the compounds of the present invention are of the general formula

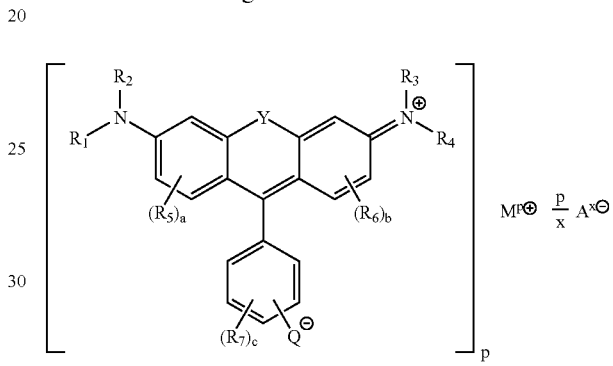

wherein M is a metal cation, p is an integer representing the charge on the metal cation and is at least 2, A is an anion, and x is an integer representing the charge on the anion.

Colorant compounds of the present invention can be prepared by any desired or effective procedure. Preparation of the chromogen will be discussed first. By "chromogen" is meant the

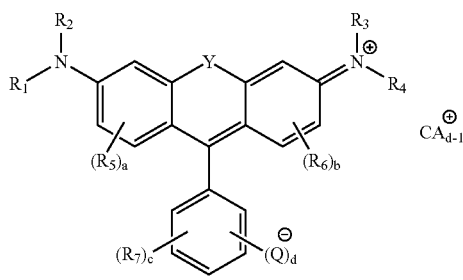

component of the metal compound which is later reacted with the metal cation or metal containing moiety to form the colorant of the present invention. For example, a dihalofluorescein, such as dichlorofluorescein or the like, can be admixed with one or more amines having the desired $R_1$, $R_2$, $R_3$, and $R_4$ groups thereon, an optional zinc halide, such as zinc chloride or the like, and an optional nonnucleophilic base, such as calcium oxide, zinc oxide, or the like, either neat or, optionally, in the presence of a solvent.

The amine and the dihalofluorescein are present in any desired or effective relative amounts, in one embodiment at least about 0.9 mole of base per every one mole of dihalofluorescein, in another embodiment at least about 0.95 mole of base per every one mole of dihalofluorescein, and in yet another embodiment at least about 1 mole of base per every one mole of dihalofluorescein, and in one embodiment no more than about 20 moles of base per every one mole of dihalofluorescein, in another embodiment no more than about 10 moles of base per every one mole of dihalofluorescein, and in yet another embodiment no more than about 2 moles of base per every one mole of dihalofluorescein, although the relative amounts can be outside of these ranges.

Dichlorofluorescein is commercially available from, for example, Aldrich Chemical Co., Milwaukee, Wis. Dihalofluoresceins can also be prepared by the reaction of fluorescein with $PX_5$ wherein X is fluorine, chlorine, bromine, or iodine, or with a toluenesulfonylhalide, such as toluenesulfonylchloride or the like.

When an optional zinc halide is used, the dihalofluorescein and the zinc halide are present in any desired or effective relative amounts, in one embodiment at least about 2 moles of zinc halide per every one mole of dihalofluorescein, in another embodiment at least about 2.5 moles of zinc halide per every one mole of dihalofluorescein, and yet in another embodiment at least about 3 moles of zinc halide per every one mole of dihalofluorescein, and in one embodiment no more than about 5 moles of zinc halide per every one mole of dihalofluorescein, in another embodiment no more than about 4.5 moles of zinc halide per every one mole of dihalofluorescein, and in yet another embodiment no more than about 4 moles of zinc halide per every one mole of dihalofluorescein, although the relative amounts can be outside of these ranges.

When an optional base is used, the base is present in any desired or effective amount, in one embodiment at least about 2 equivalents of base per every one mole of dihalofluorescein (i.e., about 2 moles of monobasic base per every one mole of dihalofluorescein, about 1 mole of dibasic base, such as calcium oxide, per every one mole of dihalofluorescein, and the like), in another embodiment at least about 2.5 equivalents of base per every one mole of dihalofluorescein, and yet in another embodiment at least about 3 equivalents of base per every one mole of dihalofluorescein, and in one embodiment no more than about 10 equivalents of base per every one mole of dihalofluorescein, in another embodiment no more than about 5 equivalents of base per every one mole of dihalofluorescein, and in yet another embodiment no more than about 3.2 equivalents of base per every one mole of dihalofluorescein, although the relative amounts can be outside of these ranges.

If desired, the reaction can be run neat, in the absence of a solvent. In addition, if desired, the reaction can be run in the presence of an optional solvent. Examples of suitable solvents include tetramethylene sulfone (sulfolane), N-methylpyrrolidone, dimethyl formamide, dimethyl sulfoxide, octanol, or the like, as well as mixtures thereof. When present, the optional solvent is present in any desired or effective amount, in one embodiment at least about 1 liter per every 0.1 mole of dihalofluorescein, in another embodiment at least about 1 liter per every 0.3 mole of dihalofluorescein, and in yet another embodiment at least about 1 liter per every 0.35 mole of dihalofluorescein, and in one embodiment no more than about 1 liter per every 2 moles of dihalofluorescein, in another embodiment no more than about 1 liter per every 1.5 moles of dihalofluorescein, and in yet another embodiment no more than about 1 liter per every 1 mole of dihalofluorescein, although the relative amounts can be outside of these ranges.

The mixture of dihalofluorescein, amine, optional zinc halide, optional base, and optional solvent is then heated to any effective temperature, in one embodiment at least about 62° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges.

The mixture of dihalofluorescein, amine, optional zinc halide, optional base, and optional solvent is heated for any effective period of time, in one embodiment at least about 5 minutes, in another embodiment at least about 2 hours, and in yet another embodiment at least about 3 hours, and in one embodiment no more than about 4 days, in another embodiment no more than about 60 hours, and in yet another embodiment no more than about 40 hours, although the time can be outside of these ranges.

If desired, the resulting chromogen product can be purified by pouring the reaction mixture into an organic non-water-soluble and non-water-miscible solvent in which the product is soluble or miscible and in which undesirable salt byproducts are not soluble, such as methyl isobutyl ketone, toluene, hexane, heptane, or the like, followed by admixing the solvent containing the product with water in a separatory funnel and separating the aqueous and organic phases.

The crude chromogen product can then, if desired, be further purified by washing it with aqueous EDTA to remove metal salts, followed by washing with water. If desired, a titration or other instrumental technique, such as AA (atomic absorption) or ICP (inductively coupled plasma) can be performed to determine if the metal salts have been completely removed. The purified product can be isolated by distilling off any solvents.

Various substituents can be placed on the rings of the chromogens of the present invention by any desired or effective method, such as, for example, the methods disclosed in U.S. Pat. No. 5,847,162 and U.S. Pat. No. 1,991,482, the disclosures of each of which are totally incorporated herein by reference.

Additional numbers of carbon atoms can be placed on the central structure by, for example, selecting long chain amines as reactants. Examples of such compounds include (but are not limited to) those of the formulae

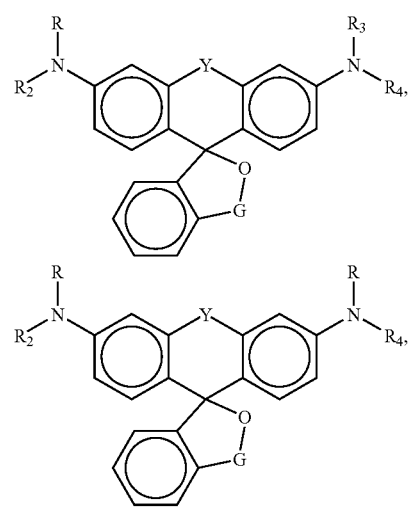

-continued

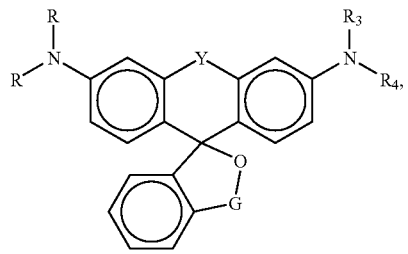

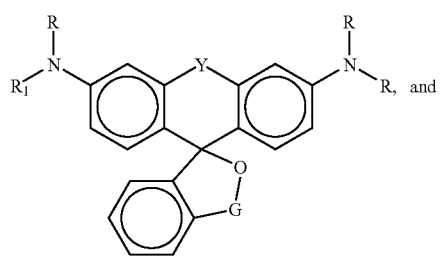

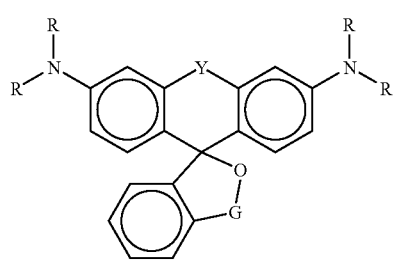

wherein Y, $R_1$, $R_2$, $R_3$, and $R_4$ have the same definitions as given hereinabove, G is either

and (1) R is a linear alkyl group of the formula $-C_nH_{2n+1}$ wherein n is at least about 12, (2) R is a branched alkyl group of the formula $-C_nH_{2n+1}$ wherein n is at least about 12, (3) R is an ether group of the formula $-(CH_2)_3-O-C_nH_{2n+1}$ wherein n is at least about 11, and the like, as well as their ring-opened, or protonated, or free-base forms and their zwitterionic forms.

Additional numbers of carbon atoms can also be placed on the central structure by, for example, first preparing the corresponding alcohols and then reacting these alcohols with, for example, high-carbon-number acids to prepare esters, high-carbon-number isocyanates to prepare urethanes, or the like. Examples of such compounds include (but are not limited to) those of the formulae

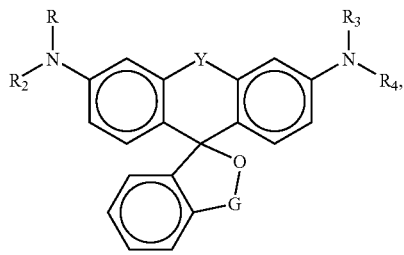

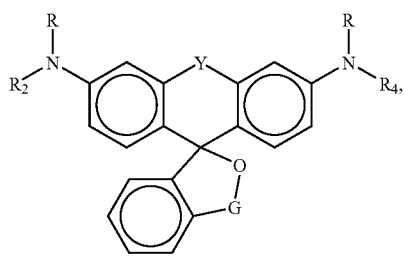

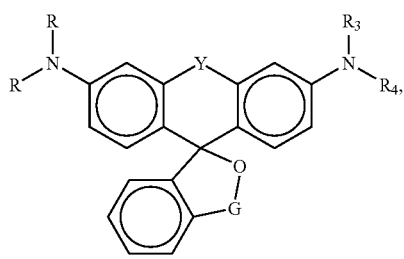

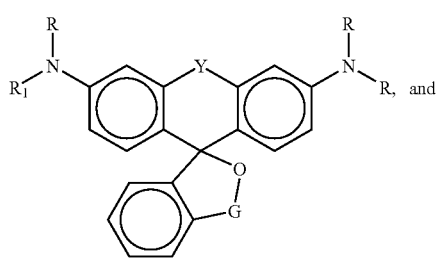

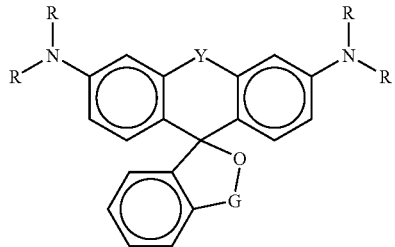

wherein Y, $R_1$, $R_2$, $R_3$, and $R_4$ have the same definitions as given hereinabove, G is either

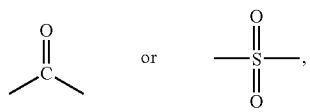

and (1) R is a group of the formula

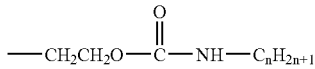

wherein n is at least about 12, (2) R is a group of the formula

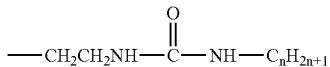

wherein n is at least about 12, (3) R is a group of the formula

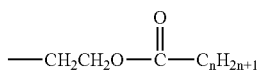

wherein n is at least about 12, (4) R is a group of the formula

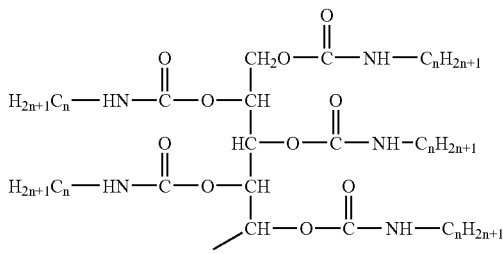

wherein n is at least about 12, (5) R is a group of the formula

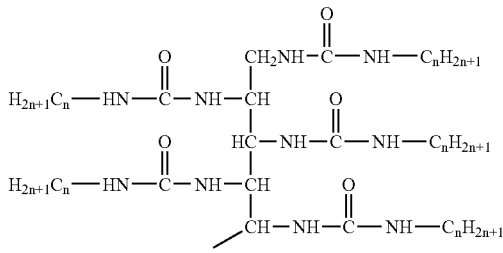

wherein n is at least about 12, (6) R is a group of the formula

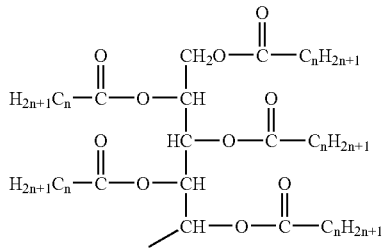

wherein n is at least about 12, (7) two R groups on the same nitrogen atom form a group, with the nitrogen atom, of the formula

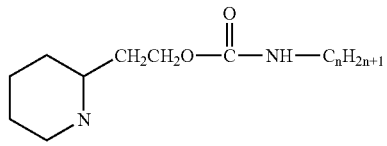

wherein n is at least about 12, (8) two R groups on the same nitrogen atom form a group, with the nitrogen atom, of the formula

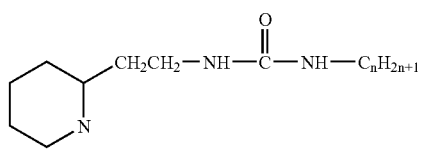

wherein n is at least about 12, (9) two R groups on the same nitrogen atom form a group, with the nitrogen atom, of the formula

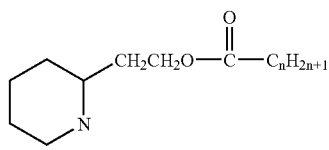

wherein n is at least about 12, and the like, as well as their ring-opened, or protonated, or free-base forms and their zwitterionic forms.

Some specific examples of such compounds include (a) those of the formulae
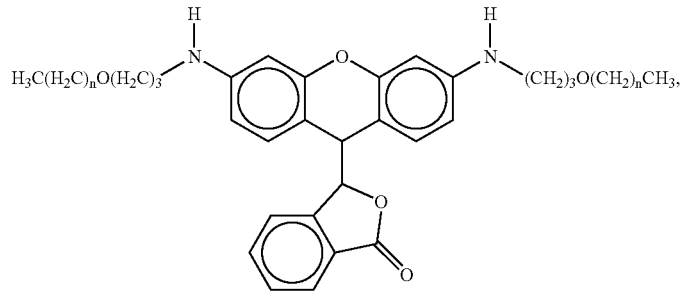
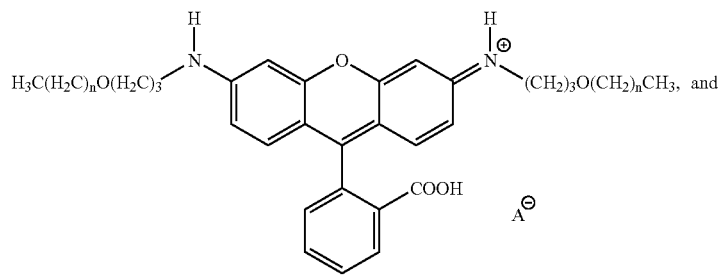
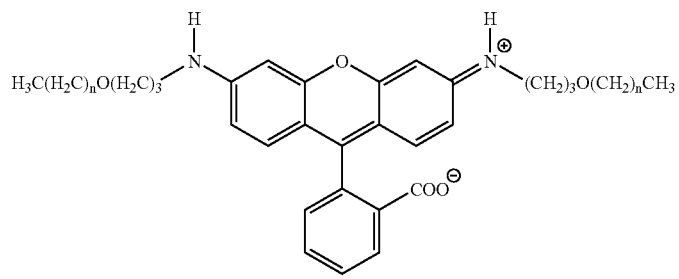
wherein n is at least about 11, (b) those of the formulae
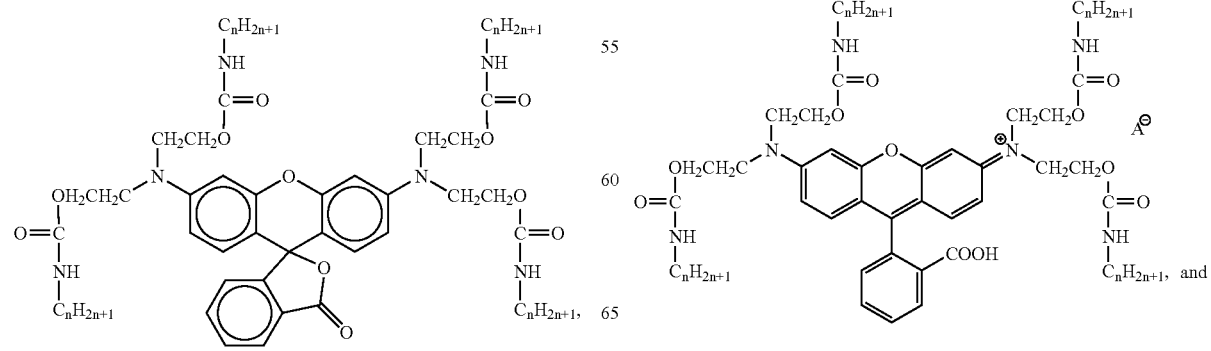

-continued
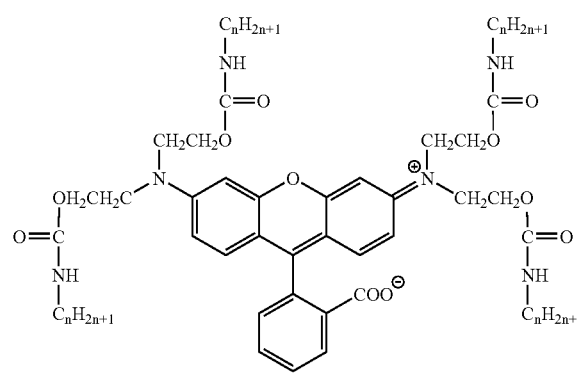
wherein n is at least about 12, (c) those of the formulae
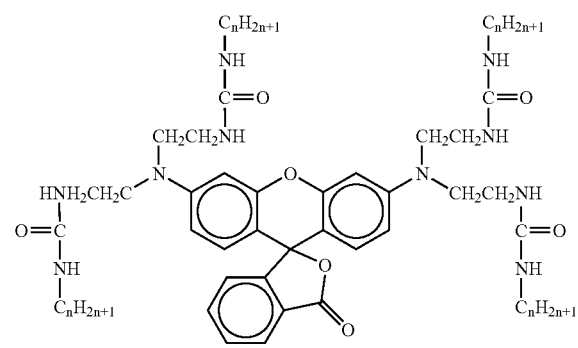
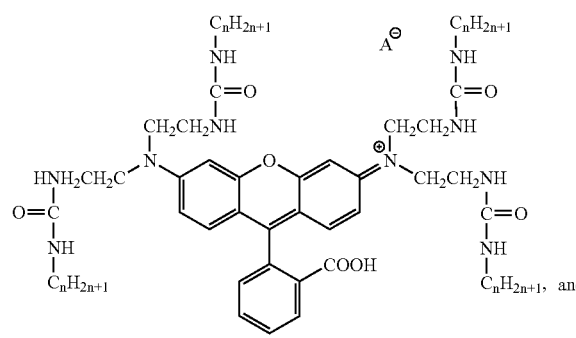
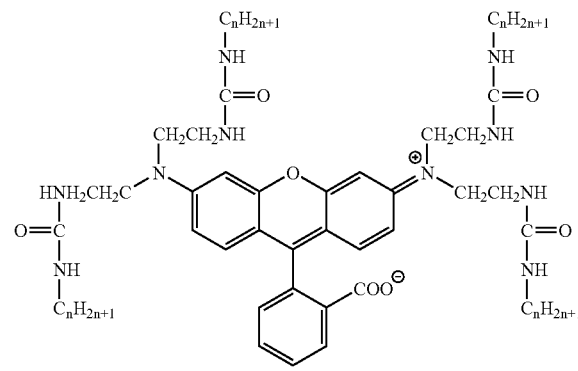
wherein n is at least about 12, (d) those of the formulae
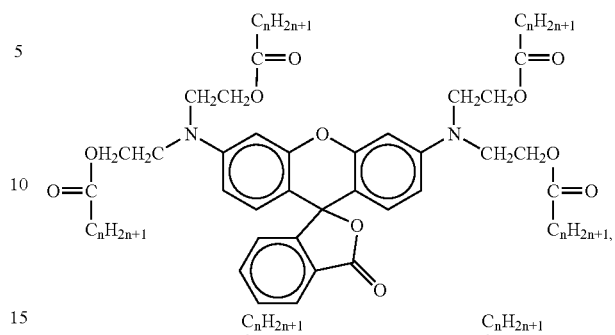
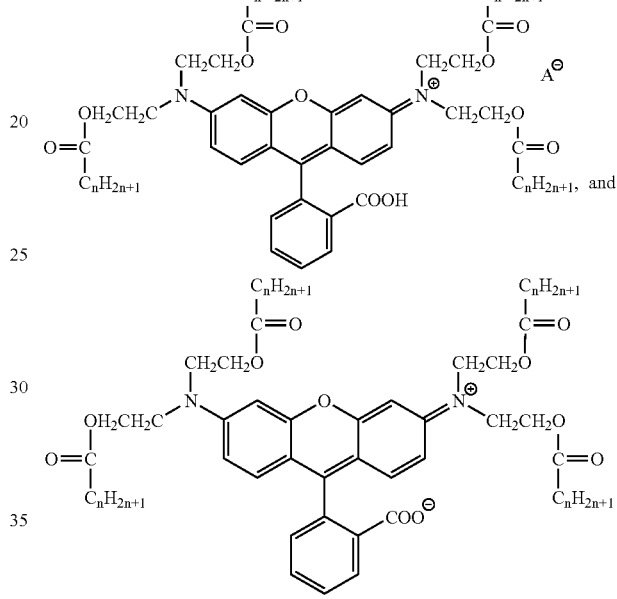
wherein n is at least about 12, (e) those of the formulae
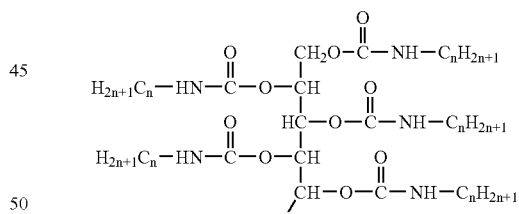
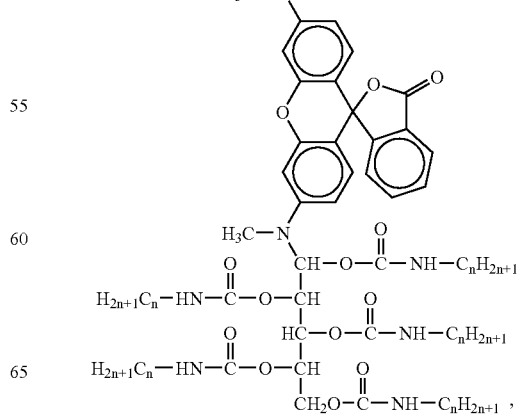

35
-continued
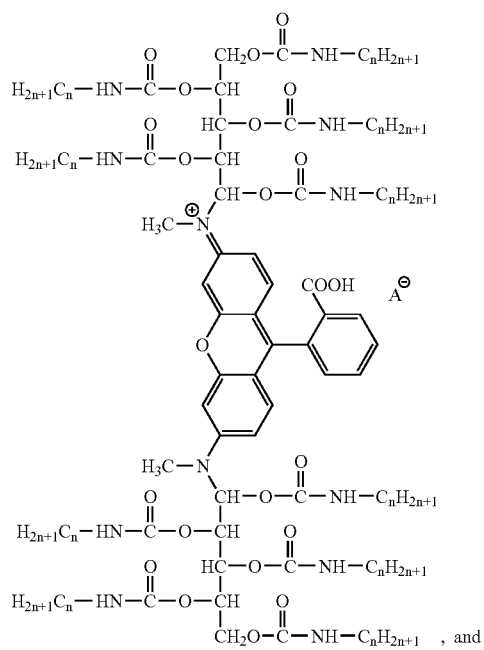
, and
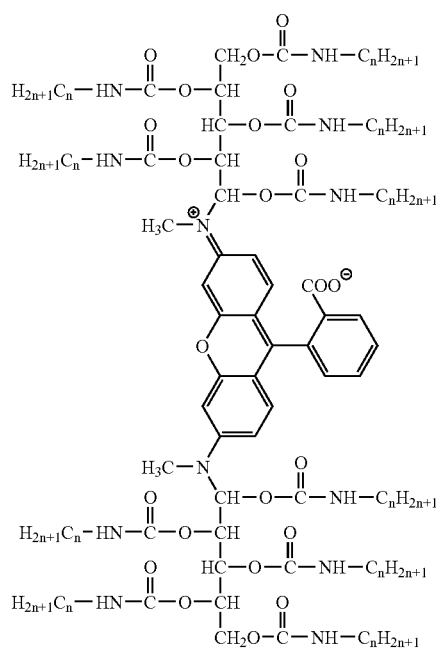
36
wherein n is at least about 12, (f) those of the formulae
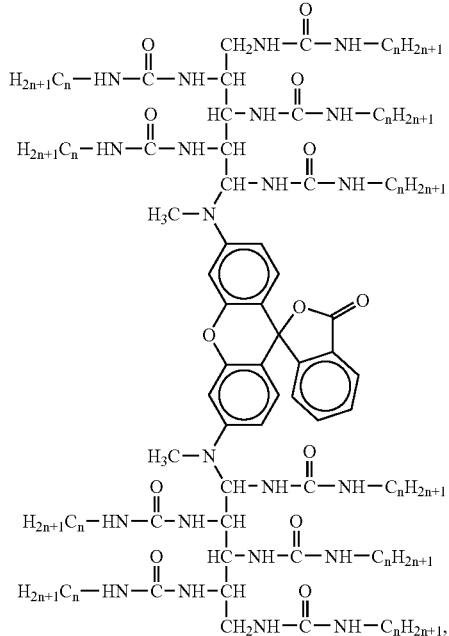
, and

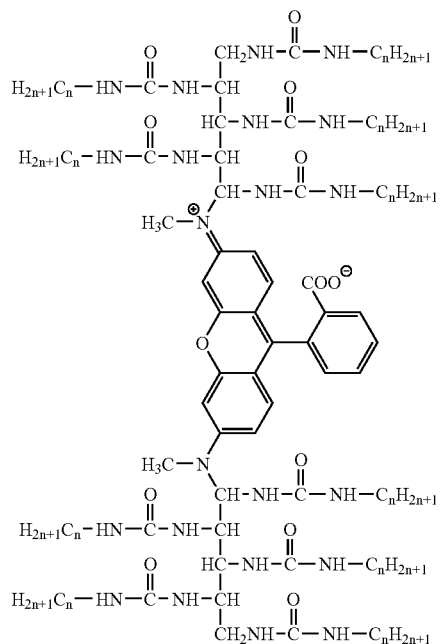
wherein n is at least about 12, (g) those of the formulae
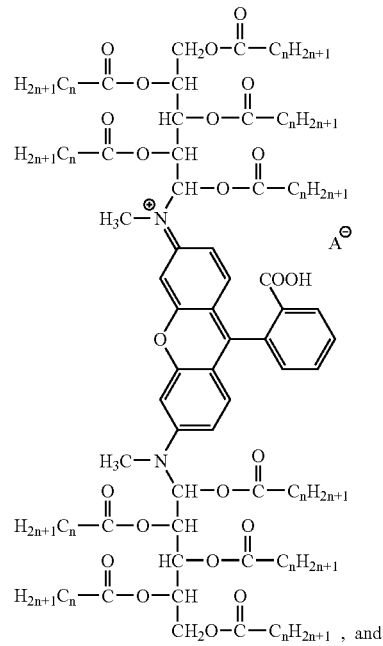
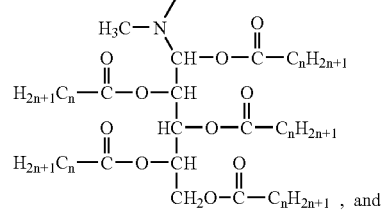
, and
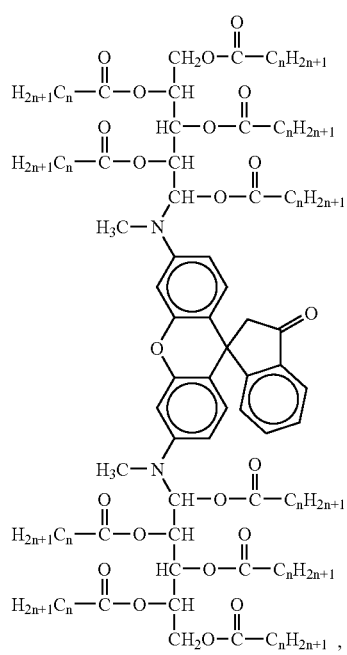
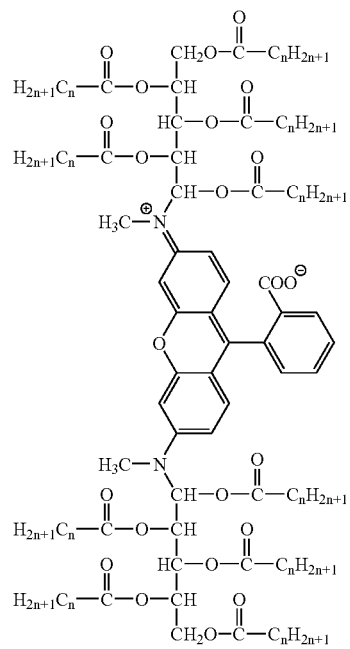

wherein n is at least about 12, (h) those of the formulae
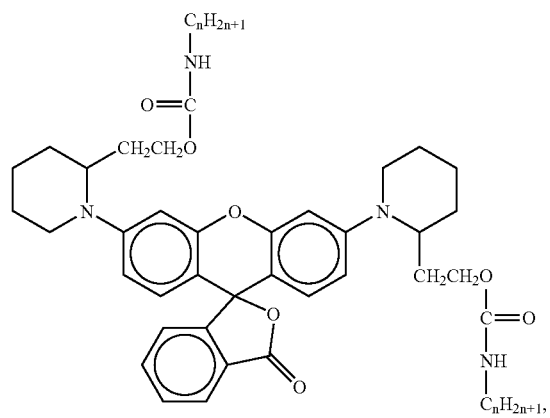
wherein n is at least about 12, (i) those of the formulae
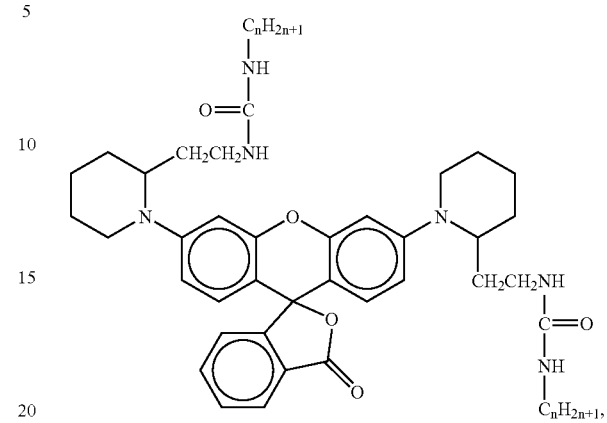
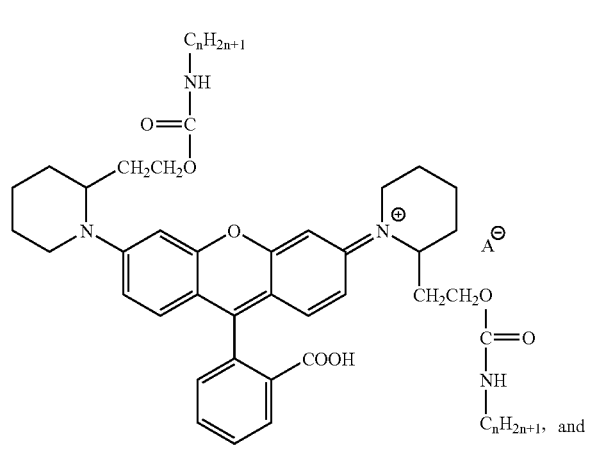
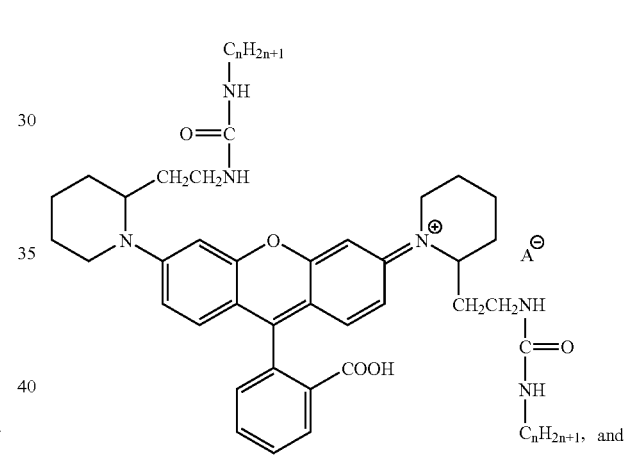
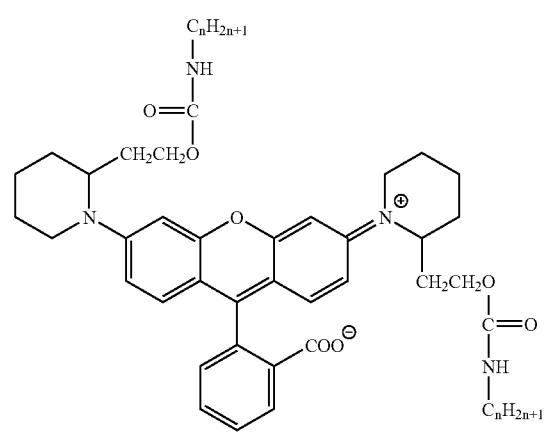
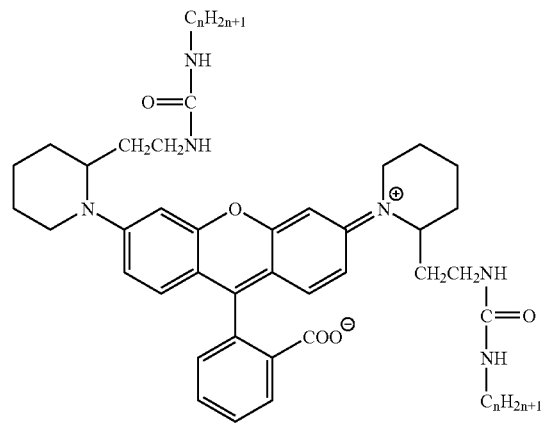

wherein n is at least about 12, (j) those of the formulae
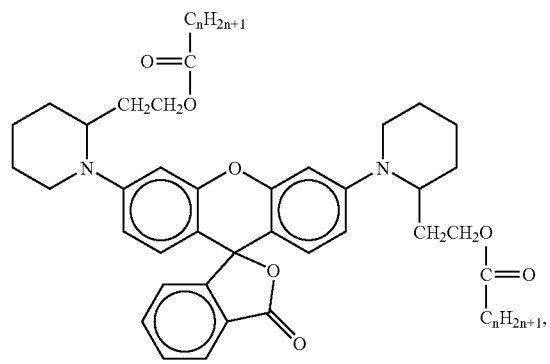
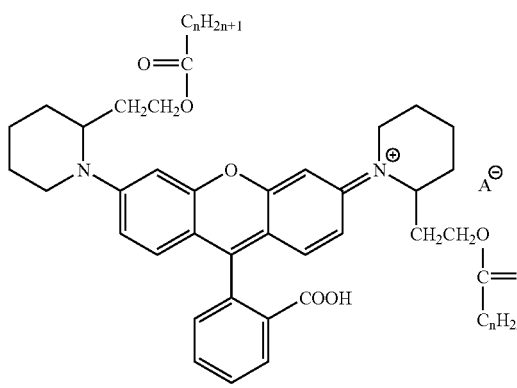
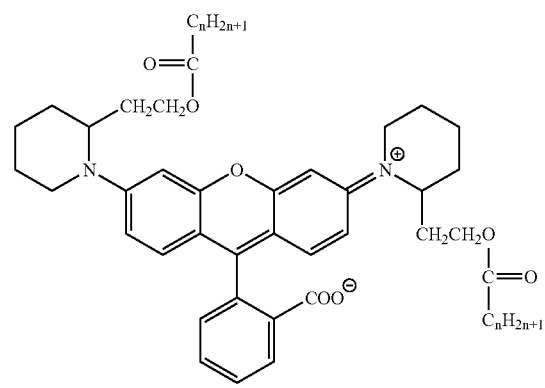
wherein n is at least about 12, (k) those of the formulae
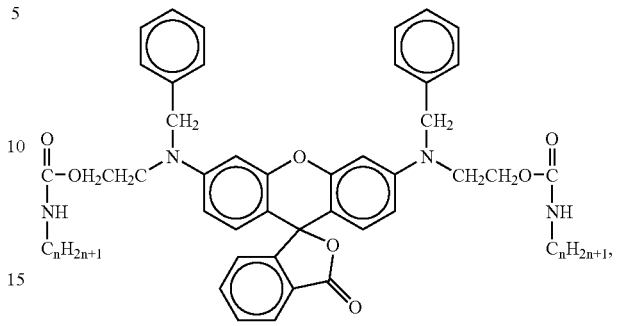
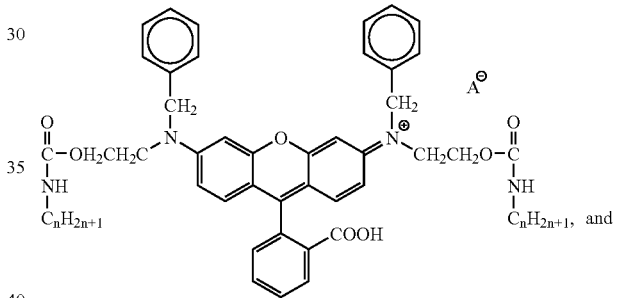
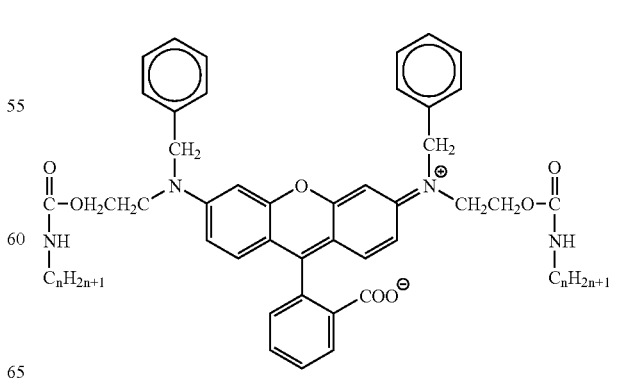

wherein n is at least about 12, (l) those of the formulae
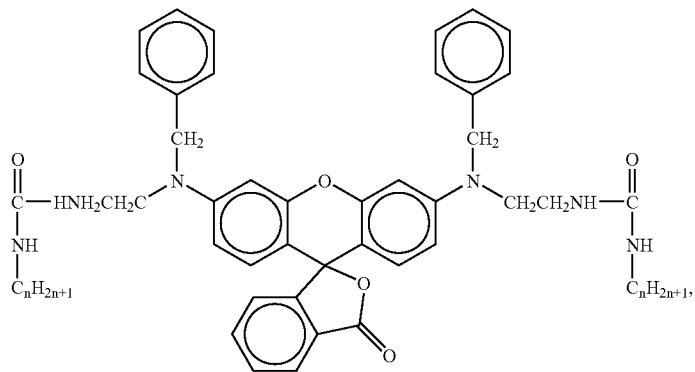
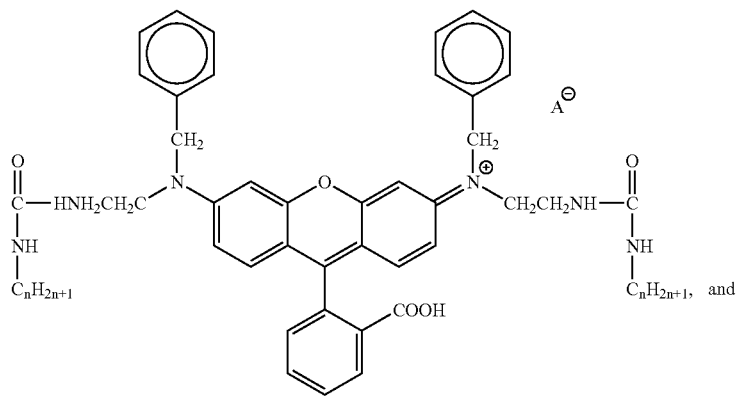
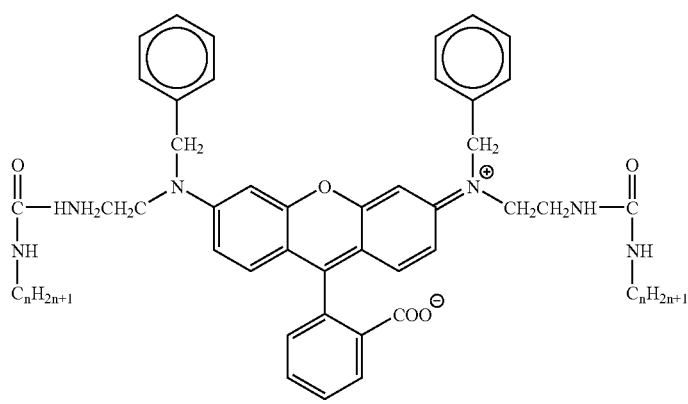

wherein n is at least about 12, (m) those of the formulae
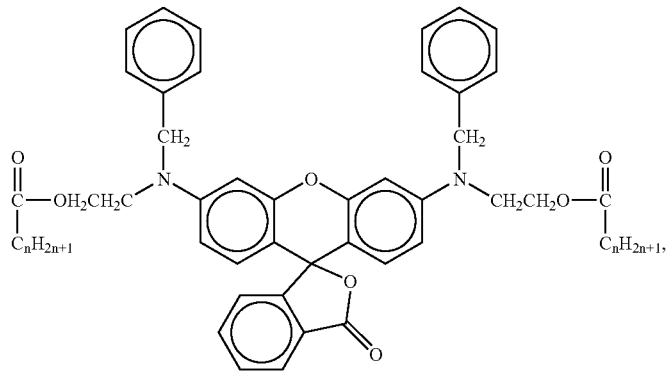
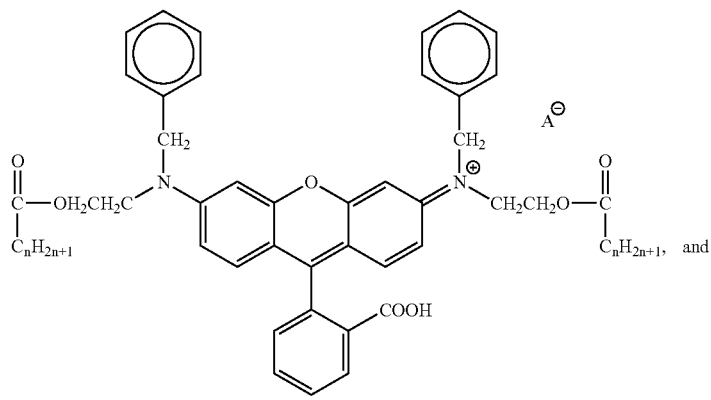
and
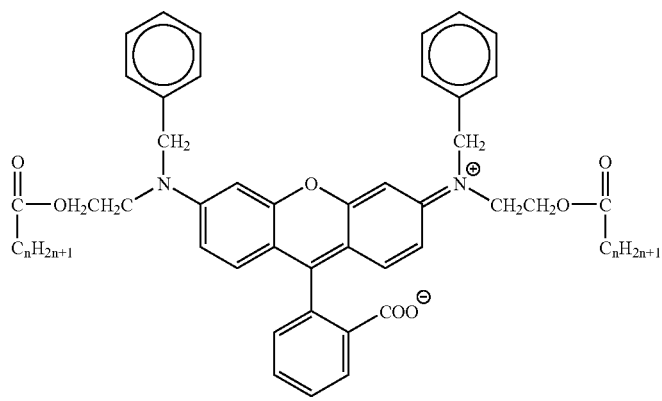

wherein n is at least about 12, (n) those of the formulae
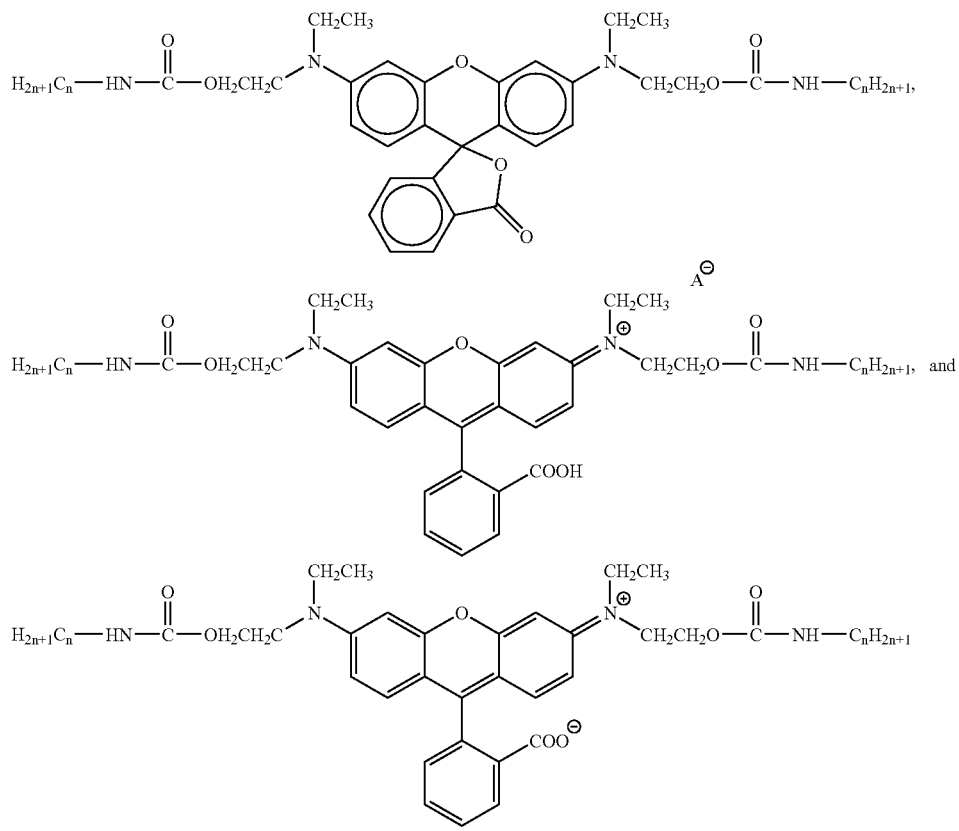
wherein n is at least about 12, (o) those of the formulae
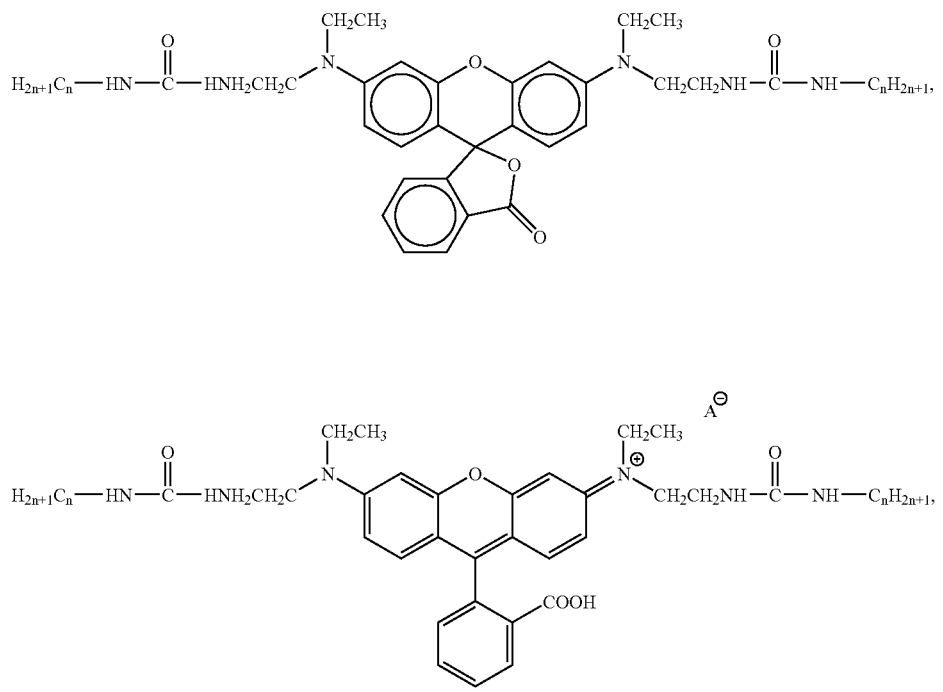

-continued

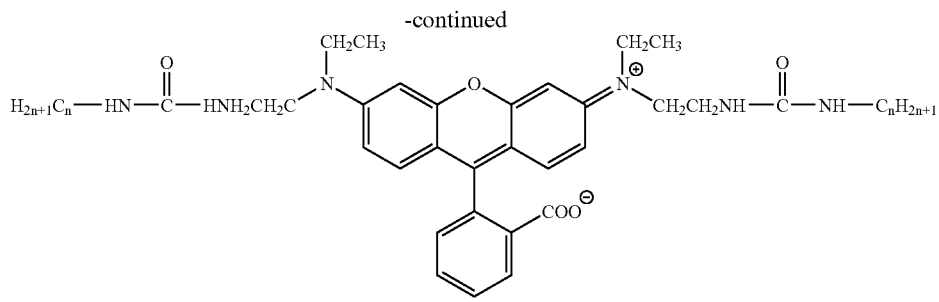

wherein n is at least about 12, (p) those of the formulae

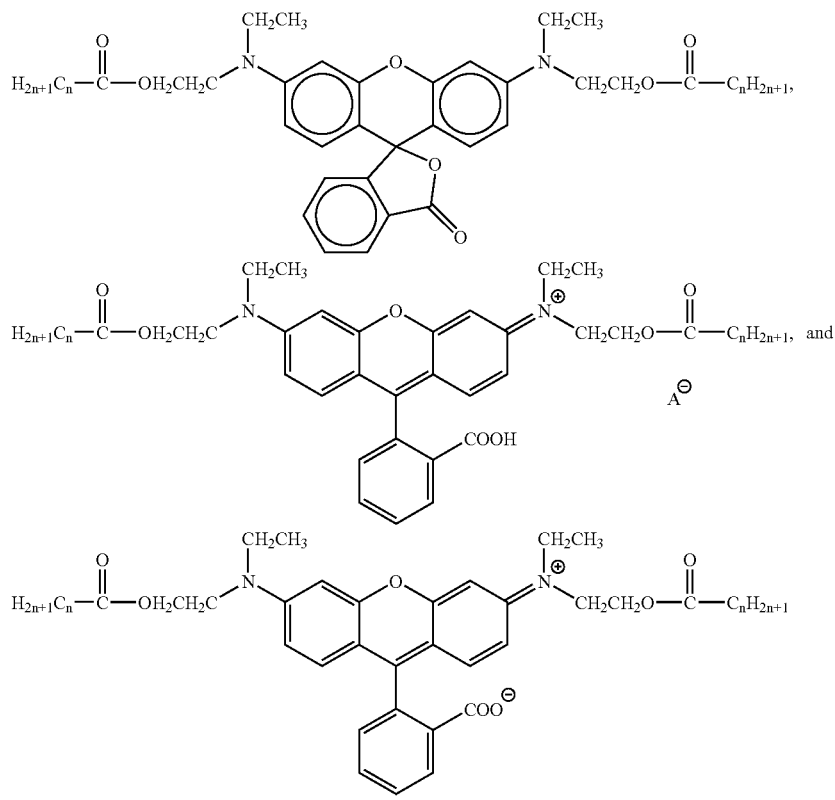

wherein n is at least about 12, and the like.

The chromogen can then be formed into a metal compound colorant by admixing it with an appropriate metal salt, optionally in the presence of a solvent, such as acetone, toluene, methyl isobutyl ketone, or the like.

Examples of suitable metals are provided hereinabove. Examples of suitable salts include those formed from the desired metal and any desired or effective anions, including (but not limited to) $F^-$, $Cl^-$, $Br^-$, $I^-$, $SCN^-$, $CF_3SO_3^-$, $[C_{10}H_8(SO_3)_2]^{2-}$, $CH_3$—$C_6H_4$—$SO_3^-$, $PF_6^-$, $ClO_4^-$, $NO_2$—$C_6H_4$—$SO_3^-$, $NH_2$—$C_6H_4$—$SO_3^-$, $SCN^-$, dodecylbenzene sulfonate, or the like.

The chromogen and the metal salt are present in any desired or effective relative amounts, generally at least about 2 moles of chromogen per every one mole of metal salt, and higher when higher ratios of chromogen to metal or metal containing moiety are desired, although the relative amounts can be outside of these ranges.

When present, the optional solvent is present in any desired or effective amount, in one embodiment at least about 1 liter per every 0.01 mole of chromogen, in another embodiment at least about 1 liter per every 0.04 mole of chromogen, and in yet another embodiment at least about 1 liter per every 0.08 mole of chromogen, and in one embodiment no more than about 1 liter per every 0.5 mole of chromogen, in another embodiment no more than about 1 liter per every 0.1 mole of chromogen, and in yet another embodiment no more than about 1 liter per every 0.09 mole of chromogen, although the relative amounts can be outside of these ranges.

The chromogen and the metal salt are allowed to react for any desired or effective period of time, in one embodiment at least about 0.5 hour, in another embodiment at least about 8 hours, and in yet another embodiment at least about 12 hours, and in one embodiment no more than about 96 hours, in another embodiment no more than about 48 hours, and in yet another embodiment no more than about 24 hours, although the time can be outside of these ranges.

The chromogen and the metal salt are allowed to react at any desired or effective temperature, in one embodiment at least about 25° C., in another embodiment at least about 55° C., and in yet another embodiment at least about 100° C., and in one embodiment no more than about 190° C., in another embodiment no more than about 150° C., and in yet another embodiment no more than about 110° C., although the time can be outside of these ranges. When an optional solvent is used, generally lower temperatures can be employed, whereas when the reaction is run neat, the temperature is sufficiently high to render the chromogen molten.

The resulting product can then be isolated by any desired or effective method, such as by distilling off the solvent, cooling the reaction mixture (when the product is soluble in the solvent at elevated temperatures and insoluble in the solvent at lowered temperatures), or the like.

Another embodiment of the present invention is directed to a compound comprising the reaction product of (a) a chromogen of the formula

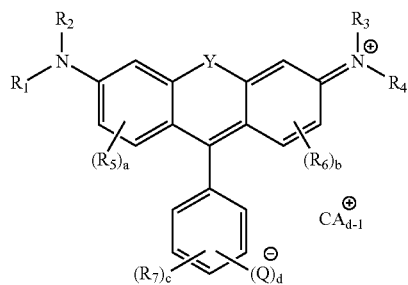

and (b) a metal salt of which the metal portion is either (1) a metal ion having a positive charge of +p wherein p is an integer which is at least 2, said metal ion being capable of forming a compound with at least two

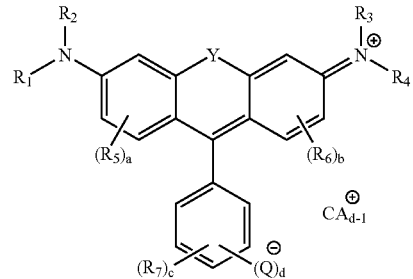

moieties, or (2) a metal-containing moiety capable of forming a compound with at least two

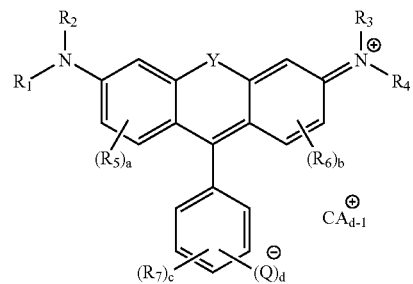

moieties.

While not being limited to any particular theory, it is believed that in at least some embodiments of the present invention and with at least some metal cations or metal-containing moieties, coordination complexes may form. For example, when Q⁻ is a carboxylate anion, d is 1, and the metal is capable of coordinating to four ligands, a metal colorant compound according to the present invention may have the formula

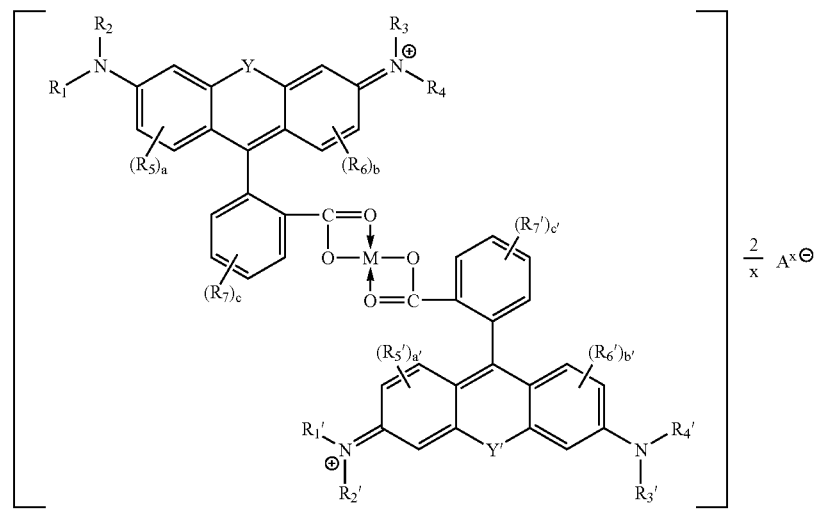

wherein the arrowheaded bonds represent coordination bonds between lone pairs of electrons on a carbonyl group and the metal. For example, when M is a metal that makes square planar coordination complexes, the metal colorant compound may have the structure

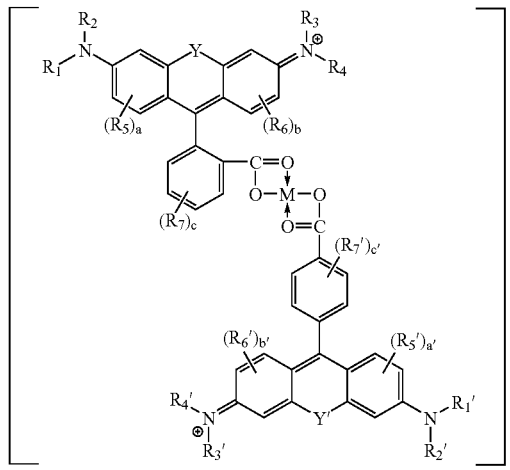

When M is a metal that makes tetrahedral coordination complexes, the metal colorant compound may have the structure

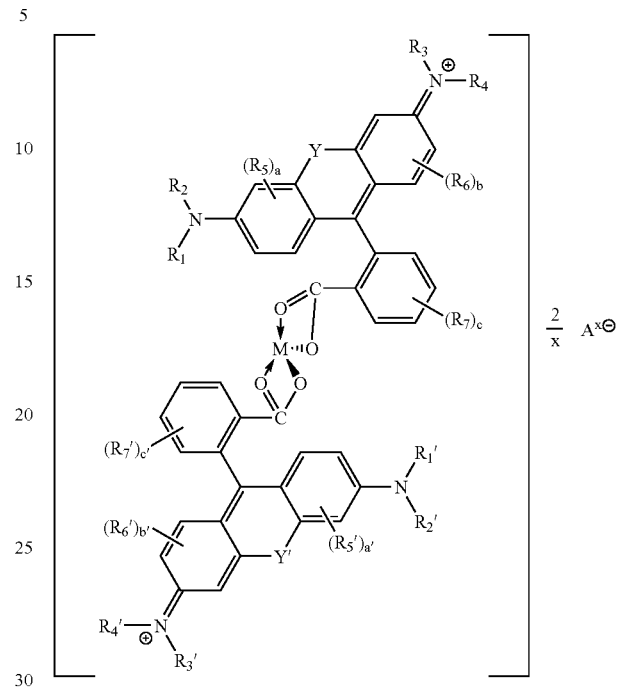

When $Q^-$ is a carboxylate anion, d is 1, and the metal is capable of coordinating to six ligands, making octahedral coordination complexes, the metal colorant compound may have the structure

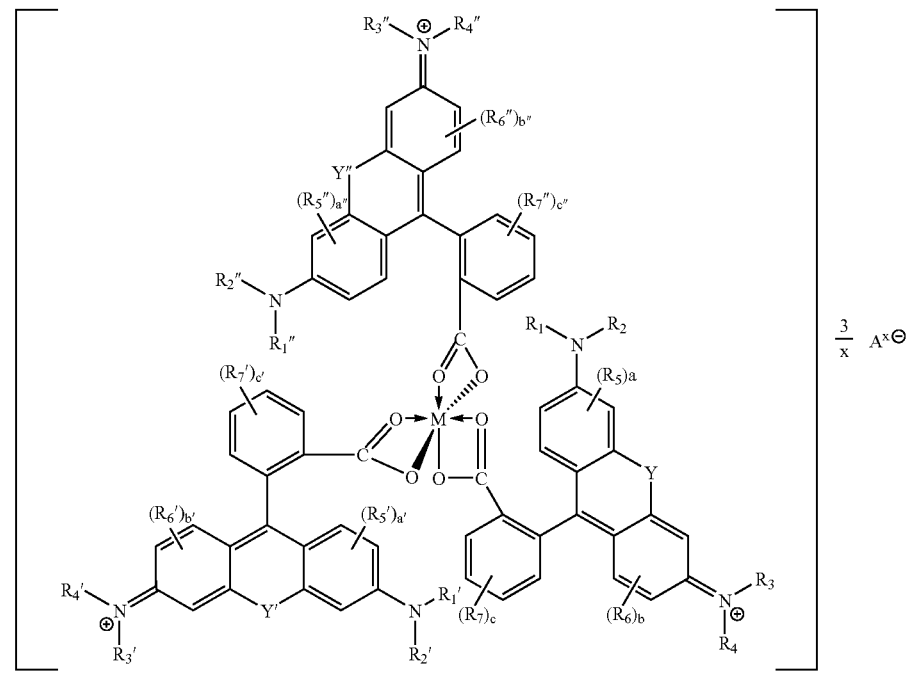

It is believed that sulfonate anions will form complexes similar to those formed by carboxylate anions.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE IA

Synthesis of Dichlorofluorescein

A mixture of fluorescein (100 grams, 0.331 mole; obtained from Aldrich Chemical Co., Milwaukee, Wis.) and $PCl_5$ (128.5 grams, 0.62 mole; obtained from Aldrich Chemical Co.) in 650 milliliters of chlorobenzene was stirred and heated to 140° C. in a 1 liter round bottom flask equipped with a reflux condenser. After 6 hours of heating, the reflux condenser was replaced with a distillation setup, and $POCl_3$ formed during the reaction as well as the chlorobenzene were distilled off. After all of the $POCl_3$ and chlorobenzene were removed, 300 grams of N-methylpyrrolidinone was added and the resulting mixture was heated to 100° C. with stirring until all of the crude dichlorofluorescein dissolved. The solution was then poured into a 4 liter beaker containing 1 liter of deionized water. A tan solid precipitated out and was collected on a filter and dried in a vacuum oven. The final tan solid matched the IR, NMR, and TLC of commercially available dichlorofluorescein.

Other synthetic processes can also be used. For example, a one-pot process using DMF solvent can be employed wherein the $POCl_3$ intermediate is not distilled off but is removed by reaction with methanol, which also precipitates the dichlorofluorescein as a white solid. Methods using toluenesulfonylchloride, a less reactive and corrosive chlorinating agent than $PCl_5$, can also be used.

EXAMPLE IB

Synthesis of Tetrastearyl Colorant

A mixture of dichlorofluorescein (105 grams, 0.284 mole, prepared as described above), calcium oxide (24 grams, 0.62 mole; obtained from Aldrich Chemical Co., Milwaukee, Wis.), $ZnCl_2$ (116 grams, 0.85 mole; obtained from Aldrich Chemical Co.), and distearyl amine (288 grams, 0.585 mole; ARMEEN 2HT, obtained from Akzo-Nobel, McCook, Ill.) in 650 milliliters of tetramethylene sulfone (obtained from Chevron Phillips Chemical Co., LP, The Woodlands, Tex.) was stirred and heated to 190° C. in a 1 liter round bottom flask. After 10 hours of heating, the deeply magenta colored mixture was cooled to 120° C. and poured into 2.5 liters of methyl isobutyl ketone (MIBK) and stirred until totally dissolved.

EXAMPLE IC

Purification of Tetrastearyl Colorant

The solution of crude tetrastearyl colorant in MIBK was then transferred to a 4 liter separatory funnel. Three aqueous EDTA washes were then performed (50 grams of the tetrasodium salt of EDTA in 1,000 milliliters of water for each wash) to remove all of the zinc and calcium salts in the crude reaction product. The product, dissolved in MIBK, remained on the top layer with the water/EDTA chelated metal waste on the bottom layer, which was discarded. Two washes with deionized water (1 liter each) were then performed. At this point, the MIBK solution was no longer magenta, but a faint orangeish-red color. The lack of a brilliant magenta color at this point indicated a ring-closed, or free base, form of the colorant, believed to be of the formula

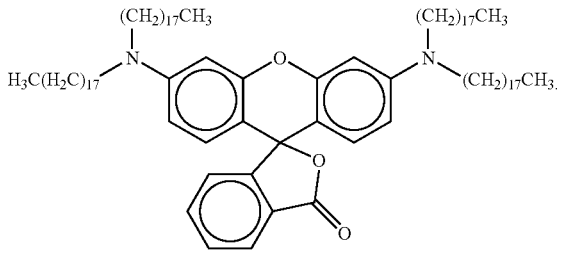

EXAMPLE ID

Isolation of Tetrastearyl Colorant

The solution of the ring-closed, purified tetrastearyl colorant in MIBK was then transferred to a 2 liter round bottom flask with distillation setup. The MIBK and residual water were distilled off and the product, a slightly viscous wax when hot, was transferred to a jar and allowed to harden. The wax was a deep red colored, somewhat hard wax when cooled to room temperature.

EXAMPLE IE

Protonation of Tetrastearyl Colorant 250 grams of the solid, ring-closed, purified tetrastearyl colorant prepared in Example ID was then transferred to a 1 liter beaker and 500 milliliters of MIBK were added and allowed to dissolve the solid with stirring. A stoichiometric amount of dodecyl benzene sulfonic acid was added to this solution and stirred for 1 hour. A deep magenta hue was observed with the addition of the acid. The solution was then transferred to a distillation setup and the MIBK removed. The molten ring-opened waxy colorant was then transferred to an aluminum tin and allowed to cool to room temperature. The ring-opened, or protonated, or free-base form of this colorant is believed to be of the formula

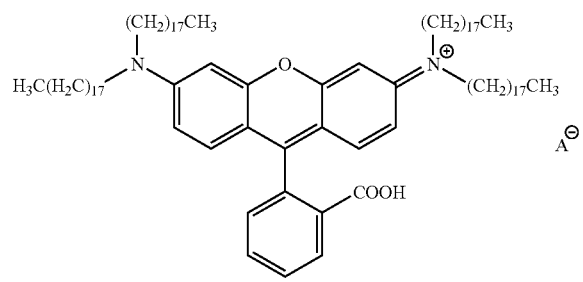

wherein A is the anion corresponding to the acid used for protonaton. The zwitterionic form of this colorant is believed to be of the formula

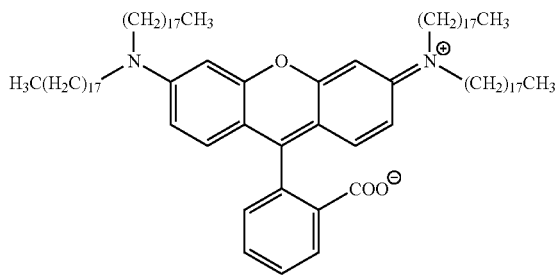

The process was repeated a number of times substituting for dodecyl benzene sulfonic acid the following acids: p-toluene sulfonic acid; hydrochloric acid; trifluoroacetic acid; methyl sulfonic acid; trifluoromethyl sulfonic acid; and hydrobromic acid. Similar results were observed in all cases.

EXAMPLE IF

Preparation of Zinc Tetrastearyl Colorant

To a 1-liter 3-necked roundbottom flask with TEFLON® coated magnet and silicone oil bath was added 229 grams of the ring-closed purified tetrastearyl chromogen and 200 grams of MIBK. The mixture was heated to reflux. Thereafter, about 12.2 grams of $ZnCl_2$ (obtained from Aldrich Chemical Co., Milwaukee, Wis.) was added in a stoichiometric amount of 2 moles of zinc chloride per every one mole of tetrastearyl chromogen. The solution was stirred for about 18 hours. Thereafter, the MIBK was distilled off. The product, a slightly viscous wax when warm, was transferred to a jar and allowed to harden. At room temperature, the product was a deep magenta/red colored somewhat hard wax, believed to be a coordination compound of the formula

EXAMPLE IIB

The process of Example IB was repeated except that dioctyl amine ($NH((CH_2)_7CH_3)_2$, obtained from Aldrich Chemical Co., Milwaukee, Wis.) was used instead of distearyl amine. The dioctyl amine was present in an amount of 1.95 moles of dioctyl amine per every one mole of dichlorofluorescein.

EXAMPLE IIC

The process of Example IC was repeated using the product obtained in Example IIB. It is believed that the purified product was of the formula

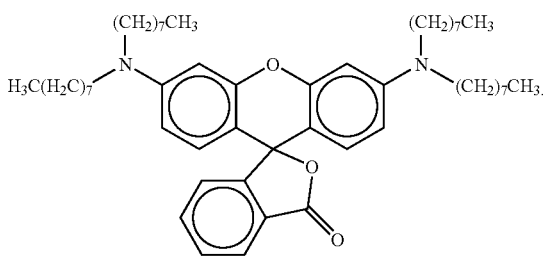

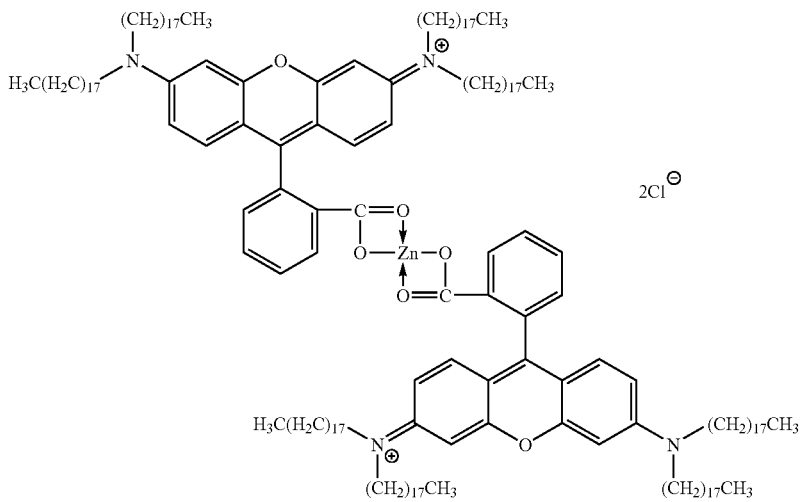

The ring-opened, or protonated, or free-base form of this colorant is believed to be of the formula

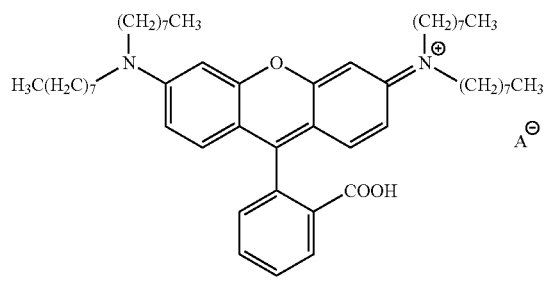

wherein A is the anion corresponding to the acid used for protonaton. The zwitterionic form of this colorant is believed to be of the formula

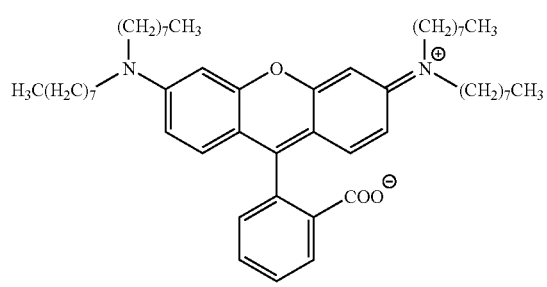

EXAMPLE IID

The process of Example ID was repeated using the product obtained in Example IIC.

EXAMPLE IIIB

The process of Example IB was repeated except that the reaction was run with 2.05 moles of stearyl amine per every one mole of dichlorofluorescein.

EXAMPLE IIIC

The process of Example IC was repeated using the product obtained in Example IIIB. It is believed that the purified product was of the formula

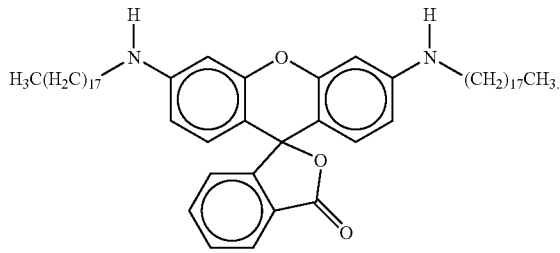

The ring-opened, or protonated, or free-base form of this colorant is believed to be of the formula

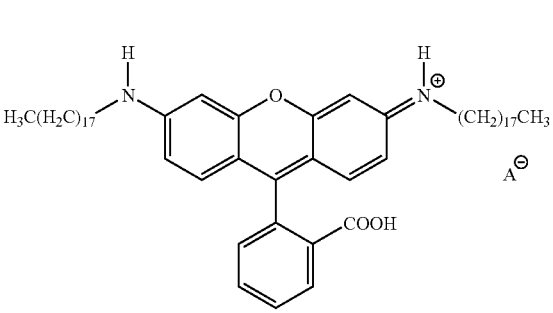

wherein A is the anion corresponding to the acid used for protonaton. The zwitterionic form of this colorant is believed to be of the formula

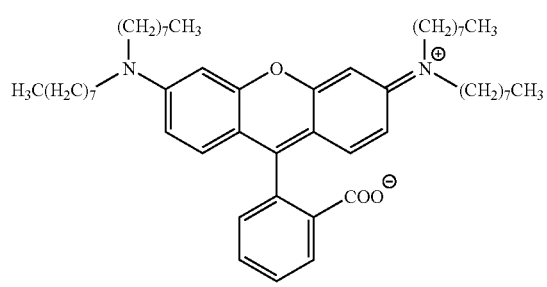

EXAMPLE IIID

The process of Example ID was repeated using the product obtained in Example IIIC.

EXAMPLE IVB

The process of Example IB was repeated except that PRIMENE JM-T (obtained from Rohm and Haas Company, Philadelphia, Pa.), of the formula

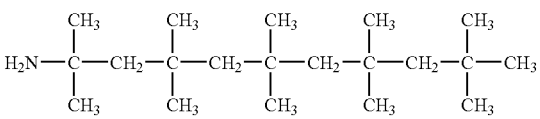

was used instead of distearyl amine. The PRIMENE JM-T was present in an amount of 2 moles of PRIMENE JM-T per every one mole of dichlorofluorescein.

EXAMPLE IVC

The process of Example IC was repeated using the product obtained in Example IVB. It is believed that the purified product was of the formula

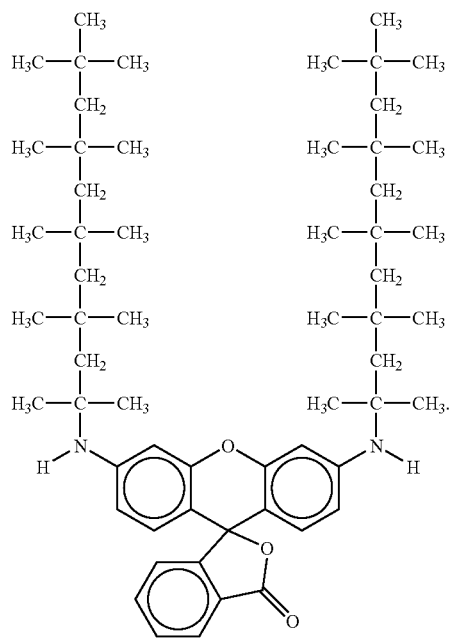

The ring-opened, or protonated, or free-base form of this colorant is believed to be of the formula

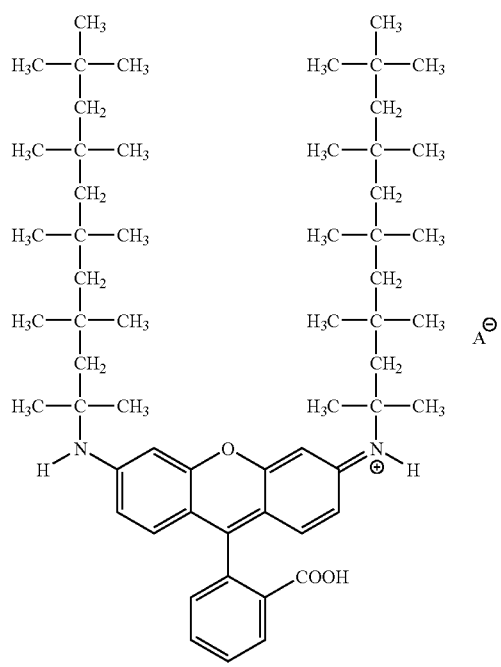

wherein A is the anion corresponding to the acid used for protonaton. The zwitterionic form of this colorant is believed to be of the formula

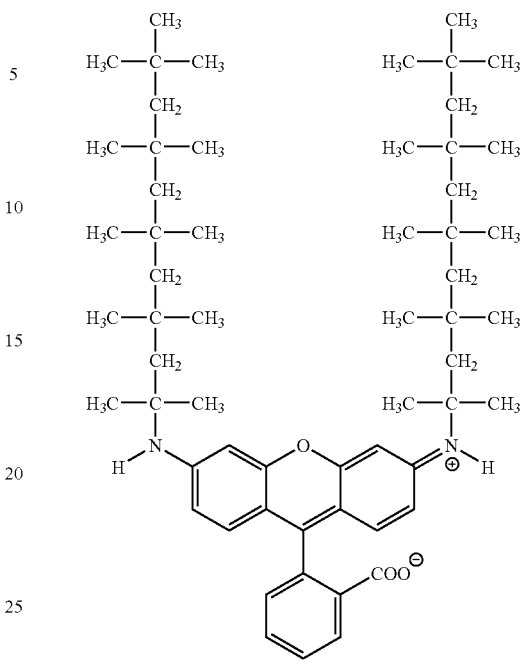

EXAMPLE IVD

The process of Example ID was repeated using the product obtained in Example IVC.

EXAMPLE VB

The process of Example IB was repeated except that UNILIN 425-PA (obtained from Tomah Products, Milton, Wis., of the formula $CH_3(CH_2)_{31}-O-CH_2CH_2CH_2NH_2$) was used instead of distearyl amine. The UNILIN 425-PA was present in an amount of 2 moles of UNILIN 425-PA per every one mole of dichlorofluorescein. It is believed that the product was of the formula

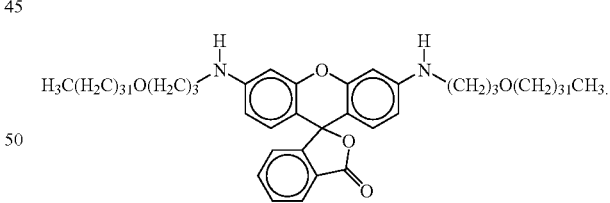

The ring-opened, or protonated, or free-base form of this colorant is believed to be of the formula

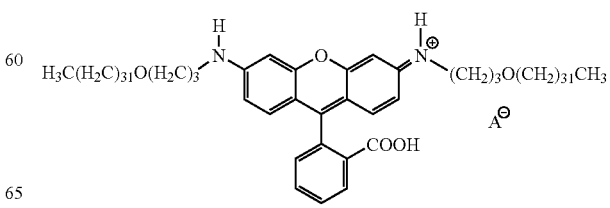

wherein A is the anion corresponding to the acid used for protonaton. The zwitterionic form of this colorant is believed to be of the formula

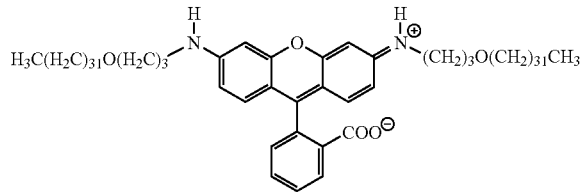

EXAMPLE VIB

The process of Example IB was repeated except that diethanol amine (obtained from Aldrich Chemical Co., Milwaukee, Wis., of the formula $HN(CH_2CH_2OH)_2$) was used instead of distearyl amine. The diethanol amine was present in an amount of 2.5 moles of diethanol amine per every one mole of dichlorofluorescein. In addition, 2 moles of zinc chloride were used per every one mole of dichlorofluorescein and 1 mole of calcium oxide was used per every one mole of dichlorofluorescein, the solvent was N-methylpyrrolidone instead of tetramethylene sulfone, and the reaction mixture was heated to 125° C. for 100 hours.

EXAMPLE VIC

The process of Example IC was repeated using the product obtained in Example VIB except that the product was poured into methanol and sufficient EDTA was added to remove all of the $Zn^{2+}$ and $Ca^{2+}$ ions. It is believed that the purified product was of the formula

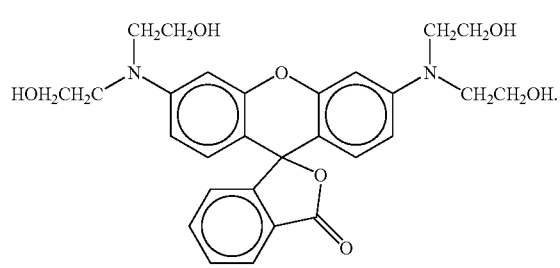

EXAMPLE VIC-1

About 10 grams of the product obtained in Example VIC is added to 23.4 grams of octadecylisocyanate (available from Aldrich Chemical Co., Milwaukee, Wis.) at 120° C., after which 2 drops of dibutyltindilaurate catalyst (available from Aldrich Chemical Co.) is added and the reaction is stirred and heated until disappearance of the isocyanate peak in the IR is observed. The tetraurethane rhodamine is poured into aluminum tins and is believed to be of the formula

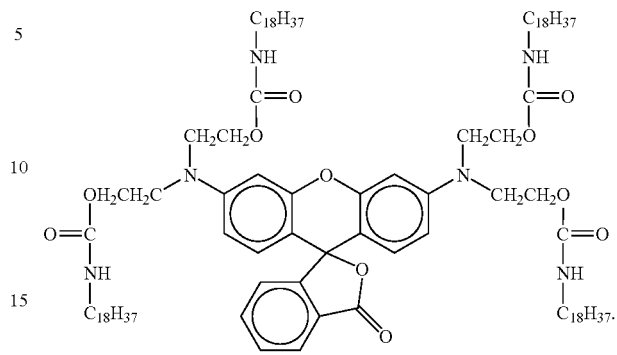

The ring-opened, or protonated, or free-base form of this colorant is believed to be of the formula

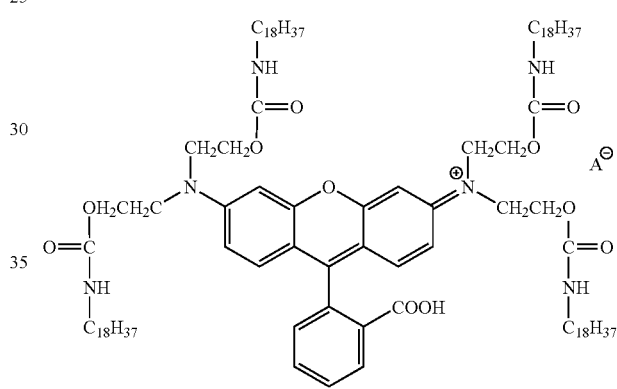

wherein A is the anion corresponding to the acid used for protonaton. The zwitterionic form of this colorant is believed to be of the formula

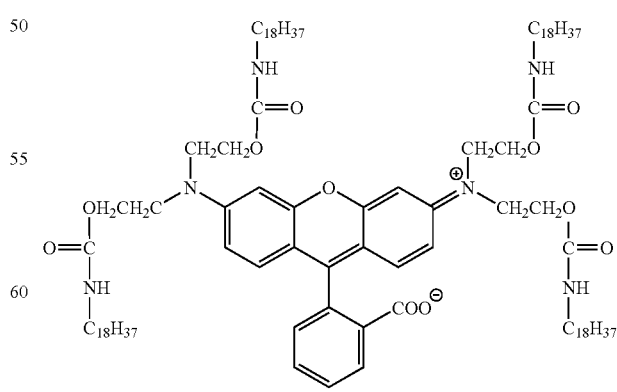

EXAMPLE VIIB

The process of Example IB was repeated except that N-methyl-D-glucamine (obtained from Aldrich Chemical Co., Milwaukee, Wis.), of the formula

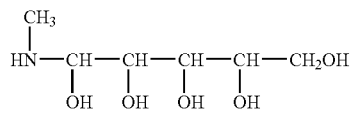

was used instead of distearyl amine. The N-methyl-D-glucamine was present in an amount of 2.5 moles of N-methyl-D-glucamine per every one mole of dichlorofluorescein. In addition, 2 moles of zinc chloride were used per every one mole of dichlorofluorescein and 1.5 moles of calcium oxide was used per every one mole of dichlorofluorescein, the solvent was N-methyl pyrrolidone instead of tetramethylene sulfone, and the reaction mixture was heated to 130° C. for 7 days.

EXAMPLE VIIC

The process of Example IC was repeated using the product obtained in Example VIIB except that the product was poured into methanol and sufficient EDTA was added to remove all of the $Zn^{2+}$ and $Ca^{2+}$ ions. It is believed that the purified product was of the formula

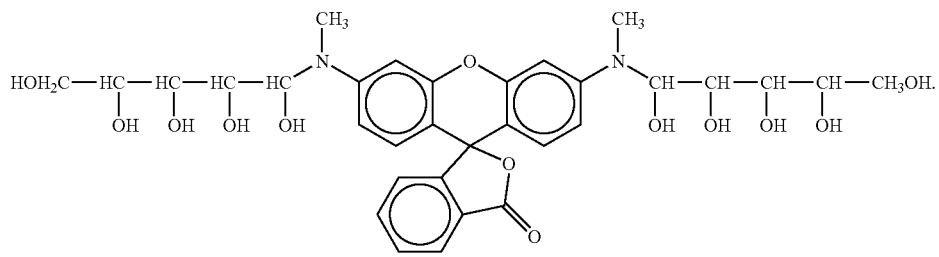

EXAMPLE VIIC-1

About 10 grams of the product obtained in Example VIIC is added to 45 grams of octadecylisocyanate (available from Aldrich Chemical Co., Milwaukee, Wis.) at 120° C., after which 4 drops of dibutyltindilaurate catalyst (available from Aldrich Chemical Co.) is added and the reaction is stirred and heated until disappearance of the isocyanate peak in the IR is observed. The deca-urethane rhodamine is poured into aluminum tins and is believed to be of the formula

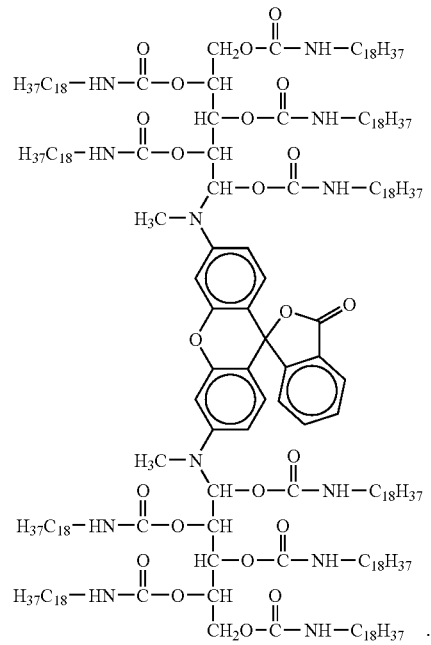

The ring-opened, or protonated, or free-base form of this colorant is believed to be of the formula

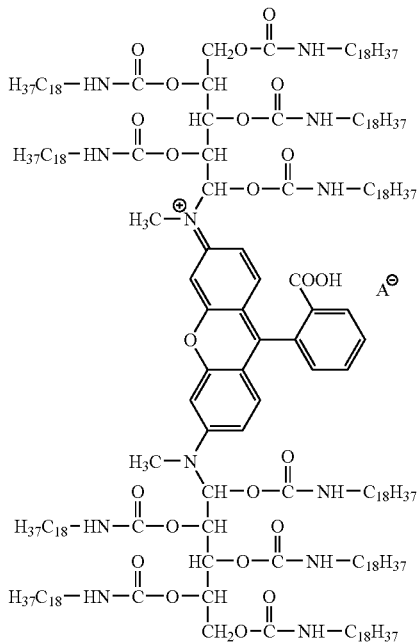

wherein A is the anion corresponding to the acid used for protonaton. The zwitterionic form of this colorant is believed to be of the formula

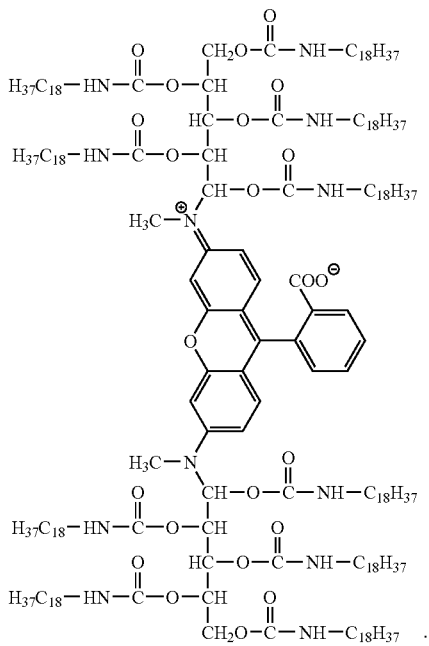

EXAMPLE VIIIB

The process of Example IB was repeated except that 2-piperidine ethanol (obtained from Aldrich Chemical Co., Milwaukee, Wis.), of the formula

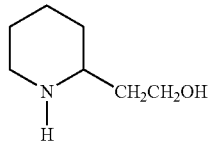

was used instead of distearyl amine. The 2-piperidine ethanol was present in an amount of 2.5 moles of 2-piperidine ethanol per every one mole of dichlorofluorescein. In addition, 2 moles of zinc chloride were used per every one mole of dichlorofluorescein and 1 mole of calcium oxide was used per every one mole of dichlorofluorescein, the solvent was N-methyl pyrrolidone instead of tetramethylene sulfone, and the reaction mixture was heated to 160° C. for 24 hours. The reaction product was then poured into water and filtered and washed with water. It is believed that the product was of the formula

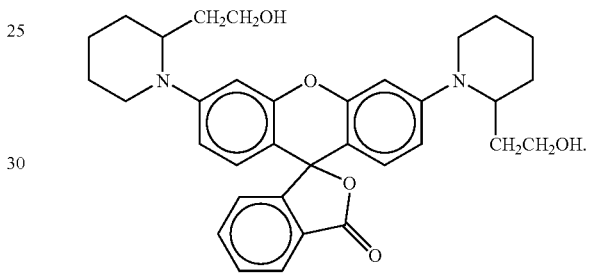

EXAMPLE VIIIC-1

About 10 grams of the product obtained in Example VIIIB is added to 10.7 grams of octadecylisocyanate (available from Aldrich Chemical Co., Milwaukee, Wis.) at 120° C., after which 1 drop of dibutyltindilaurate catalyst (available from Aldrich Chemical Co.) is added and the reaction is stirred and heated until disappearance of the isocyanate peak in the IR is observed. The di-urethane rhodamine is poured into aluminum tins and is believed to be of the formula

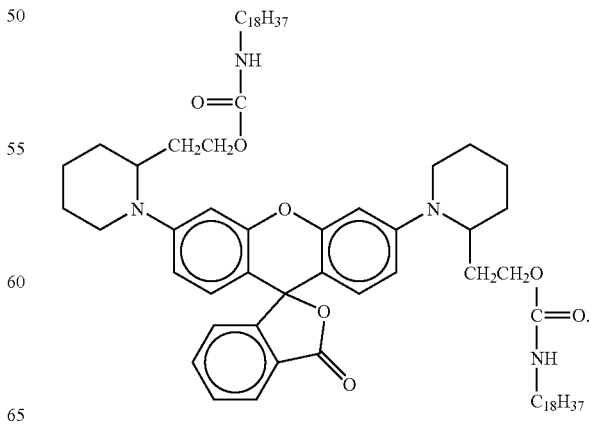

The ring-opened, or protonated, or free-base form of this colorant is believed to be of the formula

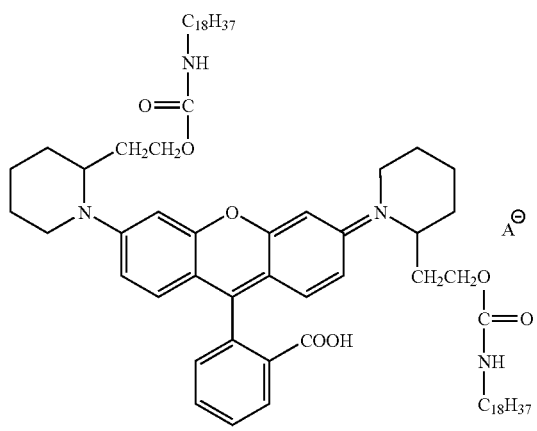

wherein A is the anion corresponding to the acid used for protonaton. The zwitterionic form of this colorant is believed to be of the formula

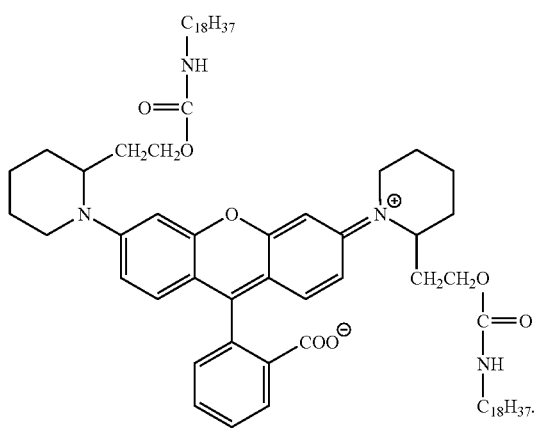

EXAMPLE IXB

The process of Example IB was repeated except that N,N-dimethyl-1,4-phenylene diamine (obtained from Aldrich Chemical Co., Milwaukee, Wis.), of the formula

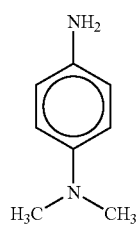

was used instead of distearyl amine. The N,N-dimethyl-1,4-phenylene diamine was present in an amount of 2.5 moles of N,N-dimethyl-1,4-phenylene diamine per every one mole of dichlorofluorescein. In addition, 2 moles of zinc chloride were used per every one mole of dichlorofluorescein and 1 mole of calcium oxide was used per every one mole of dichlorofluorescein, the solvent was N-methylpyrrolidone instead of tetramethylene sulfone, and the reaction mixture was heated to 140° C. for 48 hours. The reaction product was then poured into water and filtered and washed with water. It is believed that the product was of the formula

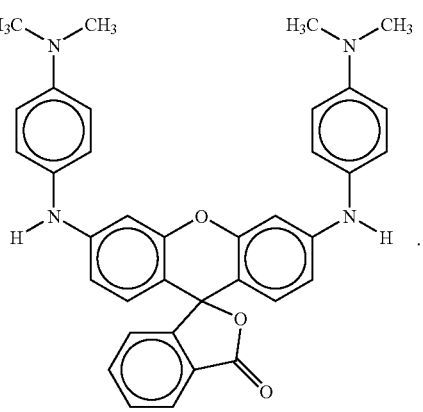

The ring-opened, or protonated, or free-base form of this colorant is believed to be of the formula

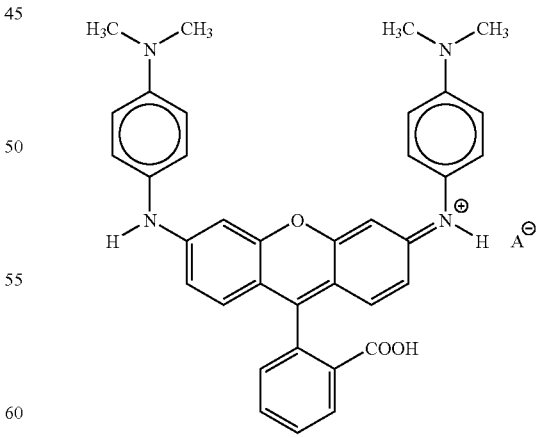

wherein A is the anion corresponding to the acid used for protonaton. The zwitterionic form of this colorant is believed to be of the formula

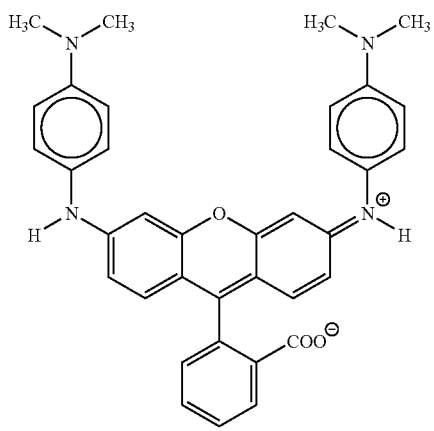

EXAMPLE XB

The process of Example IB was repeated except that N,N-diethyl-1,4-phenylene diamine (obtained from Aldrich Chemical Co., Milwaukee, Wis.), of the formula

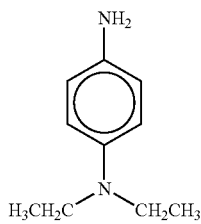

was used instead of distearyl amine. The N,N-diethyl-1,4-phenylene diamine was present in an amount of 2.5 moles of N,N-diethyl-1,4-phenylene diamine per every one mole of dichlorofluorescein. In addition, 2 moles of zinc chloride were used per every one mole of dichlorofluorescein and 1 mole of calcium oxide was used per every one mole of dichlorofluorescein, the solvent was N-methylpyrrolidone instead of tetramethylene sulfone, and the reaction mixture was heated to 150° C. for 96 hours. The reaction product was then poured into water and filtered and washed with water. It is believed that the product was of the formula

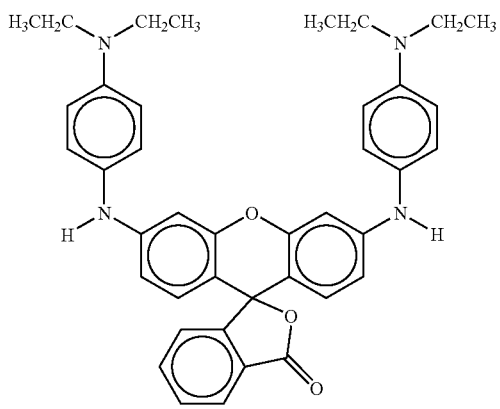

The ring-opened, or protonated, or free-base form of this colorant is believed to be of the formula

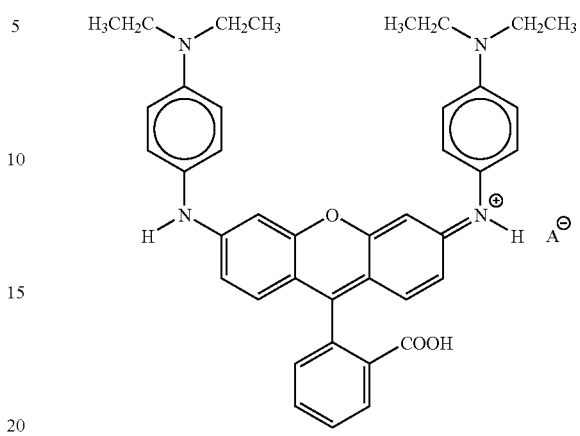

wherein A is the anion corresponding to the acid used for protonaton. The zwitterionic form of this colorant is believed to be of the formula

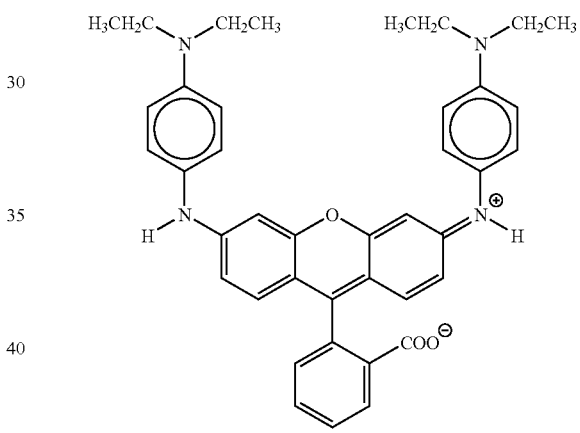

EXAMPLE XIB

The process of Example IB was repeated except that N-benzylethanolamine (obtained from Aldrich Chemical Co., Milwaukee, Wis., of the formula

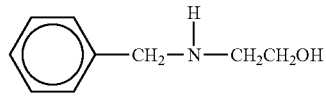

was used instead of distearyl amine. The N-benzylethanolamine was present in an amount of 2.5 moles of N-benzylethanolamine per every one mole of dichlorofluorescein. In addition, 2 moles of zinc chloride were used per every one mole of dichlorofluorescein and 1 mole of calcium oxide was used per every one mole of dichlorofluorescein, the solvent was dimethyl formamide instead of tetramethylene sulfone, and the reaction mixture was heated to 150° C. for 48 hours.

EXAMPLE XIC

The process of Example IC was repeated using the product obtained in Example XIB except that the product was poured into methanol and sufficient EDTA was added to remove all of the $Zn^{2+}$ and $Ca^{2+}$ ions. It is believed that the purified product was of the formula

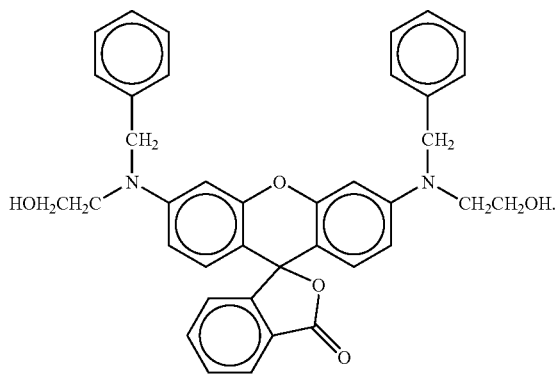

EXAMPLE XIC-1

About 10 grams of the product obtained in Example XIC is added to 9.9 grams of octadecylisocyanate (available from Aldrich Chemical Co., Milwaukee, Wis.) at 120° C., after which 1 drop of dibutyltindilaurate catalyst (available from Aldrich Chemical Co.) is added and the reaction is stirred and heated until disappearance of the isocyanate peak in the IR is observed. The diurethane rhodamine is poured into aluminum tins and is believed to be of the formula

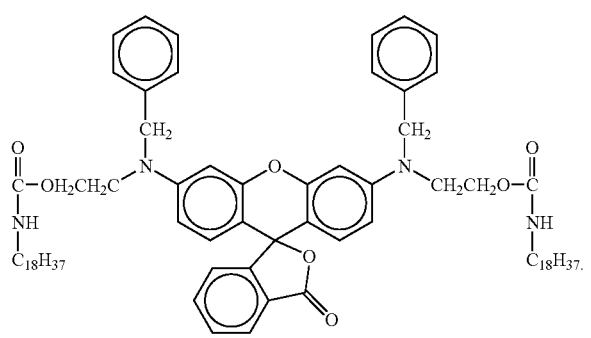

The ring-opened, or protonated, or free-base form of this colorant is believed to be of the formula

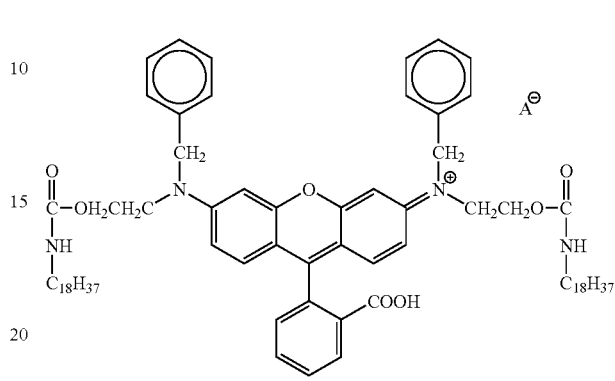

wherein A is the anion corresponding to the acid used for protonaton. The zwitterionic form of this colorant is believed to be of the formula

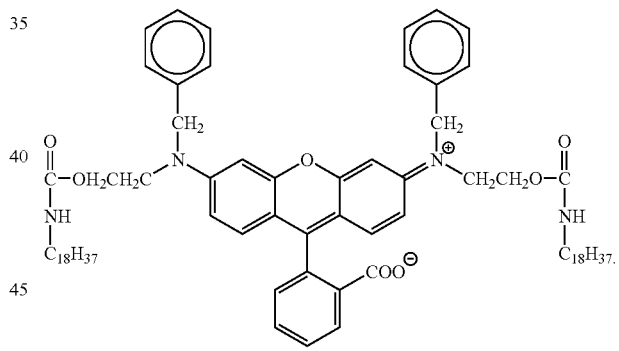

EXAMPLE XIIB

The process of Example IB was repeated except that N-benzylethanolamine (obtained from Aldrich Chemical Co., Milwaukee, Wis.), of the formula

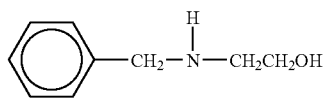

was used instead of distearyl amine. The N-benzylethanolamine was present in an amount of 10 moles of N-benzylethanolamine per every one mole of dichlorofluorescein. In addition, 2 moles of zinc chloride were used per every one mole of dichlorofluorescein and 1 mole of calcium oxide was used per every one mole of dichlorofluorescein, the solvent was the excess N-benzylethanolamine instead of tetramethylene sulfone, and the reaction mixture was refluxed in an oil bath for 48 hours, followed by distilling off the excess amine.

EXAMPLE XIIC

The process of Example IC was repeated using the product obtained in Example XIIB except that the product was poured into methanol and sufficient EDTA was added to remove all of the $Zn^{2+}$ and $Ca^{2+}$ ions. It is believed that the purified product was of the formula

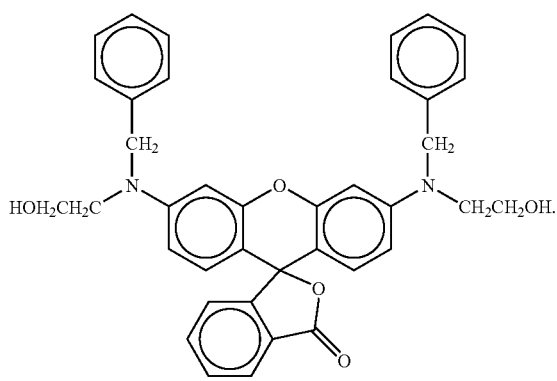

EXAMPLE XIIC-1

In a glass reaction flask is combined 10 grams of the product obtained in Example XIIC, 29.8 grams of UNI-CID® 700 (a material containing carboxylic acid of the formula RCOOH wherein R is a linear alkyl group having an average of about 50 carbon atoms, also containing other unfunctionalized wax materials in an amount of up to about 25 percent by weight; available from Baker Petrolite, Sugarland, Tex.), 152 grams of xylene (available from Tarr, Inc., Portland, Oreg.), and 0.6 grams of para-toluenesulfonic acid (available from Capital Resin Corp., Columbus, Ohio). The materials are mixed and heated to a reflux temperature of about 143° C. After about 72 hours, the reaction is complete. The reaction mixture is then cooled to 40° C. and filtered. The filter cake is reslurried and filtered two more times in methanol to remove residual xylene. The filter cake is then dried in air at ambient temperature. It is believed that this filter cake will contain a colorant of the formula

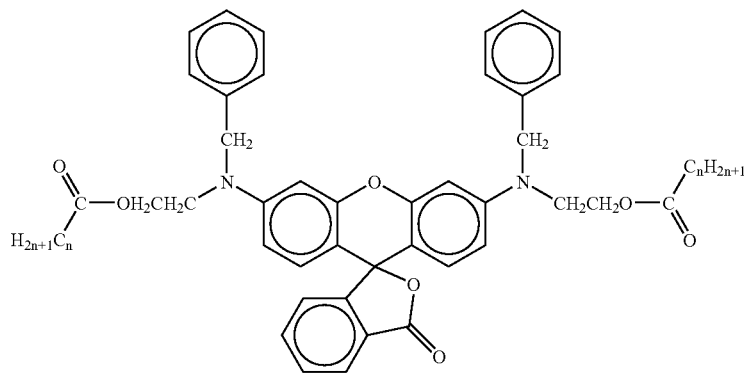

wherein n has an average value of about 50. The ring-opened, or protonated, or free-base form of this colorant is believed to be of the formula

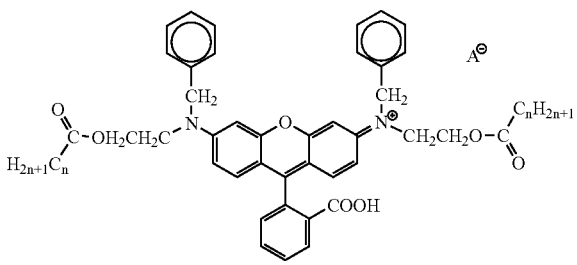

wherein A is the anion corresponding to the acid used for protonaton. The zwitterionic form of this colorant is believed to be of the formula

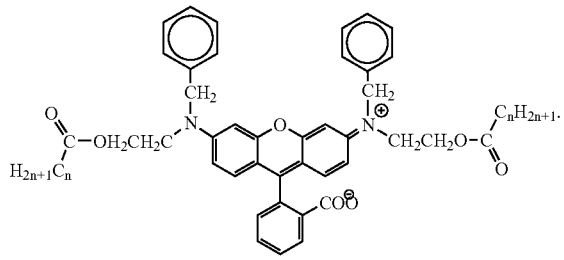

EXAMPLE XIIIB

The process of Example IB was repeated except that 2-(ethylamino)ethanol (obtained from Aldrich Chemical Co., Milwaukee, Wis.), of the formula

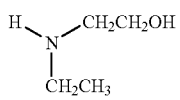

was used instead of distearyl amine. The 2-(ethylamino)ethanol was present in an amount of 20 moles of 2-(ethylamino)ethanol per every one mole of dichlorofluorescein. In addition, 2 moles of zinc chloride were used per every one mole of dichlorofluorescein and 1 mole of calcium oxide was used per every one mole of dichlorofluorescein, the solvent was the excess 2-(ethylamino)ethanol instead of tetramethylene sulfone, and the reaction mixture was refluxed in an oil bath for 24 hours, followed by distilling off the excess amine.

EXAMPLE XIIIC

The process of Example IC was repeated using the product obtained in Example XIIIB except that the product was poured into methanol and sufficient EDTA was added to remove all of the $Zn^{2+}$ and $Ca^{2+}$ ions. It is believed that the purified product was of the formula

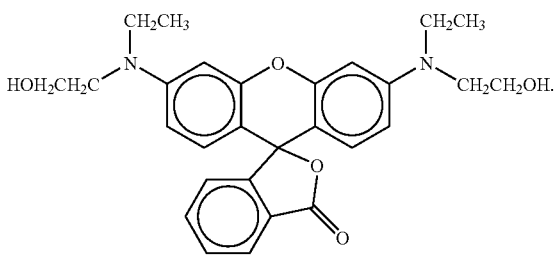

EXAMPLE XIIIC-1

About 10 grams of the product obtained in Example XIIIC is added to 12.5 grams of octadecylisocyanate (available from Aldrich Chemical Co., Milwaukee, Wis.) at 120° C., after which 1 drop of dibutyltindilaurate catalyst (available from Aldrich Chemical Co.) is added and the reaction is stirred and heated until disappearance of the isocyanate peak in the IR is observed. The diurethane rhodamine is poured into aluminum tins and is believed to be of the formula

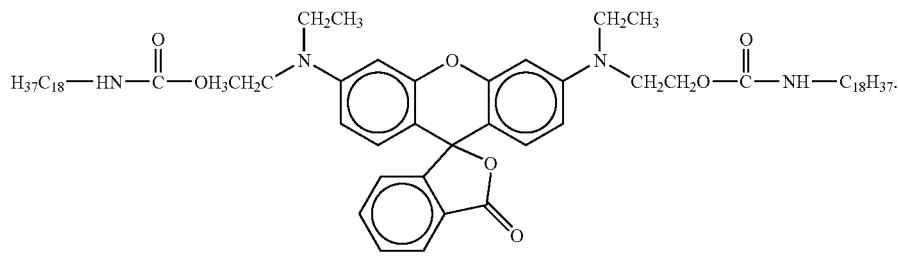

The ring-opened, or protonated, or free-base form of this colorant is believed to be of the formula

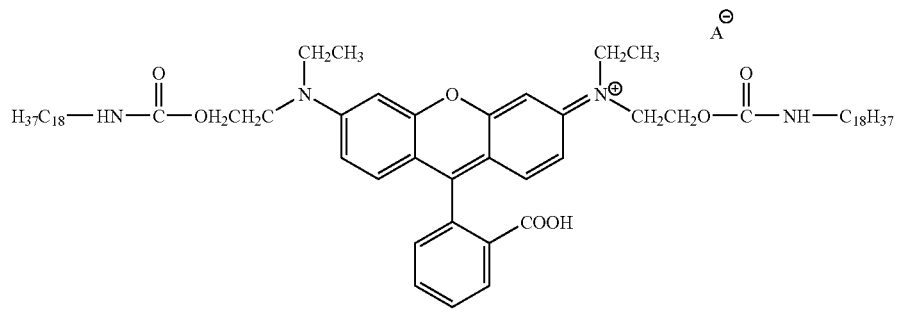

wherein A is the anion corresponding to the acid used for protonaton. The zwitterionic form of this colorant is believed to be of the formula

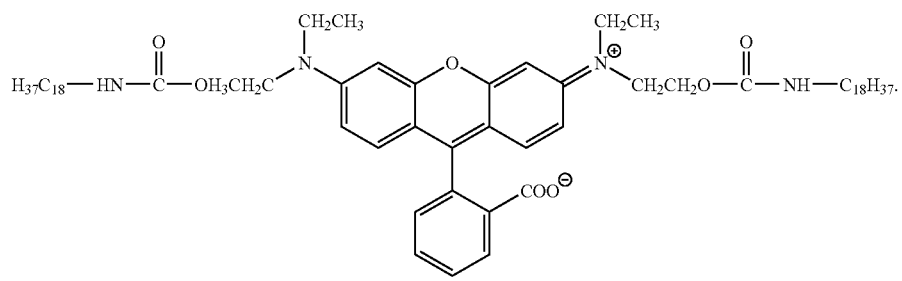

EXAMPLE XIVB

The process of Example IB was repeated except that 2-aminoanthracene (obtained from Aldrich Chemical Co., Milwaukee, Wis.), of the formula

was used instead of distearyl amine. The 2-aminoanthracene was present in an amount of 2.05 moles of 2-aminoanthracene per every one mole of dichlorofluorescein. It is believed that the product was of the formula

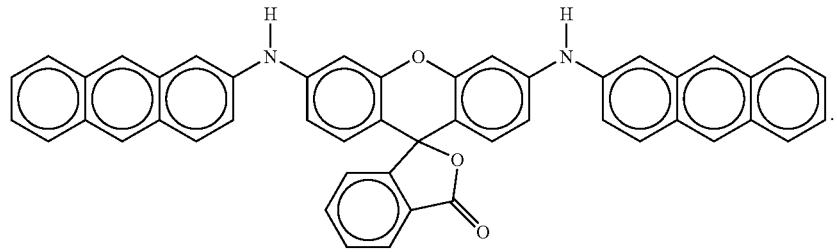

The ring-opened, or protonated, or free-base form of this colorant is believed to be of the formula

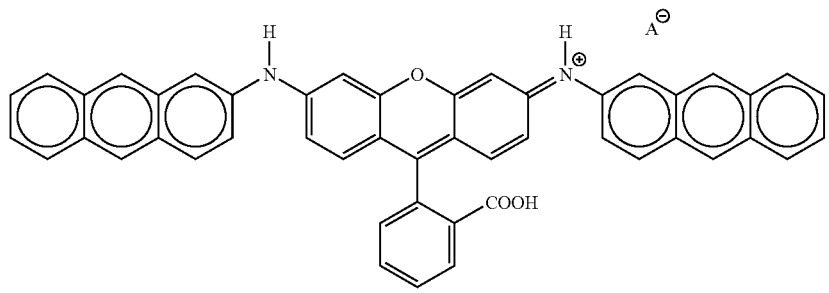

wherein A is the anion corresponding to the acid used for protonaton. The zwitterionic form of this colorant is believed to be of the formula

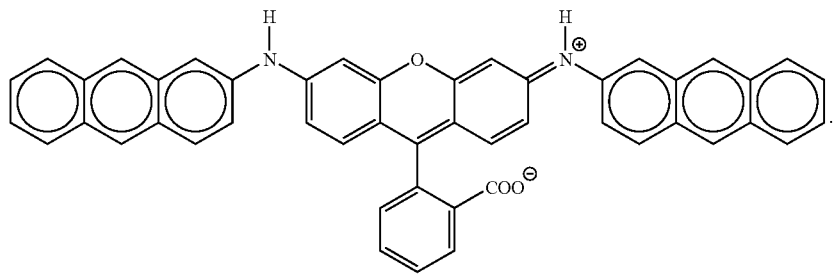

EXAMPLE XVB

The process of Example IB was repeated except that a mixture of stearyl amine (ARMEEN 18D; obtained from Akzo-Nobel, McCook, Ill.) and distearyl amine was used instead of pure distearyl amine. The stearyl amine was present in an amount of 1.02 moles of stearyl amine per every one mole of dichlorofluorescein, and the distearyl amine was present in an amount of 1.02 moles of distearyl amine per every one mole of dichlorofluorescein.

EXAMPLE XVC

The process of Example IC was repeated using the product obtained in Example XVB. It is believed that the purified product was a mixture of compounds of the formulae

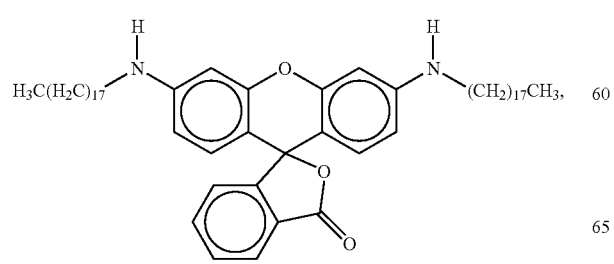

-continued

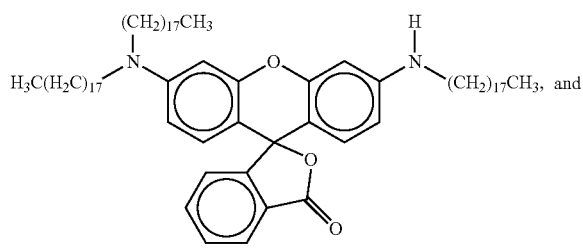

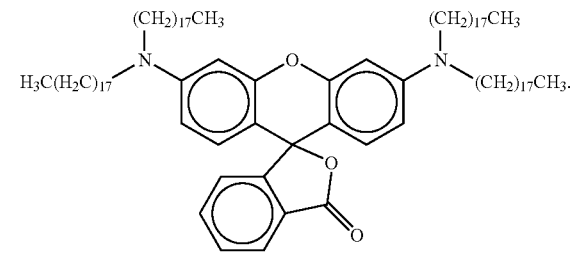

The ring-opened, or protonated, or free-base forms of these colorants are believed to be of the formulae, respectively,

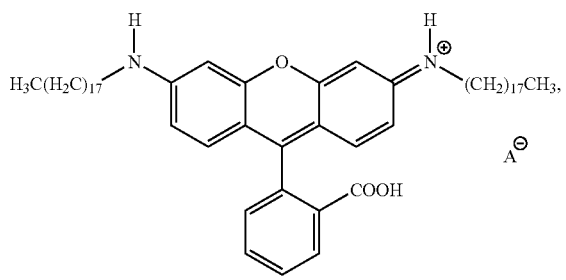

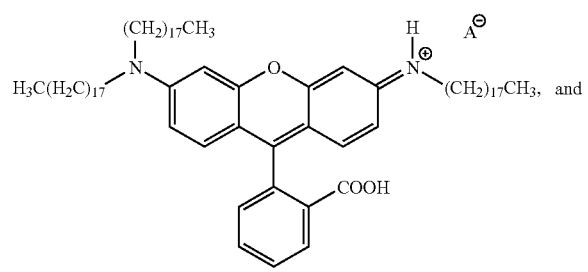

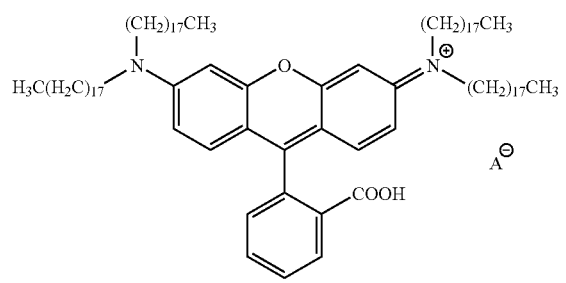

wherein A is the anion corresponding to the acid used for protonaton. The zwitterionic forms of these colorants are believed to be of the formulae, respectively,

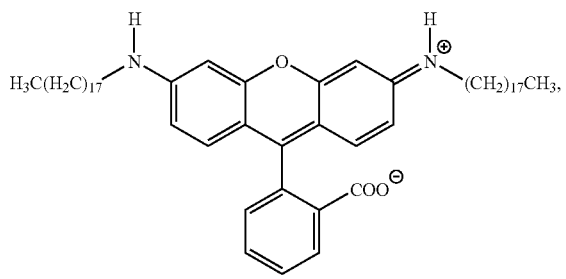

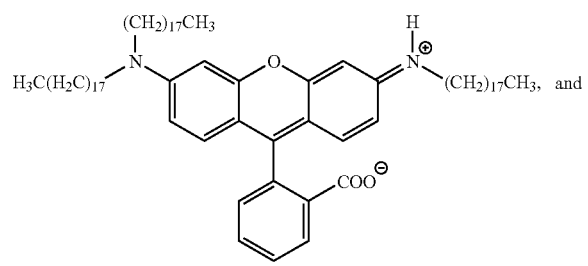

-continued

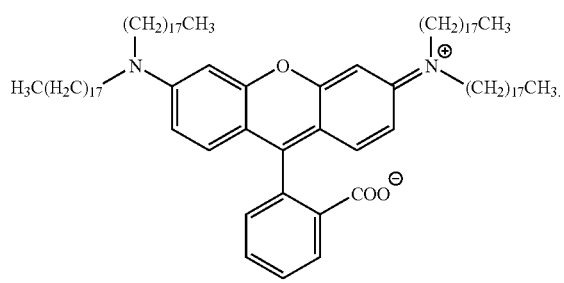

EXAMPLE XVD

The process of Example ID was repeated using the product obtained in Example XVC.

EXAMPLE XVI

The processes of Examples IA through IC were repeated. Thereafter, to the solution of the ring-closed purified tetrastearyl colorant in MIBK was added a naphthalene disulfonate adduct of the formula

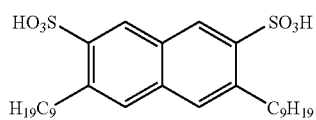

(dinonylnaphthalene disulfonic acid, 50 wt. % in isobutanol, NACURE® 155, obtained from King Industries, Norwalk, Conn.) in a stoichiometric amount of 2 moles of naphthalene sulfonate adduct per every one mole of tetrastearyl colorant. The solution was stirred until a magenta color developed fully. Thereafter, the solution was transferred to a 2 liter round bottom flask equipped with distillation setup, and the MIBK was distilled off. The product, a slightly viscous wax when warm, was transferred to a jar and allowed to harden. At room temperature, the product was a deep magenta/red colored somewhat hard wax, believed to be of the formula

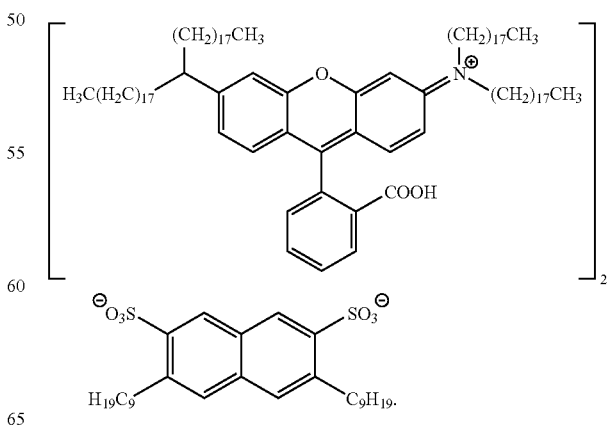

EXAMPLE XVII

Preparation of Calcium Tetrastearyl Colorant

The process of Example I was repeated except that 80.3 grams of the ring-closed purified tetrastearyl chromogen, 400 grams of toluene, and 3.5 grams of $CaCl_2$ were employed. The product, a slightly viscous wax when warm, was transferred to a jar and allowed to harden. At room temperature, the product was a deep magenta/red colored somewhat hard wax.

EXAMPLE XVIII

Preparation of Bismuth Tetrastearyl Colorant

The process of Example I was repeated except that 100.2 grams of the ring-closed purified tetrastearyl chromogen, 600 grams of toluene, and 8.2 grams of $BiCl_3$ were employed. The product, a slightly viscous wax when warm, was transferred to a jar and allowed to harden. At room temperature, the product was a deep magenta/red colored somewhat hard wax.

EXAMPLE XIX

Preparation of Tin Tetrastearyl Colorant

The process of Example I was repeated except that 100 grams of the ring-closed purified tetrastearyl chromogen, 1,000 grams of MIBK, and 8.8 grams of $SnCl_2$ in a 2 liter 3-necked roundbottom flask were employed. The product, a slightly viscous wax when warm, was transferred to a jar and allowed to harden. At room temperature, the product was a deep magenta/red colored somewhat hard wax.

EXAMPLE XX

Preparation of Iron Tetrastearyl Colorant

The process of Example I was repeated except that 32.4 grams of the ring-closed purified tetrastearyl chromogen, about 400 grams of MIBK, and 1.6 grams of $FeCl_2$ were employed. The product, a slightly viscous wax when warm, was transferred to a jar and allowed to harden. At room temperature, the product was a deep magenta/red colored somewhat hard wax.

EXAMPLE XXI

Preparation of Copper Tetrastearyl Colorant

The process of Example I was repeated except that 35 grams of the ring-closed purified tetrastearyl chromogen, about 400 grams of MIBK, and 1.83 grams of $CuCl_2$ were employed. The product, a slightly viscous wax when warm, was transferred to a jar and allowed to harden. At room temperature, the product was a deep magenta/red colored somewhat hard wax.

EXAMPLE XXII

Preparation of Aluminum Tetrastearyl Colorant

The process of Example I was repeated except that 32.7 grams of the ring-closed purified tetrastearyl chromogen, about 400 grams of MIBK, and 1.13 grams of $AlCl_3$ were employed. The product, a slightly viscous wax when warm, was transferred to a jar and allowed to harden. At room temperature, the product was a deep magenta/red colored somewhat hard wax.

EXAMPLE XXIII

Preparation of Nickel Tetrastearyl Colorant

The process of Example I was repeated except that 5.5 grams of the ring-closed purified tetrastearyl chromogen, about 100 grams of MIBK, and 0.53 grams of nickel II acetate $(Ni(CH_3COO)_2)$ were employed. The product, a slightly viscous wax when warm, was transferred to a jar and allowed to harden. At room temperature, the product was a deep magenta/red colored somewhat hard wax.

EXAMPLE XXIV

Preparation of Phosphotungsticmolybdic "Laked" Tetrastearyl Colorant

The process of Example I was repeated except that 34.1 grams of the ring-closed purified tetrastearyl chromogen, about 400 grams of MIBK, 13.1 grams of phosphotungstic acid, and 5.6 grams of phosphomolybdic acid were employed. The product, a slightly viscous wax when warm, was transferred to a jar and allowed to harden. At room temperature, the product was a deep magenta/red colored somewhat hard wax.

EXAMPLE XXV

Preparation of Titanium Tetrastearyl Colorant

The process of Example I was repeated except that 24.3 grams of the ring-closed purified tetrastearyl chromogen, about 250 grams of toluene, and 0.9 grams of titanium IV chloride were employed. The product, a slightly viscous wax when warm, was transferred to a jar and allowed to harden. At room temperature, the product was a deep magenta/red colored somewhat hard wax.

EXAMPLE XXVI

Preparation of Chromium Tetrastearyl Colorant

The process of Example I was repeated except that 25.2 grams of the ring-closed purified tetrastearyl chromogen, about 250 grams of MIBK, and 1.04 grams of chromium III chloride were employed. The product, a slightly viscous wax when warm, was transferred to a jar and allowed to harden. At room temperature, the product was a deep magenta/red colored somewhat hard wax.

The processes of Examples XVII through XXVI are repeated but substituting the chromogens prepared in Examples II through XVI for the chromogen prepared in Example I. It is believed that similar results will be observed.

Ink Preparation and Testing

EXAMPLE XXVII

Preparation of Secondary Colorant

Part 1

A secondary magenta colorant was prepared as follows.

In a glass reaction flask were combined 73 grams of sublimed quinizarin (obtained from Aceto Corp., Lake Success, N.Y.), 49 grams of leucoquinizarin (obtained from Aceto Corp.), 66 grams of 4-aminobenzene ethanol (obtained from Aceto Corp.), 31 grams of boric acid (obtained from Aldrich Chemical Co., Milwaukee, Wis.), and 780 grams of methanol (obtained from JT Baker, Phillipsburg, N.J.). The materials were mixed and heated until the solvent refluxed at about 66° C.

After about 16 hours of reflux the reaction was complete, having generated an alcohol-substituted colorant of the formula

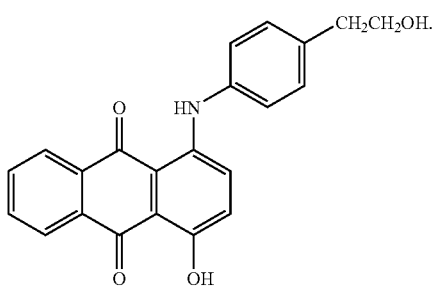

The reaction mixture was cooled and filtered. The product filter cake was dried in air at ambient temperature.

The spectral strength of the alcohol-substituted colorant was determined using a spectrophotographic procedure based on the measurement of the colorant in solution by dissolving the colorant in toluene and measuring the absorbance using a Perkin Elmer Lambda 2S UV/VIS spectrophotometer. The spectral strength of the alcohol-substituted colorant was measured as about 21,000 mL Absorbance Units per gram at absorption $\lambda_{max}$, indicating a purity of about 80 percent.

Part 2

In a glass reaction flask were combined 8 grams of the alcohol-substituted colorant prepared in Part 1 of this Example, 68 grams of glacial acetic acid (obtained from JT Baker), 13 grams of propionic acid (obtained from Aldrich Chemical Co.), and 2.3 grams of acetic anhydride (obtained from Aldrich Chemical Co.). The materials were mixed and heated to a reflux temperature of about 121° C. After about 4 hours of reflux, the reaction was complete and the reaction mixture contained an ethyl acetate-substituted colorant of the formula

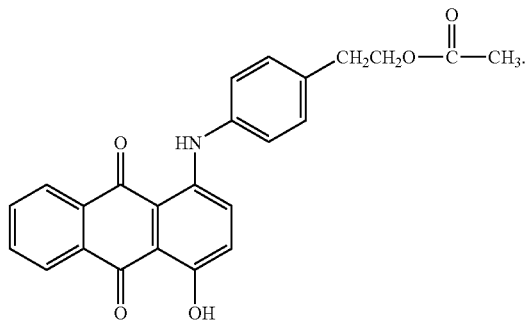

Part 3

About 91 grams of the reaction mixture containing the ethyl acetate-substituted colorant from Part 2 of this Example was charged into a glass reaction flask. The mixture was cooled to a minimum of 30° C. While mixing, about 9 grams of bromine (obtained from Aldrich Chemical Co.) was added to the mixture at a rate such that the temperature remained below about 40° C. The mixture was then heated to about 40° C. After about 24 hours of mixing the reaction was complete.

The reaction mixture was then quenched into 234 grams of deionized water and allowed to cool to room temperature. The reaction mixture was then filtered. The filter cake was reslurried and filtered twice in deionized water to remove most of the residual acetic acid. The filter cake was then dried in a 60° C. oven. This filter cake contained a mixture of brominated ethyl acetate-substituted colorants of the formulae

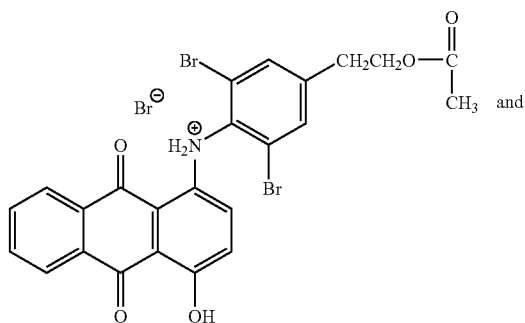

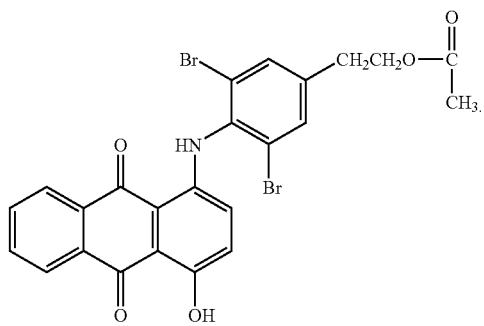

The spectral strength of the brominated ethyl acetate-substituted colorant was determined using a spectrophotographic procedure based on the measurement of the colorant in solution by dissolving the colorant in toluene and measuring the absorbance using a Perkin Elmer Lambda 2S UV/VIS spectrophotometer. The spectral strength of the brominated ethyl acetate-substituted colorant was measured as about 15,000 mL Absorbance Units per gram at absorption $\lambda_{max}$. This spectral strength indicated a purity of about 60 percent.

Part 4

In a glass reaction flask were combined 18 grams of the mixture of the brominated ethyl acetate-substituted colorant and its salt prepared in Part 3 of this Example, 72 grams of N-methyl-2-pyrrolidone (obtained from Aldrich Chemical Co.), 4 grams of sodium hydroxide (obtained from Aldrich Chemical Co.), and 4 grams of deionized water. The materials were mixed and heated to about 60° C. After about 3 hours the reaction was complete.

The reaction mixture was then quenched into 234 grams of deionized water and allowed to cool to room temperature. Glacial acetic acid was added until the solution reached a pH of between 6 and 7. The reaction mixture was then filtered. The filter cake was reslurried and filtered twice in deionized water to remove most of the residual N-methyl-2-pyrrolidone. The filter cake was then dried in a 60° C. oven. This filter cake contained a brominated alcohol-substituted colorant of the formula

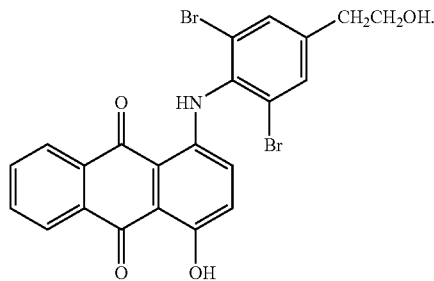

The spectral strength of the brominated alcohol-substituted colorant was determined using a spectrophotographic procedure based on the measurement of the colorant in solution by dissolving the colorant in an equal mixture of toluene and tetrahydrofuran and measuring the absorbance using a Perkin Elmer Lambda 2S UV/VIS spectrophotometer. The spectral strength of the brominated alcohol-substituted colorant was measured as about 16,000 mL Absorbance Units per gram at absorption $\lambda_{max}$. This spectral strength indicated a purity of about 60 percent.

Part 5

In a glass reaction flask were combined 16 grams of the brominated alcohol-substituted colorant prepared in Part 4 of this Example, 31 grams of UNICID® 700 (a material containing carboxylic acid of the formula $R_2COOH$ wherein $R_2$ is a linear alkyl group having an average of about 50 carbon atoms, also containing other unfunctionalized wax materials in an amount of up to about 25 percent by weight; obtained from Baker Petrolite, Sugarland, Tex.), 152 grams of xylene (obtained from Tarr, Inc., Portland, Oreg.), and 0.6 grams of para-toluenesulfonic acid (obtained from Capital Resin Corp., Columbus, Ohio). The materials were mixed and heated to a reflux temperature of about 143° C. After about 7 hours, the reaction was complete.

The reaction mixture was then cooled to 40° C. and filtered. The filter cake was reslurried and filtered two more times in methanol to remove residual xylene. The filter cake was then dried in air at ambient temperature. This filter cake contained a colorant of the formula

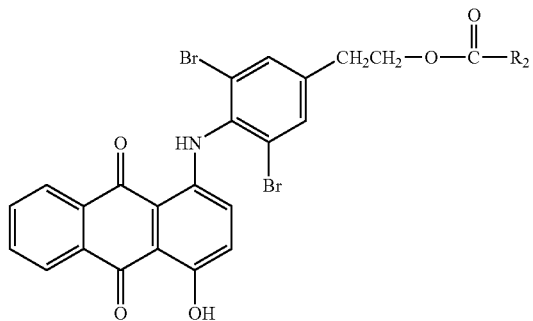

wherein $R_2$ is a linear alkyl group having an average of about 50 carbon atoms.

The spectral strength of the colorant was determined using a spectrophotographic procedure based on the measurement of the colorant in solution by dissolving the colorant in an equal mixture of toluene and tetrahydrofuran and measuring the absorbance using a Perkin Elmer Lambda 2S UV/VIS spectrophotometer. The spectral strength of the colorant was measured as about 5,000 mL Absorbance Units per gram at absorption $\lambda_{max}$. This spectral strength indicated a purity of about 40 percent.

Ink compositions containing the colorants of Examples IF and XVII through XXVI, and, for comparison purposes, commercially available n-butyl Solvent Red 172 (n-BuSR172; UNIGRAPH Red 1900, obtained from United Color Manufacturing, Inc., Newtown, Pa.), commercially available Solvent Red 49 (SR49; a rhodamine colorant obtained from BASF, Germany), and a colorant comprising the chromogen of Example ID (said chromogen not being part of a metal compound according to the present invention) were prepared as follows.

Ink A-1: In a stainless steel beaker were combined 153.22 grams of polyethylene wax (PE655, obtained from Baker Petrolite, Tulsa, Okla., of the formula $CH_3(CH_2)_{50}CH_3$), 39.72 grams of stearyl stearamide wax (KEMAMIDE® S-180, obtained from Crompton Corporation, Greenwich, Conn.), 62.99 grams of a tetra-amide resin obtained from the reaction of one equivalent of dimer diacid with two equivalents of ethylene diamine and UNICID® 700 (a carboxylic acid derivative of a long chain alcohol obtained from Baker Petrolite, Tulsa, Okla.), prepared as described in Example 1 of U.S. Pat. No. 6,174,937, the disclosure of which is totally incorporated herein by reference, 39.76 grams of a urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 27.02 grams of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference, and 0.65 gram of NAUGUARD® 445 antioxidant (obtained from Uniroyal Chemical Co., Middlebury, Conn.). The materials were melted together at a temperature of 135° C. in an oven, and then blended by stirring in a temperature-controlled mantle at 135° C. for 0.2 hour. To this mixture was then added 12.31 grams of the colorant prepared as described in Example IF and 6.70 grams of a secondary magenta colorant (prepared as described in Parts 1 through 5 of this Example). After stirring for 2 additional hours, the magenta ink thus formed was filtered through a heated MOTT® apparatus (obtained from Mott Metallurgical) using Whatman #3 filter paper under a pressure of 15 pounds per square inch. The filtered phase change ink was poured into molds and allowed to solidify to form ink sticks. The magenta phase change ink thus prepared exhibited a viscosity of 10.80 centipoise as measured by a Rheometrics cone-plate viscometer at about 140° C., and a spectral strength of 1,279 milliliters absorbance per gram at 550 nanometers, determined by using a spectrophotographic procedure based on the measurement of the colorant in solution by dissolving the solid ink in n-butanol and measuring the absorbance using a Perkin Elmer Lambda 2S UV/VIS spectrophotometer.

Ink A-2: Ink A-2 was prepared in a similar manner to that used to prepare Ink A-1 but using a different formulation for the ink composition as described in the table below. The properties of Ink A-2 were obtained using the same methods as those used for Ink A-1. The melting points of 84° C. and 105° C. were measured by differential scanning calorimetry using a DuPont 2100 calorimeter. Ink A-2 had a glass transition temperature ($T_g$) of 19° C. As shown in the table, the predominant difference between Ink A-1 and Ink A-2 is the relative concentration of the colorant in the ink.

Ink A-3: Ink A-3 was prepared in a similar manner to that used to prepare Ink A-1 but using a different formulation for the ink composition as described in the table below. The properties of Ink A-3 were obtained using the same methods as those used for Ink A-1 and Ink A-2. As shown in the table, the predominant difference between Ink A-3 and Inks A-1 and A-2 is the relative higher concentration of the colorant in the ink. As a result, the spectral strength of Ink A-3 is also higher than those of Inks A-1 and A-2, suggesting very good solubility of the colorant described in Example IF in the ink carrier.

Inks B-1 and B-2: Inks B-1 and B-2 were prepared in a similar manner to that used to prepare Ink A-1 but using the colorant of Example XVII instead of the colorant of Example IF. Their formulations are described in the table below. The properties of Ink B-1 and Ink B-2 were obtained using the same methods as those used for Inks A-1 and A-2. As shown in the table, the predominant difference between Ink B-1 and Ink B-2 is the relative concentration of the colorant in the ink.

Ink C: Ink C was prepared by the process described for Ink A-1 except that the colorant from Example XVIII was used in place of the colorant from Example IF. The properties of Ink C were obtained using the same methods as those used for Ink A-1.

Inks D-1 and D-2: Inks D-1 and D-2 were prepared by the process described for Ink A-1 except that the colorant from Example XIX was used in place of the colorant from Example IF. The properties of Ink D-1 and Ink D-2 were obtained using the same methods as those used for Ink A-1.

Ink E: Ink E was prepared by the process described for Ink A-1 except that the colorant from Example XX was used in place of the dye from Example IF. The properties of Ink E were obtained using the same methods as those used for Ink A-1.

Ink F: Ink F was prepared by the process described for Ink A-1 except that the colorant from Example XXI was used in place of the dye from Example IF. The properties of Ink F were obtained using the same methods as those used for Ink A-1.

Ink G: Ink G was prepared by the process described for Ink A-1 except that the colorant from Example XXII was used in place of the dye from Example IF. The properties of Ink G were obtained using the same methods as those used for Ink A-1.

Ink H: Ink H was prepared by the process described for Ink A-1 except that the colorant from Example XXIII was used in place of the dye from Example IF. The properties of Ink H were obtained using the same methods as those used for Ink A-1.

Ink I: Ink I was prepared by the process described for Ink A-1 except that the colorant from Example XXIV was used in place of the dye from Example IF. The properties of Ink I were obtained using the same methods as those used for Ink A-1.

Ink J: Ink J was prepared by the process described for Ink A-1 except that the colorant from Example XXV was used in place of the dye from Example IF. The properties of Ink J were obtained using the same methods as those used for Ink A-1.

Ink K: Ink K was prepared by the process described for Ink A-1 except that the colorant from Example XXVI was used in place of the dye from Example IF. The properties of Ink K were obtained using the same methods as those used for Ink A-1.

Comparative Ink 1: An ink was prepared by the process described for Ink A-1 except that instead of the colorant from Example IF, the commercially available SR 49 and dodecyl benzene sulfuric acid (DDBSA, Bio-soft S-100, obtained from Stepan Company, Elwood, Ill.) were used. The properties of Comparative Ink 1 were obtained using the same methods as those used for Ink A-1.

Comparative Ink 2: An ink was prepared by the process described for Ink A-1 except that instead of the colorant from Example IF, a colorant comprising the chromogen of Example ID (said chromogen not being part of a metal compound according to the present invention) and dodecyl benzene sulfuric acid (DDBSA, Bio-soft S-100, obtained from Stepan Company, Elwood, Ill.) were used. The properties of Comparative Ink 2 were obtained using the same methods as those used for Ink A-1.

Comparative Ink 3: An ink was prepared by the process described for Ink A-1 including the colorant preparation from Example IF, except that instead of using the chromogen from Example ID, commercially available Solvent Red 49 was used as the chromogen to prepare the resulting zinc colorant. The properties of Comparative Ink 3 were obtained using the same methods as those used for Ink A-1. Since it was found that the spectral strength of the unfiltered ink was higher than that of the filtered ink, the actual relative colorant amount of the colorant is in fact less than that listed in the following formulation table. Therefore, the colorant described in Comparative Example 3 has much lower solubility than that of the colorant described in Example A; it is believed that the better solubility of the colorant in Inks A-1 through A-3 can be attributed to the long alkyl groups on the chromogen compared to those of commercially available Solvent Red 49.

The following tables summarize the compositions of the various inks and the amounts of ingredients (weight percentage numbers given in the tables) therein:

|  | A-1 | A-2 | A-3 | B-1 | B-2 | C |
|---|---|---|---|---|---|---|
| Example IF colorant | 3.56 | 5.04 | 6.28 | — | — | — |
| Example XVII colorant | — | — | — | 3.98 | 3.55 | — |
| Example XVIII colorant | — | — | — | — | — | 3.55 |
| POLYWAX | 44.36 | 44.15 | 43.41 | 44.06 | 45.38 | 45.38 |
| Tetra-amide | 19.10 | 17.81 | 17.56 | 18.91 | 18.47 | 18.47 |
| S-180 | 11.51 | 13.76 | 13.42 | 12.55 | 11.78 | 11.78 |
| Urethane Resin 1* | 11.51 | 9.75 | 9.84 | 10.53 | 11.13 | 11.13 |
| Urethane Resin 2** | 7.82 | 7.45 | 7.41 | 7.86 | 7.56 | 7.56 |
| 2° magenta colorant | 1.94 | 1.83 | 1.87 | 1.92 | 1.94 | 1.94 |
| NAUGUARD 445 | 0.19 | 0.19 | 0.20 | 0.19 | 0.19 | 0.19 |
| Total | 100.0 | 100.0 | 100.0 | 100.0 | 100.0 | 100.00 |

|  | D-1 | D-2 | E | F | G | H |
|---|---|---|---|---|---|---|
| Example XIX colorant | 3.51 | 3.55 | — | — | — | — |
| Example XX colorant | — | — | 3.55 | — | — | — |
| Example XXI colorant | — | — | — | 3.55 | — | — |
| Example XXII colorant | — | — | — | — | 3.54 | — |
| Example XXIII colorant | — | — | — | — | — | 3.55 |
| POLYWAX | 43.30 | 45.38 | 45.89 | 45.58 | 46.89 | 45.38 |
| Tetra-amide | 19.96 | 18.47 | 18.15 | 18.34 | 17.54 | 18.47 |
| S-180 | 13.02 | 11.78 | 11.91 | 11.83 | 12.17 | 11.78 |
| Urethane Resin 1* | 10.30 | 11.13 | 10.94 | 11.05 | 10.57 | 11.13 |
| Urethane Resin 2** | 7.81 | 7.56 | 7.43 | 7.51 | 7.18 | 7.56 |
| 2° magenta colorant | 1.91 | 1.94 | 1.94 | 1.94 | 1.93 | 1.94 |
| NAUGUARD 445 | 0.20 | 0.19 | 0.19 | 0.20 | 0.18 | 0.19 |
| Total | 100.0 | 100.0 | 100.0 | 100.0 | 100.0 | 100.0 |

|  | I | J | K | 1 | 2 | 3 |
|---|---|---|---|---|---|---|
| Example XXIV colorant | 3.55 | — | — | — | — | — |
| Example XXV colorant | — | 3.55 | — | — | — | — |
| Example XXVI colorant | — | — | 3.54 | — | — | — |
| SR 49 colorant | — | — | — | 0.46 | — | — |
| Example ID colorant | — | — | — | — | 2.61 | — |
| Zn-SR 49 colorant | — | — | — | — | — | 0.75 |
| POLYWAX | 45.38 | 45.38 | 46.26 | 45.67 | 40.16 | 45.58 |
| Tetra-amide | 18.47 | 18.47 | 17.93 | 19.04 | 17.82 | 21.35 |
| S-180 | 11.78 | 11.78 | 12.01 | 13.17 | 19.38 | 13.20 |
| Urethane Resin 1* | 11.13 | 11.13 | 10.80 | 10.68 | 12.47 | 9.00 |
| Urethane Resin 2** | 7.56 | 7.56 | 7.34 | 8.09 | 4.26 | 8.00 |
| 2° magenta colorant | 1.94 | 1.94 | 1.94 | 1.91 | 2.03 | 1.92 |
| DDABS | — | — | — | 0.80 | 1.10 | — |
| NAUGUARD 445 | 0.19 | 0.19 | 0.18 | 0.20 | 0.18 | 0.20 |
| Total | 100.0 | 100.0 | 100.0 | 100.0 | 100.0 | 100.0 |

*ABITOL E based urethane resin
**Glycerol alcohol based urethane resin

The magenta inks thus prepared were successfully printed on HAMMERMILL LASERPRINT® paper (obtained from International Paper, Memphis, Tenn.) with a XEROX® PHASER 860 printer, which uses a printing process wherein the ink is first jetted in an imagewise pattern onto an intermediate transfer member followed by transfer of the imagewise pattern from the intermediate transfer member to a final recording substrate. The solid field images with a resolution of 450 dpi×600 dpi were generated from the printer, and their color space data were obtained on an ACS® Spectro Sensor® II Colorimeter (obtained from Applied Color Systems Inc.) in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the inks, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample.

Another type of printed sample was generated on HAMMERMILL LASERPRINT® paper using a K Printing Proofer (manufactured by RK Print Coat Instrument Ltd., Litlington, Royston, Heris, SG8 0OZ, U.K.). In this method, the tested inks were melted onto a printing plate set at 150° C. temperature. A roller bar fitted with the paper was then rolled over the plate containing the melted ink on its surface. The ink on the paper was cooled, resulting in three separated images of rectangular blocks. The most intensely colored block contained the most ink deposited on the paper, and was therefore used to obtain the color value measurements.

Printed samples of the magenta inks both from the XEROX PHASER® printer and from the K-Proofer were evaluated for color characteristics, which are reported in the tables below. As is apparent, the CIE L*a*b* values for inks made with colorants according to the present invention represent a good magenta shade printed ink. The tables below list the viscosity (η, centipoise) of the inks at 140° C., the spectral strength in n-butanol (SS, mL*g$^{-1}$ cm$^{-1}$) and absorbance maximum (Lambda max, $\lambda_{max}$, m) of the inks, the glass transition point ($T_g$, ° C.), the melting points (mp, ° C., as measured by DSC), and the CIE L*a*b color coordinates of the prints made either using the XEROX PHASER® 860 printer or the K-proofer:

color without an acid developer. Although not being limited to any particular theory, it is believed that the color development role in the inks of this invention was played by the metal ion in the colorants. Good dye solubilities of the colorants in Inks A through G and J through K of this invention in tested ink bases are demonstrated by the very high dye loads and corresponding very high spectral strength of the inks.

|  | A-1 | A-2 | A-3 | B-1 | B-2 | C |
|---|---|---|---|---|---|---|
| η | 10.80 | 10.62 | 10.79 | 10.62 | 10.76 | 10.65 |
| SS | 1279 | 1619 | 2095 | 1187 | 1102 | 1157 |
| $\lambda_{max}$ | 550 | 550 | 550 | 549 | 552 | 558 |
| $T_g$ | — | 18.4 | 17.7 | — | — | — |
| mp | — | 84.3, 104.6 | 83.9, 104.8 | — | — | — |
| L* (860) | 55.0 | 48.4 | 49.1 | 71.46 | — | 63.07 |
| a* (860) | 75.1 | 80.2 | 83.7 | 48.88 | — | 60.10 |
| b* (860) | −39.1 | −34.6 | −40.9 | −31.03 | — | −33.04 |
| L* (K-P) | 60.9 | — | 52.06 | — | 68.49 | 64.95 |
| a* (K-P) | 59.6 | — | 74.14 | — | 44.62 | 48.47 |
| b* (K-P) | −31.3 | — | −40.93 | — | −22.36 | −27.18 |

|  | D-1 | D-2 | E | F | G | H |
|---|---|---|---|---|---|---|
| η | 10.75 | 10.44 | 10.67 | 10.67 | 10.58 | 10.65 |
| SS | 1203 | 1262 | 1418 | 1255 | 1291 | 810 |
| $\lambda_{max}$ | 558 | 556 | 558 | 549 | 556 | 548 |
| $T_g$ | — | — | — | — | — | — |
| mp | — | — | — | — | — | — |
| L* (860) | 61.14 | — | — | — | — | — |
| a* (860) | 64.00 | — | — | — | — | — |
| b* (860) | −34.56 | — | — | — | — | — |
| L* (K-P) | — | 64.11 | 55.76 | 59.42 | 56.09 | 63.56 |
| a* (K-P) | — | 50.15 | 51.16 | 51.41 | 57.85 | 45.14 |
| b* (K-P) | — | −27.29 | −30.26 | −32.17 | −31.78 | −28.69 |

|  | I | J | K | 1 | 2 | 3 |
|---|---|---|---|---|---|---|
| η | 10.77 | 10.60 | 10.75 | 10.77 | 10.54 | 10.36 |
| SS | 887 | 1082 | 1115 | 1279 | 1328 | 909 |
| $\lambda_{max}$ | 553 | 554 | 552 | 555 | 552 | 543 |
| $T_g$ | — | — | — | 21.2 | — | — |
| mp | — | — | — | 82.7, 103.6 | — | — |
| L* (860) | — | — | — | 54.0 | 50.1 | — |
| a* (860) | — | — | — | 76.8 | 69.1 | — |
| b* (860) | — | — | — | −41.3 | −37.2 | — |
| L* (K-P) | 56.64 | 67.58 | 63.14 | 60.9 | 56.3 | — |
| a* (K-P) | 57.97 | 35.64 | 43.36 | 68.0 | 59.3 | — |
| b* (K-P) | −33.52 | −21.41 | −28.36 | −42.7 | −32.5 | — |

— = not measured

The color values in the above tables indicate that the colorants of Inks A through K can be used in hot melt inks with good magenta color as evidenced by the a* and b* values of the prints. As evidenced in the tables, Ink A can exhibit magenta color with a chroma larger than that of Comparative Ink 1, which was made from commercially available SR 49, which has been considered to be a bright magenta dye. In contrast to commercial SR 49 dye, which normally needs a relatively strong acid such as DDBSA to develop its color in an ink base, the colorants in Inks A through K of this invention show reasonably strong magenta

EXAMPLE XXVIII

Thermal Stability Testing

Colorant degradation can lead to an undesirable color shift or fade as a result of the colorant decomposition reaction in an ink. This phenomenon can adversely affect the color quality or consistency of prints from the inks if the colorant is not thermally stable. Thermal stability of the colorants in Inks A through K according to this invention was compared to SR 49 dye in Comparative Ink 1 by monitoring color changes of the prints from their cooked inks.

In one method, the inks were heated in glass jars continuously in an oven at 140° C., followed by sampling and printing the inks on HAMMERMILL LASERPRINT® paper using a K-Proofer, and finally measuring the color changes of the prints of the sampled inks as a function of time. The color changes of the resultant prints were monitored by CIELAB values and expressed by Delta E relative to the initial CIELAB values. The color change of each sample was determined according to the methods described hereinabove for obtaining CIELAB values. Color changes were determined following ASTM D2244-89 (Standard Test Method for Calculation of Color Differences From instrumentally Measured Color Coordinates) (delta $E=[(L^*_1-L^*_2)^2+(a^*_1-a^*_2)^2+(b^*_1-b^*_2)^2]^{1/2}$). The results for these Inks are shown in the tables below. As the data in the tables indicate, Inks A-1 through C-1 and Ink K containing the colorants according to the present invention demonstrated better color stability than Comparative Ink 1 containing commercial SR 49.

| Ink | 0 | 1 | 3 | 5 | 10 | 18 |
|---|---|---|---|---|---|---|
| A-1 | 0.0 | 1.8 | 4.0 | 6.1 | 14.6 | — |
| B-2 | 0.0 | 0.7 | 1.4 | 2.5 | 4.4 | — |
| C | 0.0 | 0.5 | 2.0 | 2.6 | — | 11.6 |
| D-2 | 0.0 | 0.9 | 2.9 | 5.5 | 9.1 | — |
| E | 0.0 | 3.1 | 13.0 | 19.5 | 25.6 | — |
| F | 0.0 | 6.3 | 14.0 | 21.5 | 39.4 | — |
| G | 0.0 | 3.2 | 6.9 | 8.3 | 16.0 | — |
| H | 0.0 | 2.7 | 6.2 | 11.4 | 23.8 | — |
| I | 0.0 | 1.6 | 3.9 | 7.6 | 16.6 | — |
| J | 0.0 | 5.2 | 10.7 | 15.6 | 26.6 | — |
| K | 0.0 | 1.7 | 3.7 | 8.0 | 11.6 | — |
| 1 | 0.0 | 2.2 | 3.7 | 6.4 | 10.7 | — |

ΔE values for various inks heated at 140° C. for the indicated number of days
— = not measured In another method, a thermal stability test was performed by continuously heating the test inks in a printer at 136° C. and measuring the color change of the prints as a function of time (referred to as the "No-standby" test). The color changes of the resultant prints were monitored by CIELAB values and expressed by Delta E relative to the initial CIELAB values. The color change of each sample was determined according to the methods described hereinabove for obtaining CIELAB values. Color changes were determined following ASTM D2244-89 (Standard Test Method for Calculation of Color Differences From instrumentally Measured Color Coordinates) (delta $E=[(L^*_1-L^*_2)^2+(a^*_1-a^*_2)^2+(b^*_1-b^*_2)^2]^{1/2}$). The results for tested Inks were as follows:

| aging time (days) | A-1 | A-2 | B-1 | C | D-1 | 1 |
|---|---|---|---|---|---|---|
| 0 | 0 | 0 | 0 | 0 | 0 | 0 |
| 0.3 | 0.8 | 0.4 | 1 | 1.8 | 0.6 | 2.2 |
| 0.5 | 1.6 | 0.5 | 1.4 | 1.7 | 1 | 3.7 |
| 1 | 2 | 0.7 | 1.5 | 3.5 | 3.7 | 6 |
| 2 | 2.2 | 1.5 | 3.4 | 5.7 | 7.9 | 8.4 |
| 3 | 3.8 | 1.7 | 3.2 | 6.3 | 12 | 11 |
| 4 | 4.4 | 2.5 | 4.1 | — | — | 14 |
| 5 | 5.1 | 2.9 | 4 | — | — | 16 |
| 6 | 6.3 | 3.7 | 5.2 | — | — | 17 |
| 7 | 7 | 4 | 4.4 | — | — | 18 |
| 8 | 8.6 | 4.7 | 5.1 | 11 | 34 | 20 |
| 9 | 8.1 | 5.4 | 5.9 | 14 | 38 | 21 |
| 10 | 8.4 | 6.2 | 6.6 | 16 | 40 | 21 |
| 11 | 8.5 | 6.7 | 6.7 | 15 | 40 | 22 |
| 12 | 8.6 | 7.4 | 7.5 | — | — | 24 |
| 13 | 8.2 | 7.7 | 8.3 | 19 | 44 | 25 |
| 14 | 8.5 | 8.1 | 9 | 20 | 45 | 26 |

ΔE values for various inks heated at 140° C. for the indicated number of days
— = not measured

EXAMPLE XXIX

Qualitative Assessment of Fingerprint Performance on Magenta Ink Print

All tested inks were subjected to a qualitative test for fingerprint resistance at room temperature. This test proceeded in three steps: printing of the inks, exposure of the prints to a mixture of finger oils and hand lotion ingredients, and finally a comparison of the various inks against a reference after a 5-day period.

The study was performed by initially printing the inks on A-size Hammermill Paper, including 20, 30, 40, 50, 60, 70, 80, and 90% ink coverage per sheet. Each sheet was dedicated to one ink only. For this purpose, the ink had been printed in portrait orientation in eight rectangular areas, measuring approximately 8"×1.25"—with each stripe representing one type of coverage. Three identical prints were generated per ink at a particular resolution, and two resolutions—355×464 dpi, and 600×600 dpi—were compared for each ink. The sets of prints included a reference ink, against which the experimental inks were compared at the two resolutions.

After the printing had been completed, the inks were exposed to a mixture of finger oil and hand lotion. For this purpose, a test person applied in two subsequent steps a hand lotion to his/her hands, and dried off excess lotion with a towel. Then, the person gently touched the printed inks at the right side of a particular print, starting at 90% coverage strip—and proceeded in a downward motion to the 20% coverage strip. Afterwards, the procedure was repeated on the same print with the other hand, starting on the left side with the 20% coverage strip, and moving upward towards higher coverages. Without renewal of hand lotion, this was repeated with the next print. After the second print had been exposed to the finger oils, the person was instructed to re-apply lotion to the hands in the described manner, and proceed with the next two prints. When all prints had been exposed to the finger oils, the prints were deposited into manila folders, whereby each print was separated from the next by a blank sheet of paper. The folder then was stored at ambient temperature for 5 days.

At the end of this time period, the prints were removed from the manila folders and laid out in a systematic pattern on a sufficiently large table in a sufficiently bright and evenly lit room. One test person—in some cases several test persons—then compared visually the finger marks on the prints with those seen on the prints of the reference ink. Observers were instructed to grade fingerprint performance qualitatively on a scale from −3 to +3, with −3 indicating worst behavior, and +3 indicating no finger marks observed. In this system of grades, the value ±0 would then indicate no difference of performance as compared to the print of the reference ink.

The prints were also aged at elevated temperatures of 45° C. and 60° C. in addition to aging at room temperature. The tested ink according to the present invention was Ink A-1 and the reference ink was Comparative Ink 1. The evaluation scores were as follows:

| Ink | room temp. | 45° C. | 60° C. |
|---|---|---|---|
| A-1 | 0.7 | 1.1 | 1.5 |
| 1 | 0 | 0 | 0 |

The results in the above table show that the images of the Ink A-1 prints were less affected by hand oils than those of Comparative Ink 1, suggesting better image stability.

EXAMPLE XXX

Diffusion Testing

Ink A-2 and Comparative Ink 1 were tested for diffusion tendency of their colorants. A clear ink was also prepared in the same manner as for Ink A-2 but without any colorants. This diffusion evaluation method used printed images to test for the ability of the colorant from a magenta ink pixel to diffuse into neighboring colorless ink pixels that surrounded the magenta ink pixel. The test prints were generated to contain about 20 percent individual magenta pixels surrounded by 80 percent clear ink pixels. The prints were analyzed at room temperature over a number of days for overall color change detected using a color image analyzer, and the response was measured as change in delta E ($\Delta E$) over time and shown in the table below. The color difference of each sample was determined according to the methods described hereinabove for obtaining CIELAB values. Color differences were determined following ASTM D2244-89 (Standard Test Method for Calculation of Color Differences From instrumentally Measured Color Coordinates) (delta $E=[(L^*_1-L^*_2)^2+(a^*_1-a^*_2)^2+(b^*_1-b^*_2)^2]^{1/2}$). Both HAMMERMILL LASERPRINT® paper and XEROX® 4024 paper were used, and the color change results in terms of $\Delta E$ over time were as follows:

| | HAMMERMILL LASERPRINT ® | | XEROX ® 4024 | |
|---|---|---|---|---|
| Aging Time (days) | Ink A-2 | Comp. Ink 1 | Ink A-2 | Comp. Ink 1 |
| 0 | 0 | 0 | 0 | 0 |
| 0.75 | 0.1 | 0.8 | 0.5 | 1.2 |
| 1.75 | 0.5 | 1.4 | 0.8 | 1.8 |
| 3 | 0.3 | 1.5 | 0.7 | 2.0 |
| 5.1 | 0.5 | 1.7 | 0.9 | 2.5 |
| 6.95 | 0.6 | 2.1 | 0.8 | 3.0 |
| 22 | 1.4 | 3.4 | 1.3 | 4.3 |

As the data indicate, the colorants examined had all diffused into surrounding clear base pixels, as evident by the color change and measured as a change in delta E ($\Delta E$). The colorant in Ink A-2, however, underwent diffusion to a significantly lesser degree than the comparative colorant SR49 in Comparative Ink 1. These results indicate that the colorant in Ink A-2 is superior to the comparative commercial colorant SR49 in its ability for minimal dye diffusion. While not being limited to any particular theory, it is believed that the long alkyl groups of the colorant prepared in Example IF of this invention hindered the mobility of the colorant molecule.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

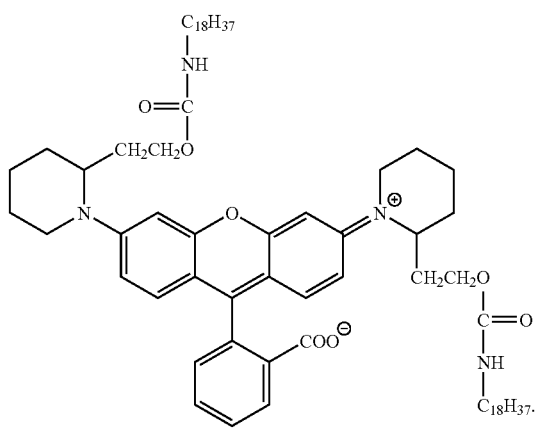

What is claimed is:

1. A compound of the formula

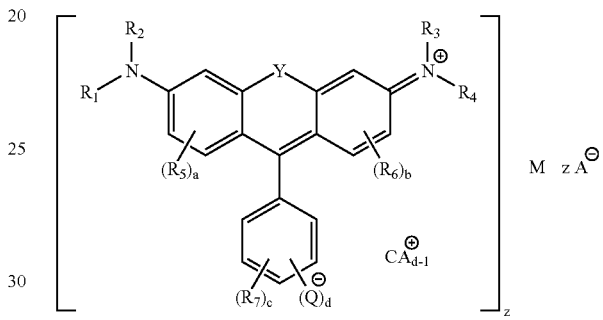

wherein M is either (1) a metal ion having a positive charge of +p wherein p is an integer which is at least 2, said metal ion being capable of forming a compound with at least two

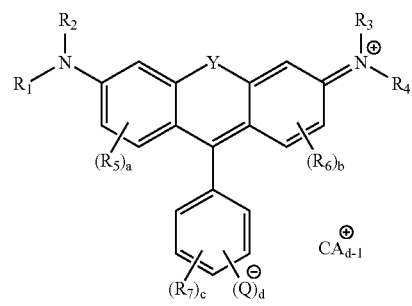

chromogen moieties, or (2) a metal-containing moiety capable of forming a compound with at least two

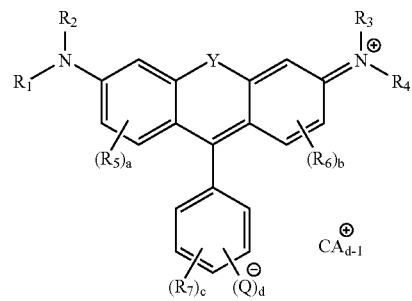

chromogen moieties, z is an integer representing the number of

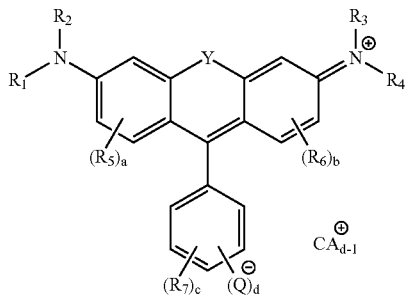

chromogen moieties associated with the metal and is at least 2, $R_1$, $R_2$, $R_3$, and $R_4$ each, independently of the others, is (i) a hydrogen atom, (ii) an alkyl group, including linear, branched, saturated, unsaturated, cyclic, substituted, and unsubstituted alkyl groups, and wherein hetero atoms either may or may not be present in the alkyl group, (iii) an aryl group, including unsubstituted and substituted aryl groups, and wherein hetero atoms either may or may not be present in the aryl group, (iv) an arylalkyl group, including unsubstituted and substituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (v) an alkylaryl group, including unsubstituted and substituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group, including linear, branched, saturated, unsaturated, cyclic, substituted, and unsubstituted alkyl groups, and wherein hetero atoms either may or may not be present in the alkyl group, (ii) an aryl group, including unsubstituted and substituted aryl groups, and wherein hetero atoms either may or may not be present in the aryl group, (iii) an arylalkyl group, including unsubstituted and substituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, (iv) an alkylaryl group, including unsubstituted and substituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

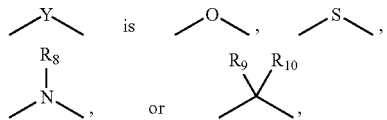

$R_8$, $R_9$, and $R_{10}$ each, independently of the others, is (i) a hydrogen atom, (ii) an alkyl group, including linear, branched, saturated, unsaturated, cyclic, substituted, and unsubstituted alkyl groups, and wherein hetero atoms either may or may not be present in the alkyl group, (iii) an aryl group, including unsubstituted and substituted aryl groups, and wherein hetero atoms either may or may not be present in the aryl group, (iv) an arylalkyl group, including unsubstituted and substituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (v) an alkylaryl group, including unsubstituted and substituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, provided that the number of carbon atoms in $R_1+R_2+R_3+R_4+R_5+R_6+R_7+R_8+R_9+R_{10}$ is at least about 16, $Q^-$ is a $COO^-$ group or a $SO_3^-$ group, d is an integer which is 1, 2, 3, 4, or 5, A is an anion, and CA is either a hydrogen atom or a cation associated with all but one of the $Q^-$ groups.

2. A compound of the formula

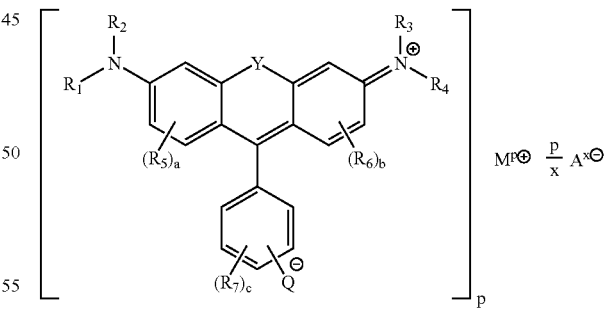

wherein M is a metal cation, p is an integer representing the charge on the metal cation and is at least 2, A is an anion, x is an integer representing the charge on the anion, $R_1$, $R_2$, $R_3$, and $R_4$ each, independently of the others, is (i) a hydrogen atom, (ii) an alkyl group, including linear, branched, saturated, unsaturated, cyclic, substituted, and unsubstituted alkyl groups, and wherein hetero atoms either may or may not be present in the alkyl group, (iii) an aryl group, including unsubstituted and substituted aryl groups, and wherein hetero atoms either may or may not be present in the aryl group, (iv) an arylalkyl group, including unsubstituted and substituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (v) an alkylaryl group, including unsubstituted and substituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group, including linear, branched, saturated, unsaturated, cyclic, substituted, and unsubstituted alkyl groups, and wherein hetero atoms either may or may not be present in the alkyl group, (ii) an aryl group, including unsubstituted and substituted aryl groups, and wherein hetero atoms either may or may not be present in the aryl group, (iii) an arylalkyl group, including unsubstituted and substituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, (iv) an alkylaryl group, including unsubstituted and substituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

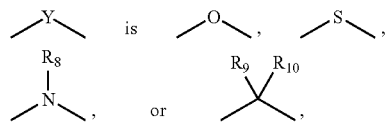

$R_8$, $R_9$, and $R_{10}$ each, independently of the others, is (i) a hydrogen atom, (ii) an alkyl group, including linear, branched, saturated, unsaturated, cyclic, substituted, and unsubstituted alkyl groups, and wherein hetero atoms either may or may not be present in the alkyl group, (iii) an aryl group, including unsubstituted and substituted aryl groups, and wherein hetero atoms either may or may not be present in the aryl group, (iv) an arylalkyl group, including unsubstituted and substituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (v) an alkylaryl group, including unsubstituted and substituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, provided that the number of carbon atoms in $R_1+R_2+R_3+R_4+R_5+R_6+R_7+R_8+R_9+R_{10}$ is at least about 16, and $Q^-$ is a $COO^-$ group or a $SO_3^-$ group.

3. A compound comprising the reaction product of (a) a chromogen of the formula

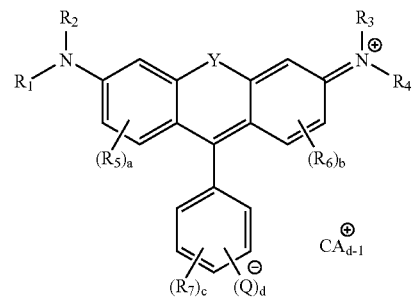

wherein $R_1$, $R_2$, $R_3$, and $R_4$ each, independently of the others, is (i) a hydrogen atom, (ii) an alkyl group, including linear, branched, saturated, unsaturated, cyclic, substituted, and unsubstituted alkyl groups, and wherein hetero atoms either may or may not be present in the alkyl group, (iii) an aryl group, including unsubstituted and substituted aryl groups, and wherein hetero atoms either may or may not be present in the aryl group, (iv) an arylalkyl group, including unsubstituted and substituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (v) an alkylaryl group, including unsubstituted and substituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group, including linear, branched, saturated, unsaturated, cyclic, substituted, and unsubstituted alkyl groups, and wherein hetero atoms either may or may not be present in the alkyl group, (ii) an aryl group, including unsubstituted and substituted aryl groups, and wherein hetero atoms either may or may not be present in the aryl group, (iii) an arylalkyl group, including unsubstituted and substituted arylalkyl groups, wherein the alkyl portion of the arylalkyl group can be linear, branched, saturated, unsaturated, and/or cyclic, and wherein hetero atoms either may or the aryl portion of the arylalkyl group, (iv) an alkylaryl group, including unsubstituted and substituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

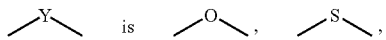

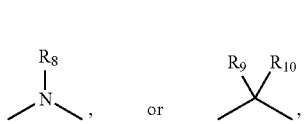

$R_8$, $R_9$, and $R_{10}$ each, independently of the others, is (i) a hydrogen atom, (ii) an alkyl group, including linear, branched, saturated, unsaturated, cyclic, substituted, and unsubstituted alkyl groups, and wherein hetero atoms either may or may not be present in the alkyl group, (iii) an aryl group, including unsubstituted and substituted aryl groups, and wherein hetero atoms either may or may not be present in the aryl group, (iv) an arylalkyl group, including unsubstituted and substituted arylalkyl groups, wherein the alkyl portion of the arylalkyl group can be linear, branched, saturated, unsaturated, and/or cyclic, and wherein hetero atoms either may or may not be present in either or both of the alkyl portion and the aryl portion of the arylalkyl group, or (v) an alkylaryl group, including unsubstituted and substituted alkylaryl groups, wherein the alkyl portion of the alkylaryl group can be linear, branched, saturated, unsaturated, and/or cyclic, and wherein hetero atoms either may or may not be present in either or both of the alkyl portion and the aryl portion of the alkylaryl group, provided that the number of carbon atoms in $R_1+R_2+R_3+R_4+R_5+R_6+R_7+R_8+R_9+R_{10}$ is at least about 16, $Q^-$ is a $COO^-$ group or a $SO_3^-$ group, d is an integer which is 1, 2, 3, 4, or 5, A is an anion, and CA is either a hydrogen atom or a cation associated with all but one of the $Q^-$ groups, and (b) a metal salt of which the metal portion is either (1) a metal ion having a positive charge of +p wherein p is an integer which is at least 2, said metal ion being capable of forming a compound with at least two

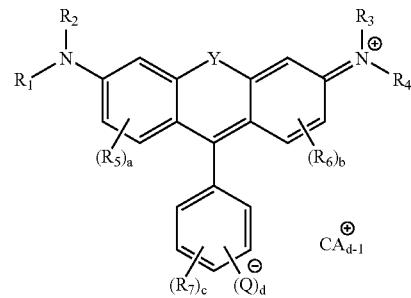

chromogen moieties, or (2) a metal-containing moiety capable of forming a compound with at least two

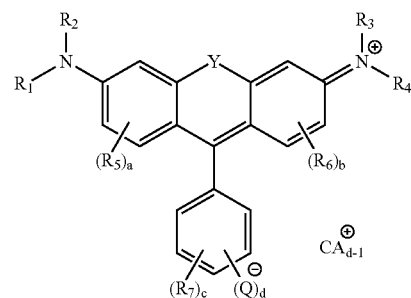

chromogen moieties.

4. A compound according to claim 1 wherein $R_1$ and $R_2$ are joined together to form a ring.

5. A compound according to claim 4 wherein said ring contains at least one hetero atom selected from oxygen, nitrogen, sulfur, silicon, or phosphorus in addition to the nitrogen atom joining $R_1$ and $R_2$.

6. A compound according to claim 4 wherein no hetero atoms are present in said ring other than the nitrogen atom joining $R_1$ and $R_2$.

7. A compound according to claim 4 wherein $R_1$ and $R_2$ each, independently of the other, has at least about 1 carbon atom and wherein $R_1$ and $R_2$ each, independently of the other, has no more than about 55 carbon atoms.

8. A compound according to claim 4 wherein $R_1$ and $R_2$ each, independently of the other, has at least about 1 carbon atom and wherein $R_1$ and $R_2$ each, independently of the other, has no more than about 20 carbon atoms.

9. A compound according to claim 4 wherein said ring is a six-membered ring.

10. A compound according to claim 4 wherein said ring has five carbon atoms.

11. A compound according to claim 1 wherein said ring is a seven-membered ring.

12. A compound according to claim 1 wherein said ring has six carbon atoms.

13. A compound according to claim 1 wherein $R_1$ and $R_2$ are joined together to form a ring and wherein $R_3$ and $R_4$ are joined together to form a ring.

14. A compound according to claim 1 wherein at least one of $R_1$, $R_2$, $R_3$, and $R_4$ is joined to a phenyl ring in the central structure.

15. A compound according to claim 14 wherein said ring contains at least one hetero atom selected from oxygen, nitrogen, sulfur, silicon, or phosphorus.

16. A compound according to claim 14 wherein no hetero atoms are present in said ring.

17. A compound according to claim 14 wherein said R group or R groups attached to said phenyl ring or rings in said central structure each, independently of the others, has at least about 1 carbon atom and wherein said R group or R groups attached to said phenyl ring or rings in said central structure each, independently of the other, has no more than about 55 carbon atoms.

18. A compound according to claim 14 wherein said R group or R groups attached to said phenyl ring or rings in said central structure each, independently of the others, has at least about 1 carbon atom and wherein said R group or R groups attached to said phenyl ring or rings in said central structure each, independently of the other, has no more than about 20 carbon atoms.

19. A compound according to claim 14 wherein said ring is a six-membered ring.

20. A compound according to claim 14 wherein said ring has five carbon atoms.

21. A compound according to claim 1 wherein the number of carbon atoms in $R_1+R_2+R_3+R_4+R_5+R_6+R_7+R_8+R_9+R_{10}$ is at least about 32.

22. A compound according to claim 1 wherein the number of carbon atoms in $R_1+R_2+R_3+R_4+R_5+R_6+R_7+R_8+R_9+R_{10}$ is at least about 48.

23. A compound according to claim 1 wherein the number of carbon atoms in $R_1+R_2+R_3+R_4+R_5+R_6+R_7+R_8+R_9+R_{10}$ is at least about 72.

24. A compound according to claim 1 wherein the chromogen is of the formula

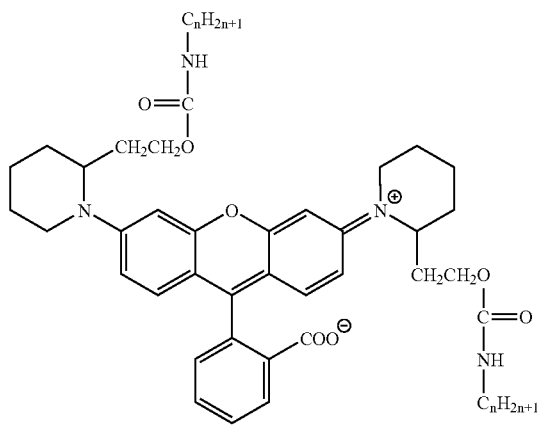

wherein n is at least about 12.

25. A compound according to claim 1 wherein the chromogen is of the formula

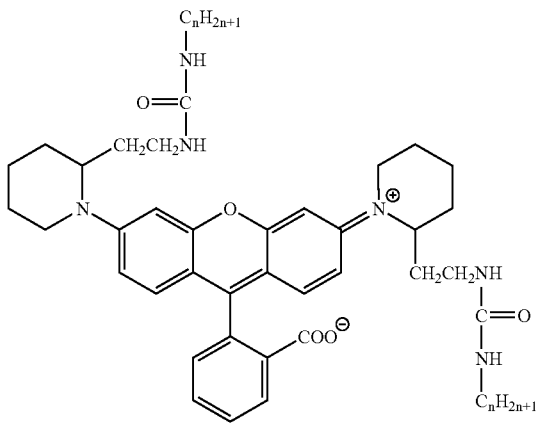

wherein n is at least about 12.

26. A compound according to claim 1 wherein the chromogen is of the

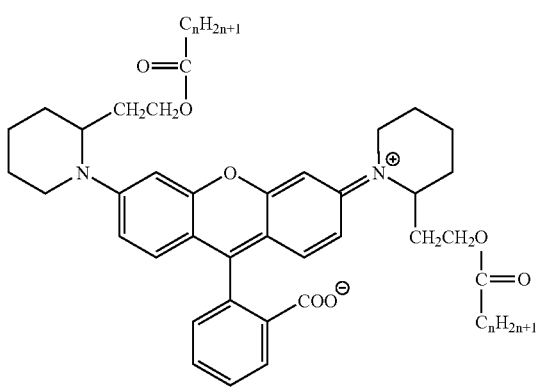

wherein n is at least about 12.

27. A compound according to claim 1 wherein the chromogen is of the formula